(12) United States Patent
Sanders et al.

(10) Patent No.: US 11,665,807 B2
(45) Date of Patent: May 30, 2023

(54) CARTRIDGE FOR A LIQUID-COOLED PLASMA ARC TORCH

(71) Applicant: Hypertherm, Inc., Hanover, NH (US)

(72) Inventors: Nicholas A. Sanders, Enfield, NH (US); E. Michael Shipulski, Etna, NH (US); Michael Hoffa, Lebanon, NH (US)

(73) Assignee: Hypertherm, Inc., Hanover, NH (US)

( * ) Notice: Subject to any disclaimer, the term of this patent is extended or adjusted under 35 U.S.C. 154(b) by 266 days.

(21) Appl. No.: 16/795,752

(22) Filed: Feb. 20, 2020

(65) Prior Publication Data

US 2020/0196426 A1 Jun. 18, 2020

Related U.S. Application Data

(63) Continuation of application No. 15/228,750, filed on Aug. 4, 2016, now Pat. No. 10,609,805.
(Continued)

(51) Int. Cl.
*H05H 1/28* (2006.01)
*H05H 1/34* (2006.01)
(Continued)

(52) U.S. Cl.
CPC ............... *H05H 1/28* (2013.01); *B23K 9/285* (2013.01); *G06K 19/07773* (2013.01);
(Continued)

(58) Field of Classification Search
CPC .. G06K 19/07773; H05H 1/3468; H05H 1/28; H05H 1/34; H05H 1/3405;
(Continued)

(56) References Cited

U.S. PATENT DOCUMENTS 3,018,360 A 1/1962 Engel
3,153,133 A 10/1964 Ducati
(Continued)

FOREIGN PATENT DOCUMENTS

DE 202013010576 U1 2/2014
EP 0875329 A1 11/1998
(Continued)

OTHER PUBLICATIONS

Amada America Inc.,"Amada WAGS System", Retrieved from the internet at: http://www.amada.de/en/laser/wacs-system.html, printed Oct. 27, 2016, 2 pages.
(Continued)

*Primary Examiner* — Ibrahime A Abraham
*Assistant Examiner* — Frederick F Calvetti
(74) *Attorney, Agent, or Firm* — Cesari and McKenna, LLP

(57) ABSTRACT

A torch head for a liquid-cooled plasma arc torch is provided. The torch head includes a torch body and a torch insulator, coupled to the torch body, having a substantially non-conductive insulator body. The torch insulator includes (i) a first liquid coolant channel, disposed within the insulator body, configured to conduct a fluid flow from the torch head into a consumable cartridge along a first preexisting flow path, (ii) a first liquid return channel, disposed within the insulator body, configured to return at least a portion of the fluid flow from the cartridge to the torch head along the first preexisting flow path, and (iii) a gas channel, disposed within the insulator body, configured to conduct a first gas flow from the torch head to the cartridge along a second preexisting flow path. The first and second preexisting flow paths are fluidly isolated from each other.

18 Claims, 28 Drawing Sheets

Related U.S. Application Data

(60) Provisional application No. 62/200,913, filed on Aug. 4, 2015.

(51) Int. Cl.
  *G06K 19/077* (2006.01)
  *H05H 1/36* (2006.01)
  *B23K 9/28* (2006.01)

(52) U.S. Cl.
  CPC ........ *H05H 1/3405* (2013.01); *H05H 1/3423* (2021.05); *H05H 1/36* (2013.01); *H05H 1/3421* (2021.05); *H05H 1/3457* (2021.05); *H05H 1/3468* (2021.05); *H05H 1/3473* (2021.05)

(58) Field of Classification Search
  CPC .. H05H 1/3421; H05H 1/3457; H05H 1/3473; H05H 1/36; B23K 9/285
  USPC ........................................ 219/121.49, 121.54
  See application file for complete search history.

(56) References Cited

U.S. PATENT DOCUMENTS

| | | |
|---|---|---|
| 3,242,305 A * | 3/1966 | Kane ................. H05H 1/34 219/121.48 |
| 3,279,177 A | 10/1966 | Ducati |
| 3,294,953 A | 12/1966 | Spies |
| 3,518,401 A | 6/1970 | Mathews |
| 3,684,911 A | 8/1972 | Perugini et al. |
| 4,011,996 A | 3/1977 | Tsuji et al. |
| 4,034,250 A | 7/1977 | Kiselev et al. |
| 4,087,050 A | 5/1978 | Tsuji et al. |
| 4,311,897 A | 1/1982 | Yerushalmy |
| 4,355,262 A | 10/1982 | Chan et al. |
| 4,519,835 A | 5/1985 | Gauvin et al. |
| 4,570,048 A | 2/1986 | Poole |
| 4,620,080 A | 10/1986 | Arata et al. |
| 4,682,005 A | 7/1987 | Marhic |
| 4,687,139 A | 8/1987 | Lockwood |
| 4,733,052 A | 3/1988 | Nilsson et al. |
| 4,748,312 A | 5/1988 | Hatch et al. |
| 4,783,004 A | 11/1988 | Lockwood |
| 4,896,016 A | 1/1990 | Broberg et al. |
| 4,914,271 A | 4/1990 | Delzenne et al. |
| 4,924,060 A | 5/1990 | Delzenne |
| 4,929,811 A | 5/1990 | Blankenship |
| 4,940,877 A | 7/1990 | Broberg |
| 4,948,485 A | 8/1990 | Wallsten et al. |
| 4,967,055 A | 10/1990 | Raney et al. |
| 4,982,067 A | 1/1991 | Marantz et al. |
| 5,018,670 A | 5/1991 | Chalmers |
| 5,023,425 A | 6/1991 | Severance, Jr. |
| 5,132,512 A | 7/1992 | Sanders et al. |
| 5,144,110 A | 9/1992 | Marantz et al. |
| 5,170,033 A | 12/1992 | Couch, Jr. |
| 5,183,646 A | 2/1993 | Anderson et al. |
| 5,200,595 A | 4/1993 | Boulos et al. |
| 5,208,441 A | 5/1993 | Broberg |
| 5,239,161 A | 8/1993 | Lang |
| 5,309,683 A | 5/1994 | Hockett |
| 5,317,126 A | 5/1994 | Couch, Jr. et al. |
| 5,390,964 A | 2/1995 | Gray, Jr. |
| 5,393,952 A * | 2/1995 | Yamaguchi ............. H05H 1/34 219/121.48 |
| 5,396,043 A * | 3/1995 | Couch, Jr. ............. B23K 10/006 219/121.48 |
| 5,409,164 A * | 4/1995 | Delzenne ................. H05H 1/34 239/132.3 |
| 5,440,477 A | 5/1995 | Rohrberg et al. |
| 5,502,245 A | 3/1996 | Dassel et al. |
| 5,518,221 A | 5/1996 | Zurecki et al. |
| 5,556,562 A | 9/1996 | Sorenson |
| 5,558,842 A | 9/1996 | Vassiliou et al. |
| 5,560,844 A | 10/1996 | Boulos et al. |
| 5,580,531 A | 12/1996 | Vassiliou et al. |
| 5,695,662 A | 12/1997 | Couch, Jr. et al. |
| 5,717,187 A | 2/1998 | Rogozinski et al. |
| 5,747,767 A | 5/1998 | Severance et al. |
| 5,796,067 A | 8/1998 | Enyedy et al. |
| 5,801,282 A | 9/1998 | Dassel et al. |
| 5,841,095 A | 11/1998 | Lu et al. |
| 5,844,196 A | 12/1998 | Oakley |
| 5,860,849 A | 1/1999 | Miller |
| 5,874,707 A | 2/1999 | Iida et al. |
| 5,886,315 A | 3/1999 | Lu et al. |
| 5,897,795 A | 4/1999 | Lu et al. |
| 5,968,379 A | 10/1999 | Zhao et al. |
| 5,994,663 A | 11/1999 | Lu |
| 6,084,199 A | 7/2000 | Lindsay et al. |
| 6,096,993 A | 8/2000 | Marhic et al. |
| 6,133,542 A | 10/2000 | Dvorak et al. |
| 6,147,318 A | 11/2000 | Marhic |
| 6,156,995 A * | 12/2000 | Severance, Jr. ......... H05H 1/34 219/121.59 |
| 6,163,008 A | 12/2000 | Roberts et al. |
| 6,169,264 B1 | 1/2001 | Marhic |
| 6,207,923 B1 | 3/2001 | Lindsay |
| 6,256,873 B1 | 7/2001 | Tiffany et al. |
| 6,320,156 B1 | 11/2001 | Yamaguchi et al. |
| 6,337,460 B2 | 1/2002 | Kelkar et al. |
| 6,365,867 B1 | 4/2002 | Hooper |
| 6,444,945 B1 | 9/2002 | Maschwitz et al. |
| 6,483,070 B1 * | 11/2002 | Diehl ................. H05H 1/34 219/121.48 |
| 6,525,292 B1 * | 2/2003 | Girold ................. H05H 1/34 219/121.48 |
| 6,616,767 B2 | 9/2003 | Zhao et al. |
| 6,657,162 B1 | 12/2003 | Jung et al. |
| 6,703,581 B2 | 3/2004 | Jones et al. |
| 6,713,711 B2 | 3/2004 | Conway et al. |
| 6,717,096 B2 | 4/2004 | Hewett et al. |
| 6,800,336 B1 | 10/2004 | Fornsel et al. |
| 6,852,944 B2 | 2/2005 | MacKenzie et al. |
| 6,881,921 B2 | 4/2005 | Horner-Richardson et al. |
| 6,888,092 B2 | 5/2005 | Walters |
| 6,903,301 B2 | 6/2005 | Jones et al. |
| 6,919,526 B2 | 7/2005 | Kinerson et al. |
| 6,936,786 B2 | 8/2005 | Hewett et al. |
| 6,946,616 B2 | 9/2005 | Kinerson et al. |
| 6,989,505 B2 | 1/2006 | MacKenzie et al. |
| 7,030,337 B2 | 4/2006 | Baker et al. |
| 7,161,111 B2 | 1/2007 | Schneider |
| 7,196,283 B2 | 3/2007 | Buchberger et al. |
| 7,202,440 B2 | 4/2007 | Hewett et al. |
| 7,220,937 B2 | 5/2007 | Hofman et al. |
| 7,375,302 B2 | 5/2008 | Twarog et al. |
| 7,411,149 B2 | 8/2008 | Schneider |
| 7,423,235 B2 | 9/2008 | Severance, Jr. |
| 7,598,473 B2 | 10/2009 | Cook et al. |
| 7,615,720 B2 | 11/2009 | Sanders |
| 7,622,693 B2 | 11/2009 | Foret |
| 7,671,294 B2 | 3/2010 | Belashchenko et al. |
| 7,759,599 B2 | 7/2010 | Hawley et al. |
| 7,927,094 B2 | 4/2011 | Fong et al. |
| 8,030,592 B2 | 10/2011 | Weidman |
| 8,035,055 B2 | 10/2011 | Twarog et al. |
| 8,089,025 B2 | 1/2012 | Sanders |
| 8,097,828 B2 | 1/2012 | Roberts et al. |
| 8,115,136 B2 | 2/2012 | Mather et al. |
| 8,203,095 B2 | 6/2012 | Storm et al. |
| 8,338,740 B2 | 12/2012 | Liebold et al. |
| 8,373,084 B2 | 2/2013 | Salsich |
| 8,389,887 B2 | 3/2013 | Liebold et al. |
| 8,395,076 B2 | 3/2013 | Matus |
| 8,395,077 B2 | 3/2013 | Duan et al. |
| 8,455,786 B2 | 6/2013 | Fang |
| 8,546,719 B2 | 10/2013 | Warren, Jr. et al. |
| 8,575,510 B2 | 11/2013 | Laurish et al. |
| 8,581,139 B2 | 11/2013 | Severance, Jr. |
| 8,624,150 B2 | 1/2014 | Simek et al. |
| 8,698,036 B1 | 4/2014 | Zhang et al. |
| 8,698,306 B2 | 4/2014 | Yu et al. |

(56) References Cited

U.S. PATENT DOCUMENTS

| | | |
|---|---|---|
| 8,759,715 B2 | 6/2014 | Narayanan et al. |
| 8,790,447 B2 | 7/2014 | Bieri et al. |
| 8,921,731 B2 | 12/2014 | Krink et al. |
| 9,157,360 B2 | 10/2015 | Hoy-Peterson et al. |
| 9,398,679 B2 | 7/2016 | Namburu |
| 9,550,251 B2 | 1/2017 | Guilotta |
| 9,609,733 B2 | 3/2017 | Severance |
| 9,781,816 B2* | 10/2017 | Cook ........................ H05H 1/34 |
| 2001/0007320 A1* | 7/2001 | Severance, Jr. .......... H05H 1/34 |
| | | 219/121.48 |
| 2002/0012756 A1 | 1/2002 | Kuckertz et al. |
| 2002/0117482 A1 | 8/2002 | Hewett et al. |
| 2002/0117483 A1 | 8/2002 | Jones et al. |
| 2002/0117484 A1 | 8/2002 | Jones et al. |
| 2003/0085205 A1 | 5/2003 | Lai et al. |
| 2003/0148709 A1 | 8/2003 | Anand et al. |
| 2004/0000538 A1* | 1/2004 | Conway .................. B23K 9/291 |
| | | 219/121.48 |
| 2004/0177807 A1 | 9/2004 | Pui et al. |
| 2004/0195217 A1* | 10/2004 | Conway .................... H05H 1/34 |
| | | 219/121.48 |
| 2004/0195219 A1 | 10/2004 | Brandt et al. |
| 2004/0200810 A1 | 10/2004 | Brandt et al. |
| 2005/0242068 A1 | 11/2005 | Boisvert et al. |
| 2006/0016789 A1 | 1/2006 | Mackenzie et al. |
| 2006/0163216 A1 | 7/2006 | Brandt et al. |
| 2006/0289397 A1 | 12/2006 | Mahawill |
| 2006/0289398 A1 | 12/2006 | Cook et al. |
| 2006/0289406 A1 | 12/2006 | Helenius et al. |
| 2007/0044449 A1 | 3/2007 | O'brien et al. |
| 2007/0045241 A1 | 3/2007 | Schneider et al. |
| 2007/0082532 A1 | 4/2007 | Morris |
| 2007/0082533 A1 | 4/2007 | Currier et al. |
| 2007/0090168 A1 | 4/2007 | Snow et al. |
| 2007/0154306 A1 | 7/2007 | Anderson et al. |
| 2007/0181540 A1 | 8/2007 | Lindsay et al. |
| 2007/0210034 A1 | 9/2007 | Mather et al. |
| 2007/0262060 A1 | 11/2007 | Roberts et al. |
| 2008/0083711 A1 | 4/2008 | Twarog et al. |
| 2008/0116179 A1 | 5/2008 | Cook et al. |
| 2008/0173622 A1 | 7/2008 | Lindsay et al. |
| 2008/0210669 A1 | 9/2008 | Yang et al. |
| 2008/0217305 A1 | 9/2008 | Sanders |
| 2008/0237356 A1 | 10/2008 | Singleton et al. |
| 2008/0308535 A1 | 12/2008 | Rego et al. |
| 2009/0026180 A1 | 1/2009 | Yang et al. |
| 2009/0027782 A1 | 1/2009 | Takahashi et al. |
| 2009/0045174 A1 | 2/2009 | Haberler et al. |
| 2009/0152255 A1 | 6/2009 | Ma et al. |
| 2009/0206721 A1 | 8/2009 | Foret |
| 2009/0230095 A1* | 9/2009 | Liebold .................. B23K 10/00 |
| | | 165/104.19 |
| 2009/0230097 A1 | 9/2009 | Liebold et al. |
| 2009/0277882 A1 | 11/2009 | Bornemann |
| 2010/0078408 A1 | 4/2010 | Liebold et al. |
| 2010/0084381 A1 | 4/2010 | Indraczek et al. |
| 2010/0133241 A1 | 6/2010 | Wilhelm et al. |
| 2010/0264120 A1* | 10/2010 | Reinke .................... H05H 1/34 |
| | | 219/121.51 |
| 2011/0031224 A1* | 2/2011 | Severance, Jr. .......... H05H 1/34 |
| | | 219/121.52 |
| 2011/0042358 A1 | 2/2011 | Albanese et al. |
| 2011/0284502 A1* | 11/2011 | Krink ........................ H05H 1/34 |
| | | 219/121.5 |
| 2012/0012560 A1 | 1/2012 | Roberts et al. |
| 2012/0012565 A1 | 1/20120 | Zhang et al. |
| 2012/0036832 A1 | 2/2012 | Hoy-Petersen et al. |
| 2012/0055907 A1 | 3/2012 | Allimant et al. |
| 2012/0058649 A1 | 3/2012 | Okumura et al. |
| 2012/0060691 A1 | 3/2012 | Bieri et al. |
| 2012/0103946 A1* | 5/2012 | Krink ...................... B23K 10/02 |
| | | 219/121.67 |
| 2012/0152913 A1 | 6/2012 | Mather et al. |
| 2012/0181257 A1 | 7/2012 | Mather et al. |
| 2012/0246922 A1* | 10/2012 | Hussary .................... H05H 1/28 |
| | | 29/825 |
| 2012/0248073 A1* | 10/2012 | Conway .................... H05H 1/28 |
| | | 219/121.49 |
| 2012/0261392 A1 | 10/2012 | Barnett et al. |
| 2013/0043222 A1 | 2/2013 | Leiteritz et al. |
| 2013/0043224 A1 | 2/2013 | Leiteritz et al. |
| 2013/0087535 A1* | 4/2013 | Barnett ................ B23K 10/006 |
| | | 219/121.48 |
| 2013/0126487 A1 | 5/2013 | Crowe |
| 2013/0153545 A1 | 6/2013 | Kim et al. |
| 2013/0248497 A1 | 9/2013 | Stoeger et al. |
| 2013/0264317 A1* | 10/2013 | Hoffa .................... B23K 10/006 |
| | | 219/121.53 |
| 2014/0021172 A1 | 1/2014 | Sanders et al. |
| 2014/0023856 A1 | 1/2014 | Bisges et al. |
| 2014/0069895 A1* | 3/2014 | Brine .................... B23K 10/006 |
| | | 219/121.44 |
| 2014/0076861 A1 | 3/2014 | Cornelius et al. |
| 2014/0113527 A1* | 4/2014 | Lindsay ................ B23K 26/702 |
| | | 451/8 |
| 2014/0217069 A1 | 8/2014 | Griffin et al. |
| 2014/0217070 A1* | 8/2014 | Pikus ...................... B23K 7/00 |
| | | 266/74 |
| 2015/0076819 A1 | 3/2015 | Mather et al. |
| 2015/0129562 A1* | 5/2015 | Severance, Jr. .......... H05H 1/34 |
| | | 219/121.48 |
| 2015/0181686 A1 | 6/2015 | Schulze et al. |
| 2015/0273617 A1 | 10/2015 | Gullotta |
| 2015/0319835 A1 | 11/2015 | Sanders et al. |
| 2015/0319836 A1 | 11/2015 | Sanders et al. |
| 2015/0332071 A1 | 11/2015 | Hoffa et al. |
| 2016/0050740 A1 | 2/2016 | Zhang et al. |
| 2016/0113102 A1* | 4/2016 | Cook ........................ H05H 1/34 |
| | | 219/121.48 |
| 2016/0120015 A1 | 4/2016 | Crowe |
| 2016/0165711 A1 | 6/2016 | Zhang et al. |
| 2016/0165712 A1 | 6/2016 | Zhang et al. |
| 2016/0174353 A1* | 6/2016 | Mitra ........................ H05H 1/42 |
| | | 219/121.5 |
| 2016/0221108 A1 | 8/2016 | Hoffa et al. |
| 2016/0314938 A1 | 10/2016 | Park |
| 2017/0042014 A1* | 2/2017 | Sanders .................... H05H 1/34 |

FOREIGN PATENT DOCUMENTS

| | | |
|---|---|---|
| EP | 0941018 A2 | 9/1999 |
| EP | 1117279 A1 | 7/2001 |
| EP | 1893004 A1 | 2/2008 |
| FR | 2700982 A1 | 8/1994 |
| JP | 57044467 A | 3/1982 |
| JP | 2011014459 A | 1/2011 |
| JP | 4688450 B2 | 5/2011 |
| JP | 4707108 B2 | 6/2011 |
| RU | 2066263 C1 | 9/1996 |
| RU | 95105277 A | 4/1997 |
| RU | 2354460 C1 | 10/2008 |
| RU | 150194 U1 | 7/2014 |
| WO | WO 9621339 A1 | 7/1996 |
| WO | WO 03089183 A1 | 10/2003 |
| WO | WO 2013103466 A1 | 7/2013 |
| WO | WO 2015073522 A1 | 5/2015 |

OTHER PUBLICATIONS

Centricut catalog "2013-2014 Plasma torches and consumables", 68 pages.

Drawing of Hypertherm Part No. 120934, 2000 (redacted).

Komatsu America Industries, LLC: "Next Generation Twister TFP6062-300A Power Supply Units", Retrieved from the internet at: http://www.komatsuplasma.com/kai/ctd/en/tfp6062/pdf/TFP6062_Brochure.pdf, printed Oct. 27, 2016, 2 pages.

Komatsu America Industries, LLC: "TFPL Twister Series", Retrieved from the internet at: http://fineplasma.com/kai/ctd/en/tfp/pdf/eTFP.pdf, printed Oct. 27, 2016, 6 pages.

(56) References Cited

OTHER PUBLICATIONS

Thermal Dynamics XT™—300 Brochure, May 7, 2007, http://www.mitausteel.lv/wp-content/uploads/2013/1 l/V- XT300-Torch.pdf, 6 pages.

Thermal Dynamics, "XT-301 Automated Plasma Cutting Torch", retrieved from the internet at: http://victortechnologies.com/IM_Uploads/DocLib_5849_XT-301%20Torch%20for%20use%20w%20Merlin%201000%20Brochure%20(63-2524)_Nov2005.pdf: Thermadyne.

Trumpf Inc., "TruLaser: Cost-effective cutting through thick and thin", Retrieved from the internet at: http://www.us.trumpf.com/fileadmin/DAM/us.trumpf.com/Brochures/2D_Laser/TruLaser_US_10-12.pdf, printed Oct. 26, 2016, 32 pages.

Welding Magazine, "Plasma cutting system for mild steel", Oct. 2008, p. 34 retrieved from the internet at: http://search.proquest.com/professional/printviewfile?accountid=157282.

Welding Magazine, "Plasma cutting systems and products: new and or upgraded plasma cutting systems and torches have been designed to offer increased flexibility and to boost performance and productivity". Retrieved from the internet at: http://search.proquest.com/professional/printviewfile?accountid=157282, Apr. 2007, pp. 36-38.

\* cited by examiner

CARTRIDGE FOR A LIQUID-COOLED PLASMA ARC TORCH

CROSS REFERENCE TO RELATED APPLICATION

This application is a continuation of U.S. patent application Ser. No. 15/228,750, filed on Aug. 4, 2016, which claims the benefit of and priority to U.S. Provisional Patent Application No. 62/200,913, filed Aug. 4, 2015. The entire contents of these applications are owned by the assignee of the instant application and incorporated herein by reference in their entireties.

TECHNICAL FIELD

The present invention generally relates to cartridges for a liquid-cooled plasma arc torch, and more particularly, to one or more replaceable, low-cost cartridges having integrated components.

BACKGROUND

Thermal processing torches, such as plasma arc torches, are widely used for high temperature processing (e.g., heating, cutting, gouging and marking) of materials. A plasma arc torch generally includes a torch head, an electrode mounted within the torch head, an emissive insert disposed within a bore of the electrode, a nozzle with a central exit orifice mounted within the torch head, a shield, electrical connections, passages for cooling, passages for arc control fluids (e.g., plasma gas) and a power supply. A swirl ring can be used to control fluid flow patterns in the plasma chamber formed between the electrode and the nozzle. In some torches, a retaining cap is used to maintain the nozzle and/or swirl ring in the plasma arc torch. In operation, the torch produces a plasma arc, which is a constricted jet of an ionized gas with high temperature and sufficient momentum to assist with removal of molten metal. Gases used in the torch can be non-reactive (e.g., argon or nitrogen), or reactive (e.g., oxygen or air).

Existing plasma cutting systems include a large array of separate consumables available for use with different currents and/or operating modes that are repeatedly assembled and disassembled in the field by a user to perform thermal processing operations. The large number of consumable options requires large part counts and inventories for users, and can confuse users and increase the possibility of installing incorrect consumables. The large number of consumable options can also cause lengthy torch setup time(s) and make it difficult to transition among cutting processes that require different arrangements of consumables in the torch that is often performed in the field one component at a time. For example, before a cutting operation, selecting and installing the correct set of consumables for a particular cutting task can be burdensome and time-consuming. Furthermore, selection, assembly, and installation of these components in the field can cause alignment issues or compatibility issues when old components are used with new components. During torch operation, existing consumables can experience performance issues such as failing to maintain proper consumable alignment and spacing. Furthermore, current consumables include substantial amounts of expensive materials (e.g., Vespel™) and often require a relatively complex manufacturing process, which leads to significant manufacturing costs and inhibits their widespread commercialization, production and adoption. What is needed is a new and improved consumable platform for liquid-cooled plasma arc torches that decreases manufacturing costs and time, decreases part count, increases system performance (e.g., component alignment, cut quality, consumable life, variability/versatility, etc.), and eases installation and use of consumables by end users.

SUMMARY

The present invention provides one or more integrated, cost-effective cartridge designs for a liquid-cooled plasma arc torch. Generally, because a cartridge includes a suite of two or more consumable components, it provides ease of use and shortens the time for installation into a plasma arc torch in comparison to installing/replacing each consumable component individually. Using a consumable cartridge also reduces the possibility of an operator putting in the wrong consumable parts, contaminating the parts during installation and/or placing a weak or bad part back onto the torch by accident. These advantages eliminate the need for experienced operators to operate the resulting liquid-cooled plasma arc torches. In addition, the use of a cartridge in a liquid-cooled torch improves component alignment, cut consistency and cut quality experience. Further, using consumable cartridges enhance suppliers' experience as fewer consumable parts need to be inventoried and stocked. In some cases, a supplier can buy back used cartridges and recycle components for other uses. However, manufacturing and material costs can prohibit the widespread commercialization and production of cartridges. The present invention solves this problem by providing one or more cost effective cartridge designs that facilitate cartridge commercialization and production and improve their installation.

In one aspect, the present invention features a consumable cartridge frame for a liquid-cooled plasma arc torch, the consumable cartridge frame includes an insulator body configured to be disposed between a torch head and a cartridge tip, a first cooling channel, disposed in the body, configured to conduct a first fluid flow received from the torch head to contact a component of the cartridge tip connected to the cartridge frame, and a first return channel, disposed in the body, configured to conduct at least a portion of the first fluid flow from the component to the torch head. The first cooling channel and the first return channel are non-concentric in relation to a central longitudinal axis of the body.

In some embodiments, the consumable cartridge frame further includes a torch engagement feature configured to radially secure the cartridge tip to the torch head in a predetermined orientation. The first cooling channel can be configured to substantially align with a corresponding first cooling channel of the torch head when the cartridge tip is radially secured to the torch head via the torch engagement feature. The first liquid cooling channel can be adapted to conduct a cooling liquid from the torch head into the cartridge tip. The first return channel can be configured to substantially align with a corresponding first return channel of the torch head when the cartridge tip is radially secured to the torch head via the torch engagement feature. The first return channel can be adapted to return the cooling liquid from the cartridge tip into the torch head.

In some embodiments, the consumable cartridge frame further includes a central channel disposed in the insulator body and concentric with respect to the central longitudinal axis of the insulator body, the central channel configured to perform at least one of (i) conduct the first fluid flow from the torch head to an electrode or (ii) pass an electrical current from the torch head to the electrode. The consumable cartridge frame can further include a second cooling channel, disposed in the insulator body, configured to conduct at least a portion of the first fluid flow received from the torch head to contact a second component of the cartridge tip different from the first component and a second return channel, disposed in the insulator body, configured to conduct at least a portion of the first fluid flow from the second component to the torch head. The second cooling channel and the second return channel can be non-concentric in relation to the central longitudinal axis of the insulator body.

In some embodiments, the consumable cartridge frame further includes at least one gas channel, disposed in the insulator body, configured to conduct a second fluid flow to a second component of the cartridge tip. The at least one gas channel is non-concentric with respect to the central longitudinal axis of the insulator body. The second fluid flow can comprise a plasma gas flow or a shield gas flow. The second component can comprise one of a nozzle or shield.

In some embodiments, the first fluid flow comprises a liquid coolant flow. In some embodiments, the component of the cartridge tip comprises one of a nozzle or shield. In some embodiments, the first cooling channel and the first return channel extend longitudinally from a proximal region to a distal region of the insulator body and are non-overlapping.

In another aspect, a cartridge frame for a liquid-cooled plasma arc torch cartridge consumable is provided. The cartridge frame includes a cartridge frame body having a central region, an internal surface, an external surface, a proximal portion and a distal portion, where the cartridge frame body is at least substantially made of a non-conductive material. The cartridge frame also includes a torch engagement interface surface located at the proximal portion of the cartridge frame body, the torch engagement interface surface configured to engage a torch head. The cartridge frame further includes a plurality of component alignment features formed in the central region and a plurality of channels between the proximal portion and the distal portion. The plurality of channels are located offset from a central axis of the central region. The plurality of channels are configured to direct liquid and gas through the cartridge frame.

In some embodiments, one or more of the component alignment features are configured to align a nozzle to the internal surface of the cartridge frame and matingly engage the nozzle to the internal surface. The one or more component alignment features can comprise one or more steps configured to axially align and matingly engage the nozzle to the cartridge frame. The one or more component alignment features can comprise a varying diameter along a section of the internal surface of the cartridge frame to radially align and matingly engage the nozzle to the cartridge frame. In some embodiments, one or more of the component alignment features are configured to align a shield to the external surface of the cartridge frame and matingly engage the shield to the external surface.

In some embodiments, the plurality of channels comprises a shield gas channel configured to provide a metered shield gas flow therethrough. The cartridge frame can further include a baffle and a shield swirl ring disposed at the distal portion of the cartridge frame body. The baffle and the shield swirl ring can be in fluid communication with the shield gas channel to adjust at least one parameter of the shield gas flow therethrough.

In some embodiments, the cartridge frame further includes an opening on the internal surface of the cartridge frame. The plurality of channels include a coolant channel configured to supply a liquid coolant to a nozzle, and the opening is in fluid communication with the coolant channel to conduct the liquid coolant away from the nozzle. In some embodiments, the cartridge frame further includes an opening on the external surface of the cartridge frame. The plurality of channels include a coolant channel configured to supply a liquid coolant to a shield, and the opening is in fluid communication with the coolant channel to conduct the liquid coolant away from the shield.

In some embodiments, the cartridge frame further includes a vent passage extending from the internal surface to the external surface of the cartridge frame.

In another aspect, a consumable cartridge for a liquid-cooled plasma arc torch is provided. The consumable cartridge includes a body portion having a distal region and a proximal region, a tip portion located at the distal region the tip portion including a plasma emitter and a plasma arc constrictor, and two or more non-concentric channels extending from the proximal region to the tip portion in the distal region of the body.

In some embodiments, the two or more non-concentric channels are disposed in a cartridge frame made of an insulator material. In some embodiments, the cartridge frame forms an interface between the tip portion and a torch head.

In some embodiments, the tip portion comprises at least one of a nozzle, a shield or an electrode. In some embodiments, the two or more non-concentric channels include (i) a first set of channels including a coolant channel and a return channel in fluid communication with the nozzle to supply a liquid coolant to and from the nozzle and (ii) a second set of channels including a coolant channel and a return channel in fluid communication with the shield to supply at least a portion of the liquid coolant to and from the shield. In some embodiments, the two or more non-concentric channels include a plasma gas channel to supply a plasma gas to a passage between a swirl ring and the nozzle. In some embodiments, the two or more non-concentric channels include a shield gas channel to supply a shield gas to a passage between the shield and the nozzle. In some embodiments, the consumable cartridge further includes a central channel in fluid communication with the electrode, where the central channel is configured to pass at least one of a liquid coolant or an electrical current to the electrode.

In another aspect, a consumable cartridge frame for a liquid-cooled plasma arc torch is provided. The consumable cartridge frame includes a first interface configured to connect to a torch head of the plasma arc torch, and a second interface spaced axially relative the first surface along a longitudinal axis of the consumable, where the second interface is configured to connect to a plurality of components including at least a nozzle, a shield, an electrode, and a swirl ring. The consumable cartridge frame further includes a body portion extending along the longitudinal axis to connect the first interface with the second interface. The body portion includes a plurality of channels configured to convey liquid and gas between the torch head and the plurality of components through the first interface and the second interface.

In some embodiments, the first interface includes an alignment feature configured to radially secure to the torch head in a predetermined orientation. The plurality of channels can be adapted to align with corresponding channels in the torch head in the predetermined orientation to convey liquid and gas between the torch head and the plurality of components. In some embodiments, two or more of the plurality of channels are non-concentric.

In some embodiments, the second interface comprises (i) at least one step on an internal surface of the consumable cartridge frame to matingly engage and axially align the nozzle to the cartridge frame and (ii) at least one section of the internal surface of the consumable cartridge frame with varying diameter to matingly engage and radially align the nozzle to the cartridge frame. The second interface can also include alignment features configured to axially and radially align the shield with the cartridge frame and matingly engage the shield to the cartridge frame. The alignment features can comprise at least one of a step or a mating section on an external surface of the consumable cartridge.

In some embodiments, the consumable cartridge frame can further include a cavity disposed in the body portion adjacent to the first interface. The cavity is configured to receive a radio-frequency identification (RFID) tag for communicating with a reader device of the torch head.

In yet another aspect, a cartridge frame for a liquid cooled plasma arc torch cartridge consumable is provided. The cartridge frame includes a cartridge frame body having a proximal portion, a distal portion, an exterior surface, and an internal opening to a central channel in the cartridge frame body. The cartridge frame also includes a shield gas channel extending from the proximal portion of the cartridge frame body to the distal portion of the cartridge frame body, a nozzle coolant supply channel extending from the proximal portion of the cartridge frame body to the internal opening, and a nozzle coolant return channel extending from the internal opening of the cartridge frame body to the proximal portion. The cartridge frame further includes a circumferential coolant flow channel in the exterior surface of the cartridge frame body, a shield coolant supply channel extending from the proximal portion to the circumferential coolant flow channel, and a shield coolant return channel extending from the circumferential coolant flow channel to the proximal portion.

In yet another aspect, a liquid-cooled consumable cartridge for a plasma arc torch is provided. The cartridge includes (i) an electrode, (ii) a swirl ring with a first outer retaining feature and a second outer retaining feature on an exterior surface, where the electrode is secured to the swirl ring, and (iii) a nozzle with an inner retaining feature on an interior surface, where the inner retaining feature of the nozzle is mated with the first outer retaining feature of the swirl ring. The cartridge also includes a cartridge frame with an inner retaining feature on an interior surface and an outer retaining feature on an exterior surface. The inner retaining feature of the cartridge frame is mated with the second outer retaining feature of the swirl ring. The cartridge further includes a shield with an inner retaining feature on an interior surface mated with the outer retaining feature of the cartridge frame. At least the nozzle, the swirl ring, the cartridge frame and the shield are axially secured in a predetermine position upon mating with each other to provide at least one liquid flow path from the cartridge frame to the shield or the nozzle.

In some embodiments, the electrode and the nozzle are axially and radially aligned relative to each other without physical contact between the electrode and the nozzle. In some embodiments, the nozzle and the shield are axially and radially aligned relative to each other without physical contact between the nozzle and the shield.

In some embodiments, at least one of the shield, the nozzle, or the swirl ring mates directly with the cartridge frame. The electrode can be indirectly mated with the cartridge frame via at least one of the swirl ring or an electrode insulator.

In some embodiments, mating between the inner retaining feature of the nozzle and the first outer retaining feature of the swirl ring radially aligns the nozzle with the swirl ring. In some embodiments, mating between the inner retaining feature of the cartridge frame and the second outer retaining feature of the swirl ring provides at least one of axial or radial alignment between the cartridge frame and the swirl ring. In some embodiments, mating between an inner retaining feature of the shield and the outer retaining feature of the cartridge frame provides at least one of axial or radial alignment between the cartridge frame and the shield. In some embodiments, the cartridge frame further comprises a second inner retaining feature on the interior surface configured to be mated with an outer retaining feature on an outer surface of the nozzle. The mating between the cartridge frame and the nozzle provides at least one of axial or radial alignment between the cartridge frame and the nozzle.

In some embodiments, the nozzle is a non-vented nozzle coupled to a nozzle jacket. In some embodiments, the nozzle is a vented nozzle coupled to a nozzle liner.

In yet another aspect, a liquid-cooled consumable cartridge for a plasma arc torch is provided. The cartridge includes (i) an electrode, (ii) a swirl ring with an outer retaining feature on an exterior surface and an inner retaining feature on an interior surface, where the electrode is secured to the inner retaining surface of the swirl ring, and (iii) a nozzle with an outer retaining feature on an outer surface. The cartridge also includes a cartridge frame with a first inner retaining feature and a second inner retaining feature on an interior surface and an outer retaining feature on an exterior surface. The first inner retaining feature of the cartridge frame is mated with the outer retaining feature of the swirl ring and the second inner retaining feature of the cartridge frame is mated with the outer retaining feature of the nozzle. The cartridge further includes a shield with an inner retaining feature on an interior surface mated with the outer retaining feature of the cartridge frame. At least the nozzle, the swirl ring, the cartridge frame and the shield are axially secured in a predetermined position upon mating.

In yet another aspect, a consumable cartridge for a liquid-cooled plasma arc torch is provided. The consumable cartridge includes a non-conductive cartridge frame, and a set of conductive consumable components defining, in part, a plasma plenum. The set of conductive components are affixed to the cartridge frame. The consumable cartridge is composed of at least 50% non-conductive material by volume. In some embodiments, the consumable cartridge is composed of about 60% to about 80% non-conductive material by volume.

In some embodiments, the consumable cartridge is a single use cartridge. The set of conductive consumable components may not be individually disposable or serviceable after being affixed to the cartridge frame.

In some embodiments, the cartridge frame comprises liquid and gas channels in fluid communication with the set of conductive components. The liquid and gas channels are non-concentric in relation to a central longitudinal axis of the cartridge frame.

In some embodiments, the set of conductive consumable components comprises a shield, a nozzle and an electrode.

In another aspect, a method of manufacturing a unitary consumable cartridge from a plurality of components is provided. The method includes axially and radially securing an electrode to a swirl ring, axially and radially securing a retaining feature on an outer surface of the swirl ring to at least one of a mated retaining feature on an inner surface of a cartridge frame or a nozzle, and axially and radially securing a retaining feature on an outer surface of the cartridge frame to a mated retaining feature on an inner surface of a shield. The axial and radial securing of the consumable components relative to each other positions at least one internal fluid channel of the cartridge frame with (i) a fluid passage of the nozzle or (ii) a fluid passage of the shield.

In some embodiments, axially and radially securing an electrode to a swirl ring comprises axially and radially securing the electrode to an electrode insulator and axially and radially securing the electrode insulator to the swirl ring.

In some embodiments, the method further comprises radially aligning a plasma gas channel within the cartridge frame with a gas passage between the swirl ring and the nozzle. In some embodiments, the method further comprises radially aligning a shield gas channel within the cartridge frame with a gas passage between the nozzle and the shield. In some embodiments, the method further comprises radially aligning a central channel within the cartridge frame with the electrode. In some embodiments, the method further comprises radially aligning a first coolant channel and a second coolant channel within the cartridge frame with the nozzle, and radially aligning a third coolant channel and a fourth coolant channel within the cartridge frame with the shield.

In some embodiments, the method further comprises forming the swirl ring through die cast using zinc. In some embodiments, the method further comprises forming the cartridge frame through molding using a non-conductive material. In some embodiments, the method further comprises forming the shield through stamping using a conductive material. In some embodiments, the axial and radial securing of the plurality of components is through one or more of snap fit, press fit or interference, crimping, gluing, cementing or welding.

In another aspect, a method of assembling a liquid cooled consumable cartridge for a plasma arc cutting torch is provided. The method includes providing an insulator cartridge frame having a central region, an outer surface, a distal end, and a proximal end. The method further includes coupling a swirling component to the cartridge frame in the central region, coupling an electrode to the cartridge frame in the central region, coupling a nozzle to the cartridge frame in the central region, and coupling a shield to the cartridge frame at the outer surface.

In some embodiments, coupling a swirling component to the cartridge frame comprises mating an exterior surface of the swirling component to an interior surface of the cartridge frame that provides at least one of axial or radial alignment of the swirling component to the cartridge frame. In some embodiments, coupling a nozzle to the cartridge frame comprises coupling an exterior surface of the nozzle to an interior surface of the cartridge frame that provides at least one of axial or radial alignment of the nozzle to the cartridge frame. In some embodiments, coupling a shield to the cartridge frame at the outer surface provides at least one of axial or radial alignment of the shield to the cartridge frame. In some embodiments, the method further comprises coupling the electrode to the cartridge frame via at least one of the swirling component and an electrode insulator. In some embodiments, the coupling aligns at least one internal fluid channel of the cartridge frame with (i) a fluid passage of the nozzle or (ii) a fluid passage of the shield.

In some embodiments, the method further comprises disposing a baffle and a second swirling component at a distal end of the cartridge frame in the central region.

A consumable cartridge for a liquid-cooled plasma arc torch is provided. The consumable cartridge comprises a cartridge frame including a proximal end having an end surface, a distal end and a body having a central longitudinal axis extending therethrough. The cartridge configured to form a radio-frequency identification (RFID) interface with a torch head. The consumable cartridge also comprises an arc emitter and an arc constrictor affixed to the cartridge frame at the distal end and an RFID mounting feature formed on or in the cartridge frame adjacent to the end face. The RFID mounting feature is non-concentric with the central longitudinal axis of the body. The consumable cartridge further comprises an RFID tag disposed in or on the RFID mounting feature for transmitting information about the cartridge to a reader device in the torch head when the cartridge is connected to the torch head, and a clocking feature configured to rotationally align the RFID tag to the reader device in the torch head upon connection of the cartridge to the torch head.

In some embodiments, the RFID mounting feature comprises a cavity disposed in the body of the cartridge frame. The RFID tag can be embedded in the cavity of the body of the cartridge frame and surrounded by an insulator material of the body. In some embodiments, the end surface is substantially planar to allow an RFID reader to interrogate the RFID tag from outside of the plasma arc torch. In some embodiments, the RFID tag is readable from inside or outside of the plasma arc torch.

In some embodiments, the body of the cartridge frame is constructed from an insulator material. In some embodiments, the body of the cartridge frame comprises at least one channel for conducting a liquid coolant therethrough. The at least one channel can be configured to substantially align with a corresponding channel of the torch head upon the rotational alignment by the clocking feature to conduct the liquid coolant between the torch head and the cartridge.

In some embodiments, upon the rotational alignment, the RFID tag in the cartridge frame and the reader device in the torch head are oriented such that a central axis extends through a centerline of the RFID tag and a centerline of the reader device. In some embodiments, upon the rotational alignment, a first distance between the RFID tag and the reader device is less than a second distance between the RFID tag and adjacent metallic material disposed in the torch head or the cartridge.

In some embodiments, the clocking feature comprises a cavity configured to receive a clocking pin extending from the torch head.

In yet another aspect, a consumable cartridge for a liquid-cooled plasma arc cutting torch is provided. The consumable cartridge includes a cartridge tip located at a first portion of the cartridge. The cartridge tip has an electrode, a nozzle, and a shield. The consumable cartridge includes a plasma gas inlet opening at a second portion of the consumable cartridge, a shield gas inlet opening at the second portion, an electrode coolant inlet opening at the second portion, a nozzle coolant inlet opening and a nozzle coolant outlet opening at the second portion, and a shield coolant inlet opening and a shield coolant outlet opening at the second portion.

In some embodiments, the second portion comprises an end face of a proximal portion of the cartridge. The end face can be substantially planar.

In some embodiments, the plasma gas inlet opening, the shield gas inlet opening, the nozzle coolant inlet opening, the nozzle coolant outlet opening, the shield coolant inlet opening and the shield coolant outlet opening are non-concentric relative to a central longitudinal axis of the cartridge.

In some embodiments, the plasma gas inlet opening is configured to align with a corresponding opening of a torch head to direct a plasma gas flow from the torch head to the nozzle. In some embodiments, the shield gas inlet opening is in fluid communication with the shield. The shield gas inlet opening is configured to align with a corresponding opening of a torch head to direct a shield gas flow to the shield. In some embodiments, the electrode coolant inlet opening maintains at least one of electrical or fluid communication with the electrode. The electrode coolant inlet opening is configured to align with a corresponding opening of a torch head to direct at least one of a liquid coolant or a current to the electrode. In some embodiments, the nozzle coolant inlet opening and the nozzle coolant outlet opening are in fluid communication with the nozzle. The nozzle coolant inlet opening and the nozzle coolant outlet opening are configured to align with respective ones of corresponding openings on the torch head to direct the liquid coolant between the torch head and the nozzle. In some embodiments, the shield coolant inlet opening and the shield coolant outlet opening are in fluid communication with the shield. The shield coolant inlet opening and the shield coolant outlet opening are configured to align with respective ones of corresponding openings on the torch head to direct the liquid coolant between the torch head and the shield. In some embodiments, the nozzle coolant outlet opening is fluidly connected to the shield coolant inlet opening.

In some embodiments, the consumable cartridge further comprises a clocking pin receptacle at the second portion. The clocking pin receptacle is configured to receive a clocking pin of a torch head to radially secure the cartridge to the torch head in a predetermined orientation.

In some embodiments, the consumable cartridge further comprises a cartridge frame having an insulator body. The cartridge frame is coupled to the cartridge tip. The plasma gas inlet opening, the shield gas inlet opening, the electrode coolant inlet opening, the nozzle coolant inlet opening, the nozzle coolant outlet opening, the shield coolant inlet opening and the shield coolant outlet opening are located at a proximal end of the insulator body. In some embodiments, the consumable cartridge further comprises a non-concentric cavity disposed in the insulator body of the cartridge frame and a radio-frequency identification (RFID) tag disposed in the cavity.

In yet another aspect, a consumable cartridge for a liquid-cooled plasma arc cutting torch is provided. The consumable cartridge includes a cartridge tip located at a first portion of the cartridge. The cartridge tip has an electrode, a nozzle, and a shield. The consumable cartridge also includes a cartridge frame at a second portion of the cartridge. The cartridge frame comprises a distal end connected to the cartridge tip and a proximal end. The cartridge frame includes a plasma gas inlet opening at the proximal end configured to maintain fluid communication with the nozzle to introduce a plasma gas flow to the nozzle, a shield gas inlet opening at the proximal end configured to maintain fluid communication with the shield to introduce a shield gas flow to the shield, and an electrode interface at the proximal end configured to maintain at least one of electrical or fluid communication with the electrode to introduce at least one of a coolant flow or electrical current to the electrode. The cartridge frame further includes a nozzle coolant inlet opening and a nozzle coolant outlet opening at the proximal end configured to circulate the coolant flow between the cartridge frame and the nozzle and a shield coolant inlet opening and a shield coolant outlet opening at the proximal end configured to circulate the coolant flow between the cartridge frame and the shield.

In another aspect, a torch head for a liquid-cooled plasma arc torch is provided. The torch head includes a torch body and a torch insulator having a substantially non-conductive insulator body. The torch insulator is coupled to the torch body. The torch insulator includes (i) a first liquid coolant channel, disposed within the insulator body, configured to conduct a fluid flow from the torch head into a consumable cartridge along a first preexisting flow path, (ii) a first liquid return channel, disposed within the insulator body, configured to return at least a portion of the fluid flow from the cartridge to the torch head along the first preexisting flow path, and (iii) a gas channel, disposed within the insulator body, configured to conduct a first gas flow from the torch head to the cartridge along a second preexisting flow path. The first and second preexisting flow paths are fluidly isolated from each other.

In some embodiments, the torch head further comprises an alignment feature configured to radially secure the torch head to the cartridge in a predetermined orientation to maintain the first and second preexisting flow paths extending through the torch insulator and the cartridge. The first liquid coolant channel can be configured to substantially align with a corresponding first liquid coolant channel of the cartridge when the torch head is radially secured to the cartridge via the alignment feature. The first liquid return channel can be configured to substantially align with a corresponding first liquid return channel of the cartridge when the torch head is radially secured to the cartridge via the alignment feature. The first preexisting flow path can comprise the first liquid coolant channel of the torch head, the corresponding first liquid coolant channel of the cartridge, the corresponding first liquid return channel of the cartridge and the first liquid return channel of the torch head.

In some embodiments, the torch insulator further comprises a gas valve embedded in the insulator body, the gas valve in fluid communication with the gas channel, the gas valve configured to select one of a plurality of gases for supply to the gas channel. In some embodiments, the torch insulator further comprises a second gas channel, disposed within the insulator body, configured to conduct a second gas flow from the torch head to the cartridge along a third preexisting flow path. The second and third preexisting flow paths are fluidly isolated from each other. In some embodiments, the torch insulator further comprises a central channel disposed in the insulator body, the central channel configured to provide at least one of (i) a current or (ii) at least a portion of the fluid flow from the torch head to the cartridge. In some embodiments, the torch insulator further comprises an electrical channel disposed in the insulator body, the electrical channel configured to receive an ohmic contact connection that establishes an ohmic contact between the torch head and the cartridge.

In some embodiments, the torch insulator further comprises (i) a current ring at a distal end of the insulator body, the current ring configured to receive a pilot arc current from the cartridge, and (ii) a pilot arc channel configured to receive a pilot arc connection that is in electrical communication with the current ring to pass the pilot arc current from the cartridge to the torch head.

In some embodiments, the torch insulator further comprises (i) a second liquid coolant channel, disposed within the insulator body, configured to conduct at least a portion of the fluid flow from the torch head into the cartridge along the first preexisting flow path, (ii) a second liquid return channel, disposed within the insulator body, configured to return at least a portion of the fluid flow from the cartridge to the torch head along the first preexisting flow path, and (iii) a distribution channel, disposed within the insulator body, connecting the first liquid return channel with the second liquid coolant channel. The first preexisting flow path can flow over a sequence of channels in the insulator body comprising the first liquid coolant channel, the first liquid return channel, the distribution channel the second liquid coolant channel, and the second liquid return channel.

In some embodiments, the first liquid coolant channel, the first liquid return channel and the gas channel are non-concentric with respect to a longitudinal axis extending through the insulator body.

In another aspect, a torch head for a liquid-cooled plasma arc torch is provided. The torch head includes (i) a torch insulator having an insulator body, (ii) a first cooling channel and a third cooling channel, disposed in the insulator body, each configured to conduct a first fluid flow from the torch head into a cartridge, (iii) a second cooling channel and a fourth cooling channel, disposed in the insulator body, each configured to return at least a portion of the first fluid flow from the cartridge to the torch head, and (iv) a first distribution channel, disposed in the insulator body, connecting the second cooling channel and the third cooling channel. The first distribution channel is configured to direct the first fluid flow from the second channel to the third channel.

In some embodiments, the first distribution channel is circumferentially oriented to connect the second cooling channel and the third cooling channel. In some embodiments, the first, the second, the third and the fourth cooling channels are non-concentric about a longitudinal axis extending through the insulator body. In some embodiments, each of the first, the second, the third and the fourth cooling channels are asymmetric with respect to a central longitudinal axis extending through the insulator body.

In yet another aspect, a torch head for a liquid-cooled plasma arc torch is provided. The torch head includes (i) a torch insulator having an insulator body including a proximal end and a distal end, (ii) a plurality of gas and liquid channels extending substantially from the proximal end to the distal end of the insulator body, (iii) a cavity in the insulator body, and (iv) a communication device comprising a circuit board and a radio-frequency identification (RFID) antenna coil. The RFID antenna coil is electrically connected to the circuit board and positioned adjacent a distal end of the communication device. The communication device is located in the cavity such that the RFID antenna coil is positioned at the distal end of the insulator body.

In some embodiments, the communication device further comprises a sealed housing for preventing liquid from entering therein. In some embodiments, the circuit board of the communication device is configured to power the antenna coil and read an RFID signal received by the antenna coil. The antenna coil can be positioned at an end face of the distal end of the communication device. In some embodiments, the communication device further comprises a connector at a proximal end of the communication device.

In some embodiments, the plurality of gas and liquid channels and the cavity are non-concentric in relation to a central longitudinal axis of the insulator body.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

The present invention provides a liquid-cooled plasma arc torch that includes a torch head and a consumable cartridge. In some embodiments, the consumable cartridge is a unitary component where the components of the cartridge are not individually serviceable or disposable. Thus, if one component of the consumable cartridge needs to be replaced, the entire cartridge is replaced. In some embodiments, the consumable cartridge is a "single use" cartridge, where the cartridge is replaced by the operator after any of the components thereof reaches the end of its service life rather than repairing and replacing the individual consumables like in traditional torch designs. In some embodiments, the cartridge is replaced after a single session, which can involve multiple arcs. In some embodiments, the cartridge is replaced after a single arc event.

Figure 1A:
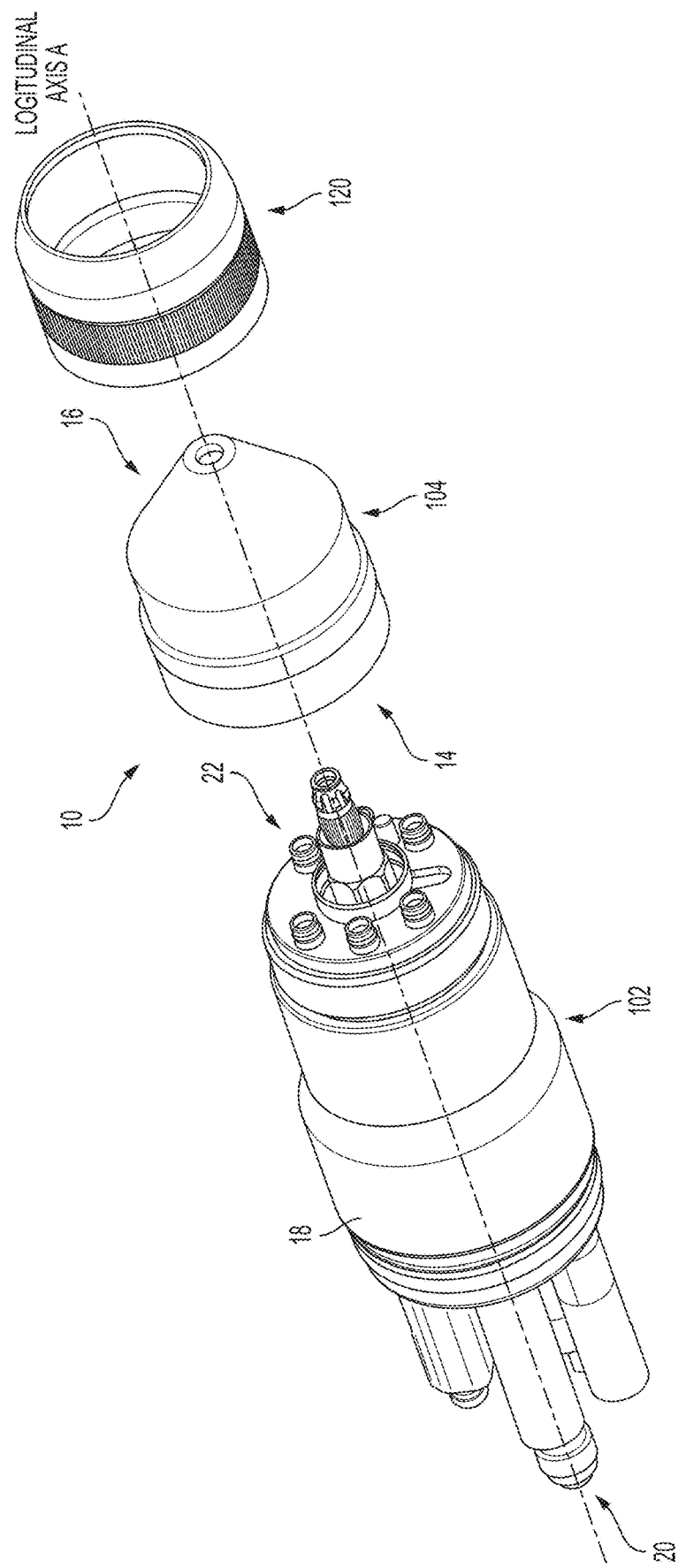
FIGS. 1a and 1b are exploded and assembled views, respectively, of a liquid-cooled plasma arc torch 10 generally comprising a torch head and a cartridge, according to an illustrative embodiment of the invention.
Figure 1B:
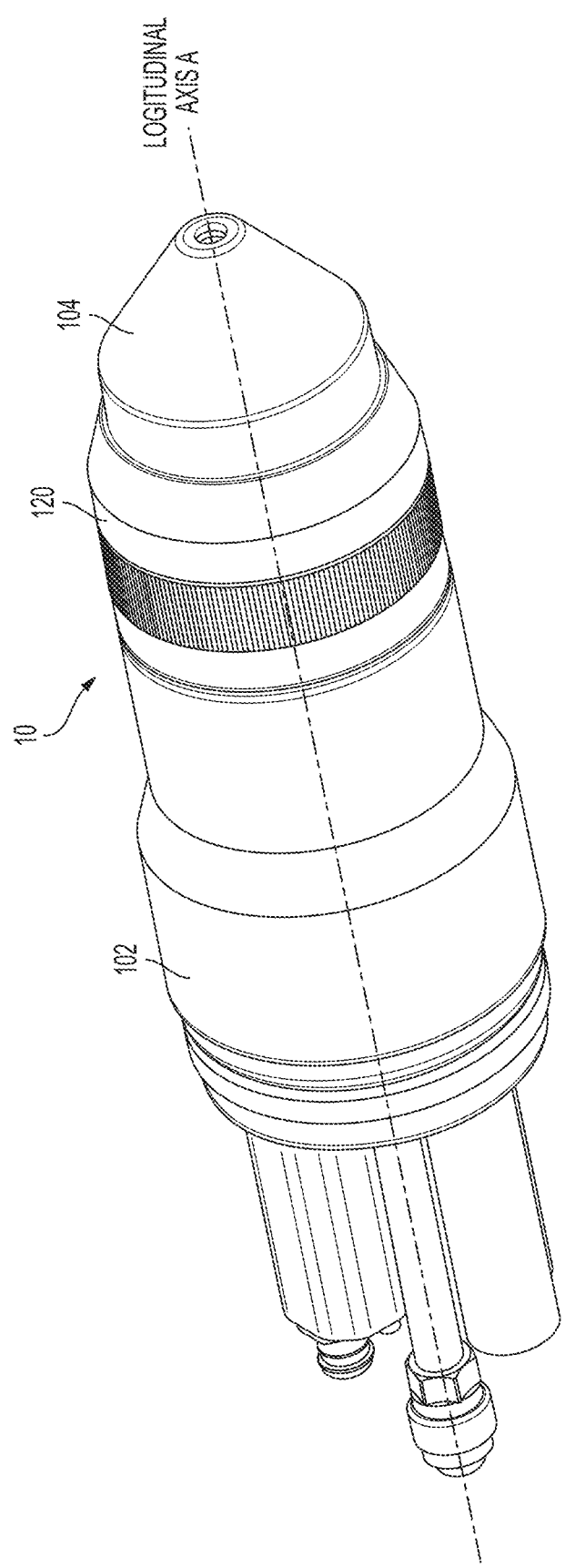

FIGS. 1a and 1b are exploded and assembled views, respectively, of a liquid-cooled plasma arc torch 10 generally comprising a torch head 102 and a cartridge 104, according to an illustrative embodiment of the invention. The cartridge 104, which comprises a plurality of consumable torch components, has a proximal end (region) 14 and a distal end (region) 16 along a central longitudinal axis A of the plasma arc torch 10. The torch head 102 includes a torch body 18, a proximal end (region) 20 and a distal end (region) 22 along the longitudinal axis A. The torch body 18 can be made of an electrically conductive material, such as brass. In some embodiments, the proximal end 14 of the cartridge 104 is aligned with and secured to the distal end 22 of the torch head 102 by a retaining cap 120. In some embodiments, the proximal end 14 of the cartridge 104 matingly engages/connects to the distal end 22 of torch 102. For example, the proximal end 14 and the distal end 22 can be connected via at least seven distinct mating joints/junctions/connection points. Other engagement means between the torch head 102 and cartridge 104 are possible, including threading, interference fit, snap fit, quick lock, etc.

Hereinafter, a proximal end of a component defines a region of the component along the longitudinal axis A that is away from a workpiece when the torch 10 is used to process the workpiece, and a distal end of the component defines a region of the component that is opposite of the proximal end and close to the workpiece when the torch 10 is used to process the workpiece.

Figure 2:
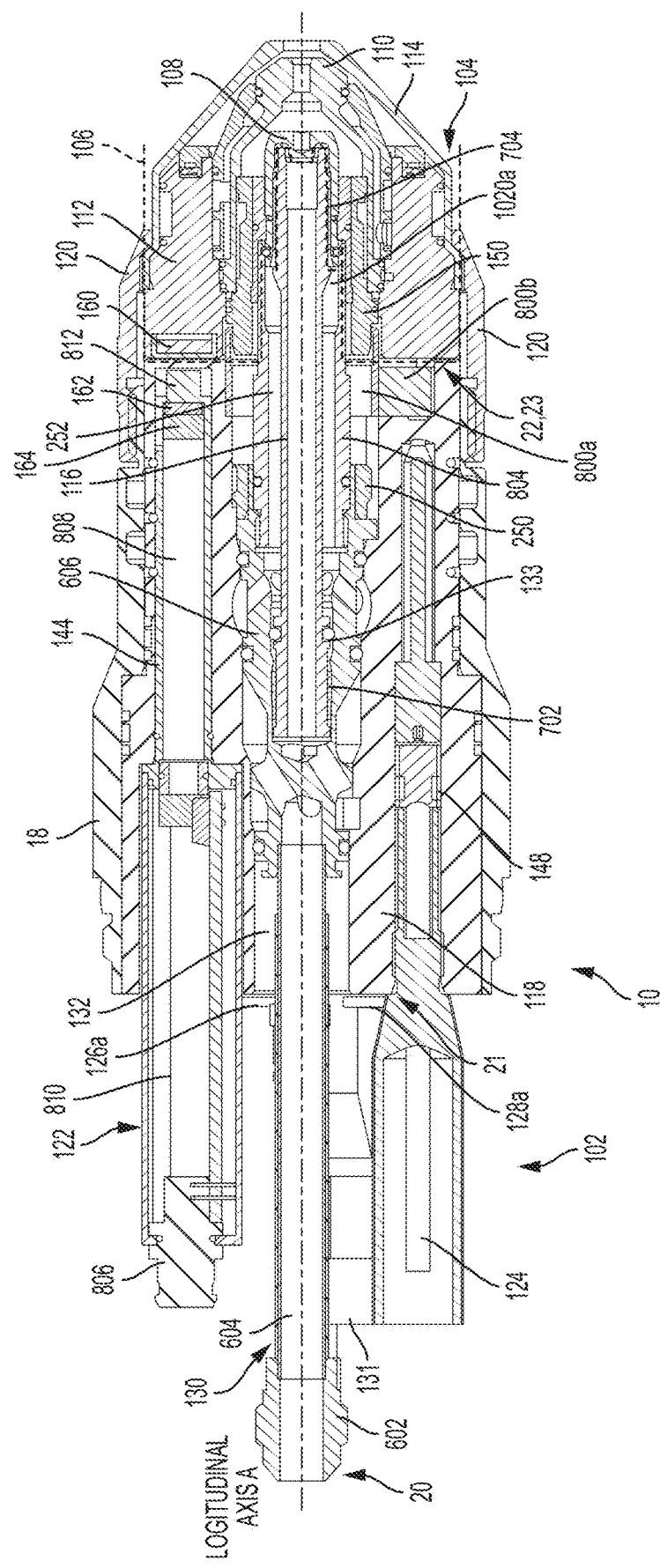
FIG. 2 is a cross-sectional view of the assembled plasma arc torch of FIG. 1b, according to an illustrative embodiment of the invention.

FIG. 2 is a cross-sectional view of the assembled plasma arc torch 10 of FIG. 1b, according to an illustrative embodiment of the invention. As shown, an interface 106 in FIG. 1 defines the boundary between the cartridge 104 and the torch head 102 after they are engaged to each other. The cartridge 104, which is a substantially unitary element, includes a cartridge tip comprising an electrode 108 (i.e., an arc emitter), a nozzle 110 (i.e., an arc constrictor) and a shield 114 disposed concentrically about the central longitudinal axis A. Components of the cartridge tip can be connected to a cartridge frame 112 of the cartridge 104. In some embodiments, the cartridge 104 also includes a swirl ring 150 disposed about the longitudinal axis A. Details regarding the cartridge 104 are explained below with reference to FIGS. 15 and 17-25. The torch head 102 includes a torch insulator 118 disposed in the torch body 18 about the longitudinal axis A. Details regarding the torch head 102 are explained below with reference to FIGS. 2-14b.

Torch Head

Figure 3:
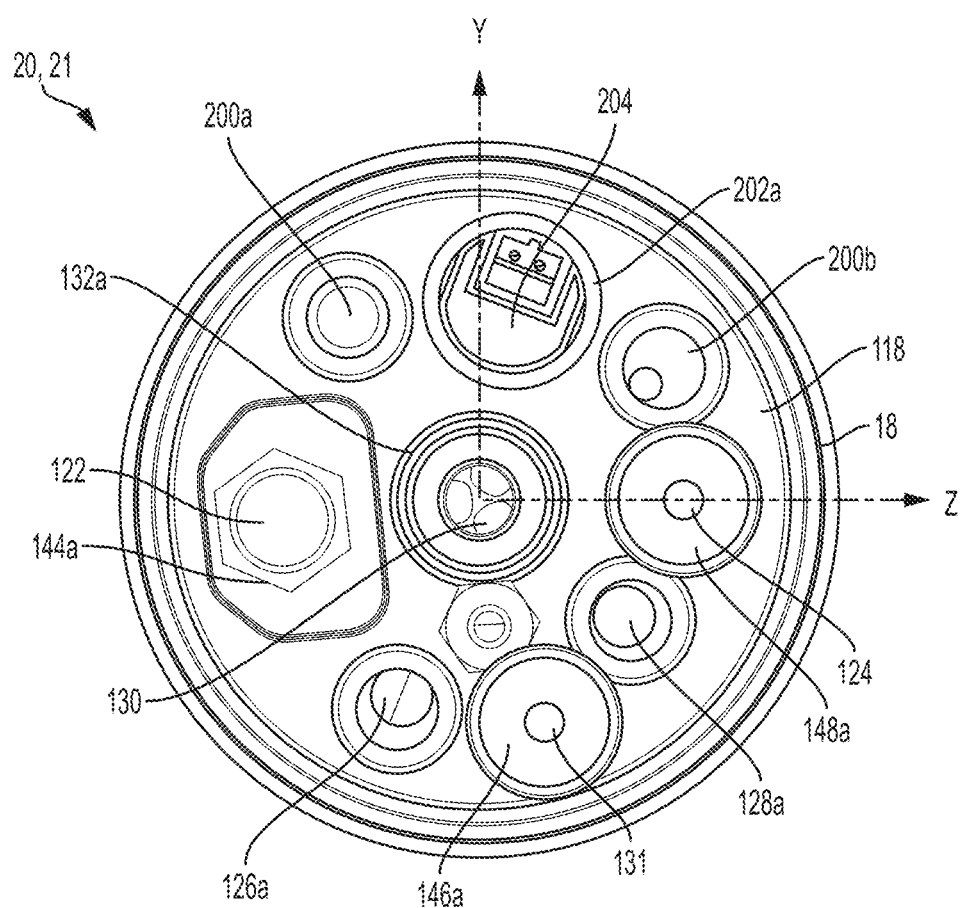
FIG. 3 is a view of the proximal end of the torch head of FIG. 1, according to an illustrative embodiment of the invention.
Figure 4:
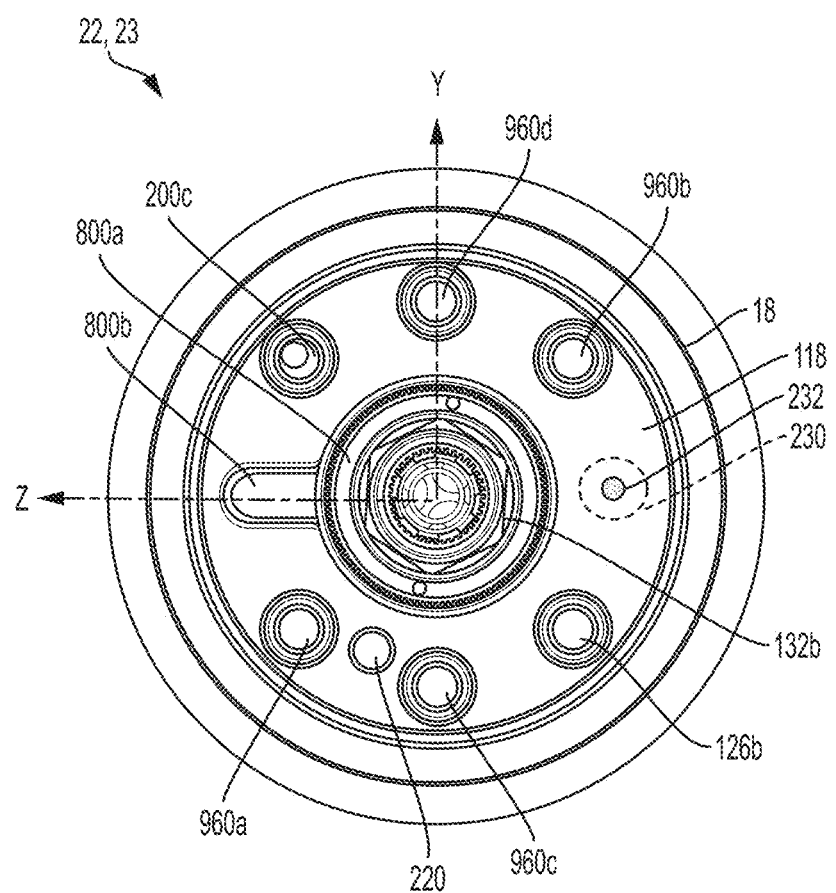
FIG. 4 is a view of the distal end of the torch head of FIG. 1, according to an illustrative embodiment of the invention.

As shown in FIG. 2, the torch insulator 118 of the torch head 102 is substantially disposed in and surrounded by the torch body 18 about the central longitudinal axis A. The torch body 18 can be made of an electrically conductive material, such as brass. The torch insulator 118, which include a proximal end 21 and a distal end 23, can be made of an electrically insulating material, such as plastic. The torch insulator 118, at its proximal end 21, can couple to one or more of a cathode 130, a communication device 122, a pilot arc connection 124 and an ohmic connection 131 while electrically insulating these components from each other and from the torch body 18. In some embodiments, at least one of the cathode 130, the communication device 122, the pilot arc connection 124, or the ohmic connection 131 is fixed to the torch insulator 118 (e.g., threaded to or embedded in the torch insulator 118) such that they cannot be easily or quickly disconnected from the torch insulator 118. In addition, the torch insulator 118 can include at least one gas opening 126a for coupling to a source of gas (not shown) and introducing the gas to the torch 10. The torch insulator 118 can further include at least one coolant opening 128a for coupling to a source of liquid coolant (not shown) and introducing the coolant to the torch 10. FIG. 3 is a view of the proximal end 20 of the torch head 102, which shows various electrical, gas and liquid openings at the proximal end 21 of the torch insulator 118, according to an illustrative embodiment of the invention. FIG. 4 is a view of the distal end 22 of the torch head 102, which shows various electrical, gas and liquid openings at the distal end 23 of the torch insulator 118, according to an illustrative embodiment of the invention.

a. Pilot Arc and Transferred Arc Connection

In one aspect, the torch insulator 118 can interconnect a plurality of components that are used to maintain a pilot arc current and/or a transferred arc current between the torch head 102 to the cartridge 104. For example, the torch insulator 118 is adapted to connect the cathode 130, a coolant tube 116, the pilot arc connection 124 and a current ring 800 in a configuration that supports both pilot arc current and transferred arc current conduction between the torch head 102 and the cartridge 104.

In some embodiments, the torch insulator 118 includes a main channel 132 (shown in FIG. 2) extending from an opening 132a at the proximal end 21 of the torch insulator 118 (shown in FIG. 3) to an opening 132b at the distal end 23 of the torch insulator 118 (shown in FIG. 4). The main channel 132 can be centrally located within the torch insulator 118 such that it is concentric with respect to the central longitudinal axis A. The main channel 132 can extend substantially straight within the insulator 118 to connect the openings 132a and 132b. The main channel 132 can be configured to house at least a portion of the cathode 130. As shown in FIG. 2, the cathode 130 can extend within the main channel 132 along the length of the torch insulator 118. In some embodiments, a cathode block locking component 250 is used to secure the cathode 130 to the main channel 132 inside of the torch insulator 118.

Figure 5:
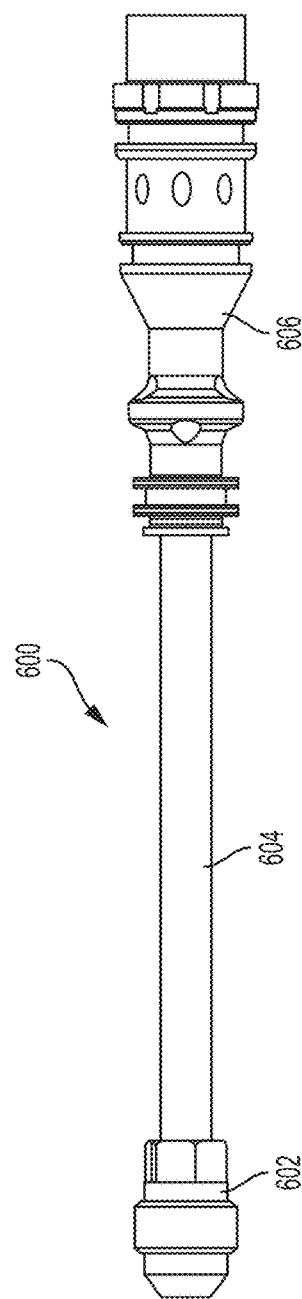
FIG. 5 is an exemplary design of the cathode of the torch head of FIG. 1, according to an illustrative embodiment of the invention.

FIG. 5 is an exemplary design of the cathode 130 of the torch head 102, according to an illustrative embodiment of the invention. The cathode 130 includes a cathode fitting 602 with a distal end coupled to a cathode tube 604, which has a distal end coupled to a cathode block 606. Each of the cathode fitting 602, the cathode tube 604 and the cathode block 606 can be made from a conductive material, such as brass or copper. In one exemplary design, the cathode fitting 602 and the cathode block 606 are made of brass, while the cathode tube 604 is made of copper.

As shown in FIG. 2, the distal end of the cathode block 606 can electrically and/or physically couple to the coolant tube 116 within the main channel 132 of the torch insulator 118. In some embodiments, the coolant tube 116 defines an o-ring groove that houses an o-ring 133 to form an interface between an outer surface of the coolant tube 116 and an inner surface of the cathode block 606. Thus, at least a proximal portion of the coolant tube 116 is inserted within the distal end of the cathode block 606. Generally, during operation the coolant tube 116 distributes a cooling fluid to the cartridge 104 once the torch head 102 is coupled to the cartridge 104. In some embodiments, the coolant tube 116 is configured to additionally pass a current from the cathode 130 to the cartridge 104, such as to the electrode 108 of the cartridge 104. In some embodiments, a cathode block electrode tube 252 (shown in FIG. 2), which can be made of a non-conductive material, can be configured to connect with (e.g., threaded into or sealed by interference fit) the cathode block 606 at its proximal end and with the electrode 108 at its distal end. The resulting housing, which comprises the cathode 130, the cathode block electrode tube 252 and the electrode 108, substantially encases the coolant tube 116 to contain the coolant flow therein.

Figure 6:
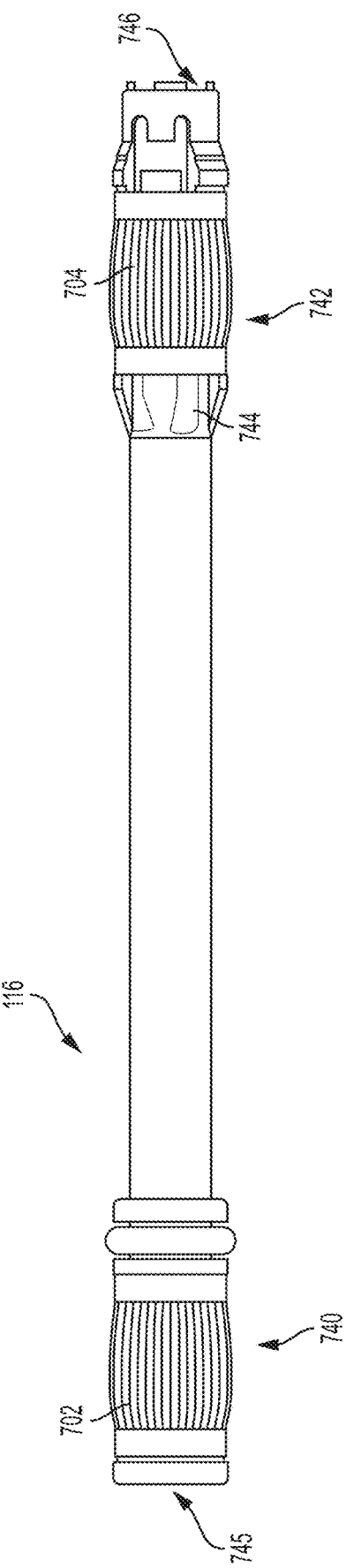
FIG. 6 is an exemplary design of the coolant tube of the torch head of FIG. 1, according to an illustrative embodiment of the invention.

FIG. 6 is an exemplary design of the coolant tube 116 of the torch head 102, according to an illustrative embodiment of the invention. The coolant tube 116 can be made of a conductive material, such as brass. In some embodiments, the coolant tube 116 is affixed (e.g., by threading) to the distal end of the cathode block 606 such that it cannot be easily or quickly disconnected. In some other embodiments, the coolant tube 116 is affixed (e.g., by an interference fit) to the distal end of the cathode block 606 such that it can be easily or quickly disconnected. The coolant tube 116 can have an electrical connector, such as a Louvertac™ band 702 around an external surface at a proximal end 740, which is the end that is configured to mate with the cathode block 606. The Louvertac band 702 is configured to conduct the cutting current carried from the interior surface of the cathode block 606 to the exterior surface of the coolant tube 116 once the proximal end 740 of the coolant tube 116 is inserted into and affixed to the distal end of the cathode block 606. Alternatively, the coolant tube 116 can be fixedly secured to the cathode 130 via threads or other current-carrying methods without the Louvertac band 702. In some embodiments, the coolant tube 116 has an electrical connector, such as a Louvertac™ band 704, around an exterior surface at a distal end 742 of the coolant tube 116, which is the end that is configured to mate with an internal surface of the electrode 108 once the torch head 102 is secured to the cartridge 104. In some embodiments, the coolant tube 116 includes one or more longitudinal channels 744 on its exterior surface below the Louvertac band 704 at the distal end 742 to limit a pressure drop in the coolant flow between the coolant tube 116 and the electrode 108. In addition to conducting electrical current, the coolant tube 116 can be configured to conduct a coolant flow to the electrode 108. For example, the coolant tube 116 has an opening 745 at its proximal end 740 and an opening 746 at its distal end 742 for allowing a coolant flow to enter and leave the coolant tube 116, respectively. In some embodiments, the use of a Louvertac™ band 702 or 704 at one of the distal end 742 or the proximal end 740 or at both ends allows the coolant tube 116 to be slidably coupled to the torch head 102 and likewise allows a cartridge 104 to be slidably coupled to the coolant tube 116. This feature is described below in detail.

In some embodiments, the torch insulator 118 includes a cavity 148 (shown in FIG. 2) with an opening 148a at the proximal end 21 of the torch insulator 118 (shown in FIG. 3). As shown in FIG. 2, the cavity 148 can be configured to house the pilot arc connection 124. In some embodiments, the cavity 148 extends partially into the torch insulator 118 along the longitudinal axis A.

Figure 9:
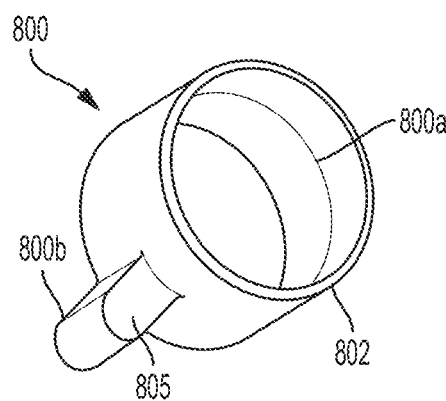
FIG. 9 is an exemplary design of the current ring in the torch head of FIG. 1, according to an illustrative embodiment of the present invention.

In some embodiments, a current ring 800, made of an electrically conductive material (e.g., brass), is located in the distal end 23 of torch insulator 118. FIG. 9 is an exemplary design of the current ring 800 of the torch insulator 118 in the torch head 102, according to an illustrative embodiment of the present invention. As shown, the current ring 800 has a ring portion 800a and a protrusion portion 800b. The ring portion 800a has a thin distal rim 802 and the protrusion portion 800b has a distal surface 805. The ring portion 800a of the current ring 800 can be concentrically situated with respect to the coolant tube 116 and the cathode 130 in the torch insulator 118, while the protrusion portion 800b of the current ring 800 can be oriented such that it electrically and/or physically contacts the proximal end of the pilot arc connection 124 housed in the cavity 148. In some embodiments, the current ring 800 is electrically insulated from the coolant tube 116 and the cathode 130 by a cathode insulator 804 (shown in FIG. 2) such that substantially no current is passed between the current ring 800 and the cathode 130 or between the current ring 800 and the coolant tube 116. In some embodiments, as shown in FIG. 4, at least a surface of the current ring 800 is exposed from the distal end 23 of the torch insulator 118 via the main electrical channel opening 132b such that a component of the cartridge 104 can physically contact the current ring 800 once the cartridge 104 is attached to the torch head 102. For example, both the thin distal rim 802 of the ring portion 800a and the distal surface 805 of the protrusion portion 800b of the current ring 800 can be exposed from the opening 132b.

Figure 7:
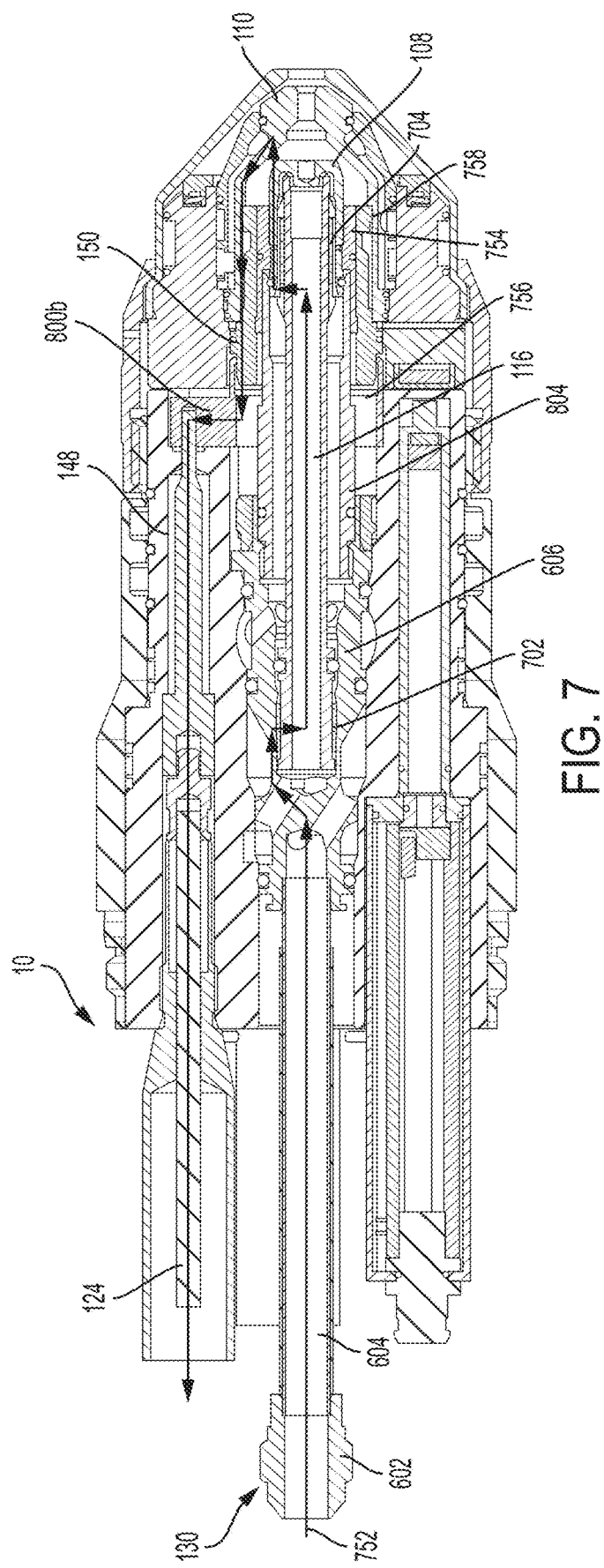
FIG. 7 is a sectional view of the plasma arc torch of FIG. 2 oriented to illustrate an exemplary pilot arc current flow path between the torch head and the cartridge of the plasma arc torch, according to an illustrative embodiment of the present invention.

FIG. 7 is a sectional view of the plasma arc torch 10 of FIG. 2 oriented to illustrate an exemplary pilot arc current flow path 752 between the torch head 102 and the cartridge 104 of the plasma arc torch 10, according to an illustrative embodiment of the present invention. To start a pilot arc, a pilot arc current 752 associated with a high-frequency, high-voltage (HFHV) signal is coupled to a power line from a power supply (not shown) to the plasma arc torch 10. The pilot arc current flow 752 can be passed from the power supply to the cathode 130 via the cathode fitting 602. The cathode tube 604 that is connected to the cathode fitting 602 then passes the pilot arc current 752 to the cathode block 606, which transfers the current to the coolant tube 116 via the Louvertac band 702 at the proximal end 740 of the coolant tube 116. The pilot arc current 752 flows distally through the coolant tube 116 and is transferred to the internal surface of the electrode 108 via the Louvertac band 704 at the distal end 742 of the coolant tube 116, thereby energizing the internal surface of the electrode 108. In alternative embodiments, the pilot arc current is passed from the cathode 130 to the electrode 108 without using the coolant tube 116, such as through a physical connection between the cathode 130 and the electrode 108. Once at the electrode 108, the pilot arc current path 752 induces a spark discharge in a plasma gas flowing in the gap between the electrode 108 and the nozzle 110, thereby generating a pilot arc in the gap. To complete the pilot arc circuit, the pilot arc current path 752 can return to the torch head 102 by flowing proximally from the nozzle 110, to the swirl ring 150 (which can be made of a conductive material), and to the current ring 800 in the torch head 102. As shown, the distal end of the swirl ring 150 physically contacts the nozzle 110 at an interface 758. The proximal end of the swirl ring 150 physically contacts at least the distal rim 802 of the ring portion 800a of the current ring 800 via a Louvertac electrical connector 756. The swirl ring 150 is thus configured to return the pilot arc current 752 from the nozzle 110 of the cartridge 104 to the torch head 102. The ring portion 800a of the current ring 800 can transfer the pilot arc current 752 to the protrusion portion 800b of the current ring 800, which passes the pilot arc current flow 752 to to the pilot arc current connection 124 within the cavity 148 to return the pilot arc current to the power supply.

The gas flow in the gap between the electrode 108 and the nozzle 110 is ionized by the pilot arc so that electrical resistance between the electrode 108 and a workpiece (not shown) becomes small. A voltage higher than the voltage used to initiate the pilot arc can be applied across the electrode 108 and the workpiece to induce the arc to transfer to the workpiece after the gap is ionized. This arc between the electrode 108 and the workpiece is a transferred arc. To maintain the transferred arc, a transferred arc current, which supplies the higher voltage from the power supply, is passed from the cathode 130 to the electrode 108 via the coolant tube 116 and the Louvertac bands 702, 704 in substantially similar fashion as the distal pilot arc current flow 752. To complete the transferred arc circuit, the transferred arc current is returned from the workpiece to the power supply through separate wirings (not shown).

b. Communication Device (RFID Reader)

In another aspect, the torch insulator 118 can be configured to support wireless communication between the torch head 102 and the cartridge 104. In some embodiments, the torch insulator 118 includes a cavity 144 (shown in FIG. 2) with an opening 144a at the proximal end 21 of the torch insulator 118 (shown in FIG. 3). The cavity 144 can be configured to retain the communication device 122 within the torch insulator 118. The communication device 122 is removable from the cavity 144 via the opening 144a. In some embodiments, the cavity 144 extends partially into the torch insulator 118 along the central longitudinal axis A such that there is no corresponding opening on the distal end 23 of the torch insulator 118.

Figure 10:
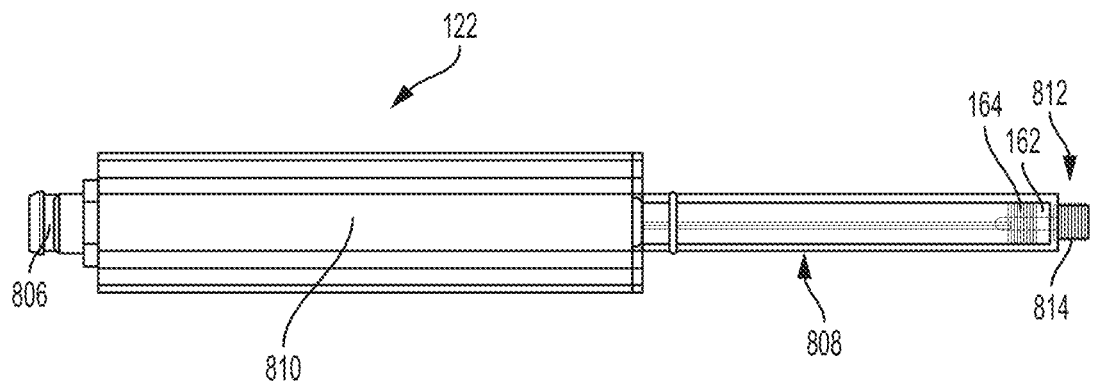
FIG. 10 is an exemplary design of the communication device of the torch head 102, according to an illustrative embodiment of the present invention.

FIG. 10 is an exemplary design of the communication device 122 of the torch head 102, according to an illustrative embodiment of the present invention. The communication device 122 can comprise a radio-frequency identification (RFID) reader adapted to receive RFID signals wirelessly transmitted from a nearby signal device 160 (e.g., an RFID tag) located in the cartridge 104 (shown in FIG. 2). The communication device 122 is adapted to process these signals to extract pertinent data transmitted by the signal device 160 about the cartridge 104 (and/or other torch information) and forward the data to a processor (not shown) for analysis. In general, the communication device 122 can be placed at a location in the plasma arc torch 10, such as in the torch insulator 118, to minimize the possibility of plasma arc and arc ignition disrupting the wireless communication between the signal device 160 and the communication device 122. The communication device 122 can include a connector 806 at its proximal end, an antenna assembly 808 at its distal end, and a processing assembly 810 between the connector 806 and the antenna assembly 808.

The antenna assembly 808 can include an antenna coil 814 configured to wirelessly transmit RF signals to the signal device 160 to interrogate the signal device 160 and/or receive RF signals from the signal device 160 in response to the interrogation. This antenna coil 814 can be located at the distal end of the antenna assembly 808 (i.e., the distal end of the communication device 122) such that when the communication device 122 is inserted into the cavity 144, the antenna coil 814 is embedded at the distal end 23 of the torch insulator 118. Such a placement minimizes wireless communication distance between the antenna coil 814 and the signal device 160 in the cartridge 104 and reduces communication interference between them. In some embodiments, the antenna coil 814 is positioned at an end face of the distal end of the communication device. For example, the antenna coil 814 can be wound around the post 812 at the distal end of the antenna assembly 808. The assembly 808 can also include a plastic cylindrical housing configured to feed one or more wires connected to the antenna coil 814 to the processing assembly 810. The processing assembly 810 can include a plastic cylindrical housing having one or more hardware components (e.g., a printed circuit board (PCB)) disposed therein. The PCB, which is connected to the wires from the antenna coil 814 of the antenna assembly 808, is configured to (i) power the communication device 122 including the antenna assembly 808, (ii) power the signal device 160, and/or (iii) wirelessly communicate with the signal device 160 via the antenna coil 814 using a communication protocol (e.g., an RFID protocol such as ISO/IEC 15693) to process data from the signal device 160. In some embodiments, the PCB can power an entire torch communication circuit on board the torch 10 that includes the communication device 122, the signal device 160 and related components. The connector 806, which is in electrical communication with the PCB of the processing assembly 810, is configured to transmit the data processed by the processing assembly 810 to a computing device (e.g., a central processing unit or the like) external to the torch 10. For example, the connector 806, in cooperation with the PCB of the processing assembly 810, can convey information obtained from the signal device 160 to the external computing device using either a wireless or wired connection.

In some embodiments, the circuitry that enables wireless communication between the communication device 122 and the signal device 160 is analog while the circuitry that enables (wired or wireless) communication between the communication device 122 and the external computing device is digital. In this configuration, placing the communication device 122, including the PCB, in the torch 10 reduces the distance of communication between the communication device 122 and the signal device 160 and therefore reduces noise pickup in the corresponding analog circuitry. However, placing the communication device 122 in the torch 10 can lengthen the communication distance between the communication device 122 and the remote computing device, and therefore can increase noise pickup in the corresponding digital circuitry, but the digital circuitry is more robust (i.e., more immune) to noise pickup than the analog circuitry.

In some embodiments, the communication device 122 is encased in one or more layers of protective material providing, for example, electrical insulation, liquid coolant leakage protection (plus protection from waste carried by the coolant flow), and protection against other environmental factors. In some embodiments, the housing of the processing assembly 810 and/or the housing of the antenna assembly 808 are made of durable plastic to protect the components therein from liquid and debris. The housings can be translucent such that LED signals of the PCB therein can be visible from outside of the housings. In some embodiments, one or more o-ring seals are used to protect the communication device 122 against liquid damage and create an electrically insulated barrier.

In some embodiments, the communication device 122 in the torch insulator 118 is electrically isolated from the plasma power and ignition circuitry, such as by about 30,000 V of electrical isolation. In some embodiments, the communication device 122 is configured to fit inside of the torch insulator 118 while accommodating all other components of the torch insulator 118 described above as well the protective layers around the communication device 122, which adds to its bulk. For example, the communication device 122 can be designed to be long, thin and/or flexible to better fit within the torch insulator 118.

During operation, the plasma arc torch 100 can cause up to 100 Celsius in ambient temperature, which leaves little margin for operating temperature rise. Therefore, in some embodiments, the communication device 122 is designed to generate minimal operating temperature. For example, the communication device 122 can have a low circuit power voltage, a low multi-point-control-unit (MCU) clock frequency, a low operational duty cycle and/or a sleep mode for while not performing to minimize heat generation.

In some embodiments, the torch communication circuit, which includes the communication device 122 and the signal device 160, is off axis from the central longitudinal axis A of the plasma arc torch 10. This offset allows the communication circuitry to be away from the region of the torch that defines plasma process performance. In general, the area where the communication circuit is placed is not vulnerable to variation in plasma process designs, which allows design freedom for the plasma process and stability for the communication circuitry performance. In some embodiments, to reduce unwanted coupling between the torch communication circuit and nearby metal components, the size of the antenna coil 814 is minimized (e.g., reduced coil diameter) and/or the RFID power is minimized to reduce the size of the resulting RFID field. In general, adjacent metal components that can potentially couple with the RFID field can be accounted for and held substantially consistent in size and proximity relative to the torch communication circuit.

In alternative embodiments, the plasma arc torch 10 does not include a communication system that comprises, for example, the communication device 122 in the torch head 102 or the signal device 106 in the cartridge 104. For example, a communication system can be absent in a torch where the cartridge 104 is connected to the torch head 102 or a quick-disconnect torch head, which in turn is connected to a torch receptacle.

In some embodiments, as illustrated in FIGS. 2 and 10, the communication system of the plasma arc torch 10 further includes a second signal device 162 (e.g., an RFID tag) disposed in or on the communication device 122 in the torch insulator 118, such as in the antenna assembly 808 of the communication device 122 close to the antenna coil 814. Alternatively, the second signal device 162 can be located in the torch head 102 external to the communication device 122 and/or the torch insulator 118. An optional base 164 can be used to hold the second signal device 162 in place. The second signal device 162 is configured to read and/or write information about the plasma arc torch 10 (e.g., number of arcs fired) and communicate the information to the plasma cutting system, which can then relay the information to first signal device 160 in the cartridge 104. Generally, the first and second signal devices 160, 162 can transfer information back and forth between them.

c. Ohmic Contact

Figure 8:
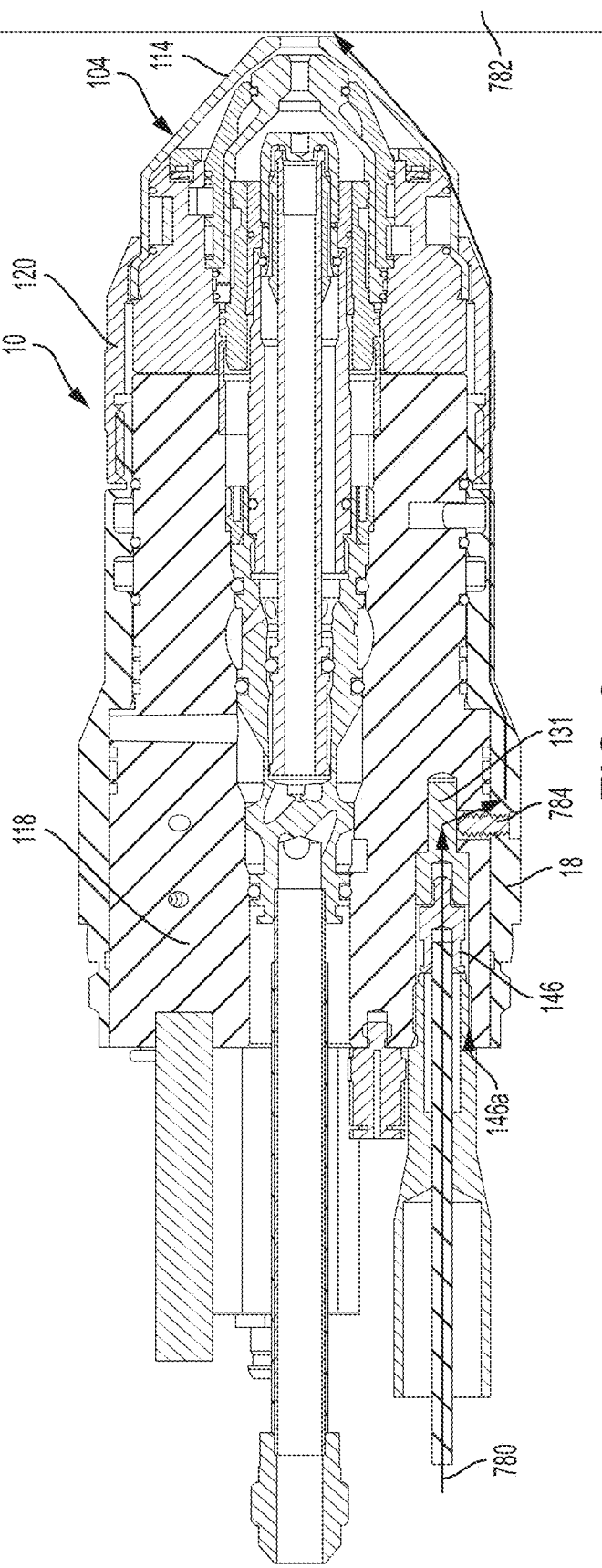
FIG. 8 is a sectional view of the plasma arc torch of FIG. 2 oriented to illustrate an exemplary ohmic contact path, according to an illustrative embodiment of the present invention.

In another aspect, the torch insulator 118 can be configured to support ohmic contact for the purpose of controlling a relative height between the torch 10 and a workpiece to facilitate torch operation. In some embodiments, the torch insulator 118 includes an ohmic contact cavity 146 (shown in FIG. 8) with an opening 146a at the proximal end 21 of the torch insulator 118 (shown in FIG. 3). FIG. 8 is a sectional view of the plasma arc torch 10 of FIG. 2 oriented to illustrate an exemplary ohmic contact path 780, according to an illustrative embodiment of the present invention. As shown, the ohmic contact cavity 146 of the torch insulator 118 in the torch head 102 can be configured to retain an ohmic contact connection 131, which is removable from the cavity 146 via the opening 146a (shown in FIG. 3). In some embodiments, the ohmic contact cavity 146 extends partially into the torch insulator 118 along the longitudinal axis A such that there is no corresponding opening on the distal end 23 of the torch insulator 118.

The ohmic contact path 780 of FIG. 8 allows a controller (not shown) of the torch 10 to detect and sense a workpiece/plate 782 for the purpose of controlling the relative height between the torch 10 and the workpiece/plate 782 prior to or during a torch operation. With respect to the ohmic contact path 780, when the torch head 102 is mounted during torch operation, an incoming pin (not shown) makes electrical contact with the ohmic contact connection 131 to form the electrical contact path 780. The path 780 then continues through the length of the ohmic contact connection 131 to electrically contact the torch body 18 via a set screw 784. The path 780 travels distally over the torch body 18 and the retaining cap 120 to reach the shield 114 of the cartridge 104. This path 780 allows the controller to sense the location of the workpiece/plate 782 and adjust the relative height accordingly. In some embodiments, the shield 114 of the cartridge 104 is electrically isolated from the nozzle 110 of the cartridge 104 to allow the ohmic contact path 780 to travel from the torch head 102 to the shield 114 on the outer surface of the torch 10.

In some embodiments, the ohmic contact path 780 of FIG. 8 is electrically isolated from the pilot arc current flow path 752 and/or the transferred arc current flow path by the use of the torch insulator 118. For example, pilot arc current flow path 752 and the transferred arc current flow path can be through the torch insulator 118 while the ohmic contact path 780 is mostly through the torch body 18.

d. Shield Gas

In another aspect, the torch insulator 118 can be configured to direct one or more gas flows from the torch head 102 to the cartridge 104. In some embodiments, the torch insulator 118 is configured to direct at least one shield gas from the torch head 102 to the cartridge 104. Exemplary shield gases include air, oxygen (i.e. $O_2$), and argon. In some embodiments, the shield gas flow path and channels described herein are also compatible with conducting a shield fluid, such as water, between the torch head 102 and the cartridge 104. The torch insulator 118 can include a shield gas channel 850 extending from an opening 126a at the proximal end 21 of the torch insulator 118 (shown in FIG. 3) to a shield gas opening 126b at the distal end 23 of the torch insulator 118 (shown in FIG. 4).

Figure 11A:
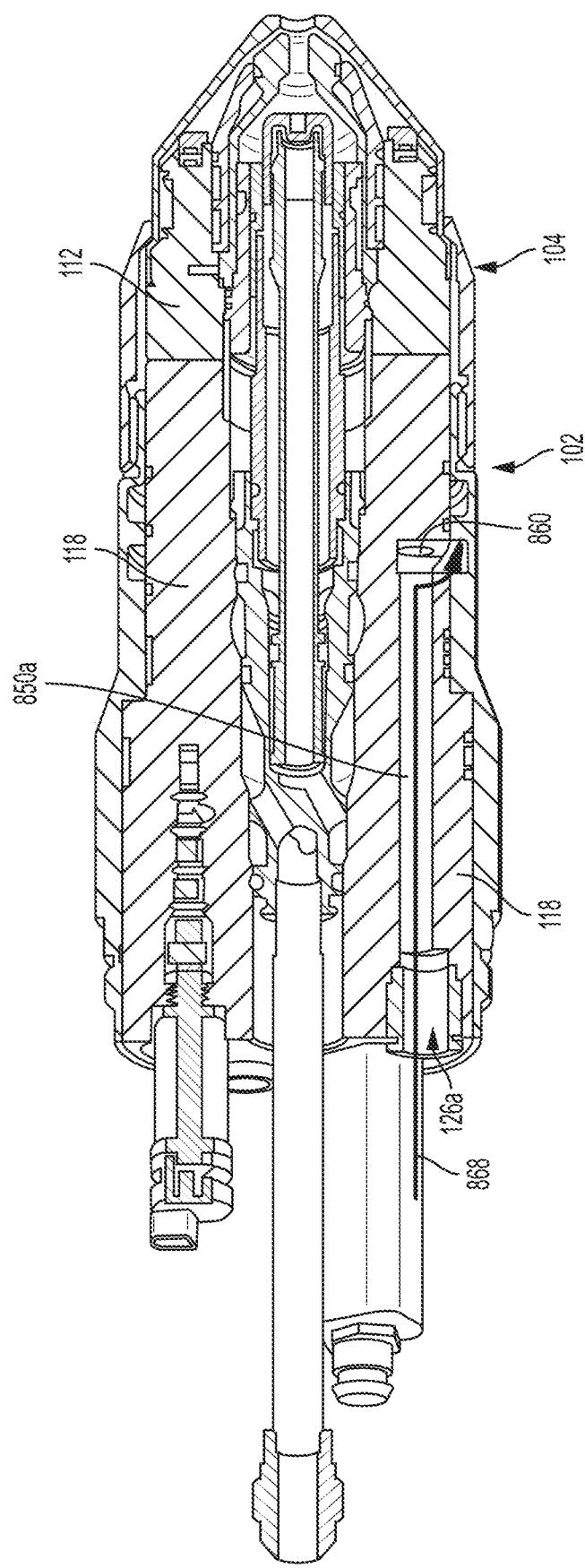
FIGS. 11a and b are sectional views of the plasma arc torch of FIG. 2 oriented to illustrate an exemplary shield gas flow path from the torch head to the cartridge of the plasma arc torch, according to an illustrative embodiment of the present invention.

FIGS. 11a and b are sectional views of the plasma arc torch 10 of FIG. 2 oriented to illustrate an exemplary shield gas flow path 868 from the torch head 102 to the cartridge 104 over the shield gas channel 850 (including shield gas channel segments 850a and 850c), according to an illustrative embodiment of the present invention. As shown, the shield gas channel 850 can comprise several segments. A first channel segment 850a connects the opening 126a on the proximal end 21 of the torch insulator 118 to an internal opening 860 in or on the insulator 118. The first channel segment 850a can extend substantially parallel to the longitudinal axis A. A second channel segment (not shown) can connect the opening 860 with another internal opening 862 in or on the insulator 118, where the second internal opening 862 is radially offset from the first internal opening 860. For example, the internal openings 860, 862 can be radially offset by about 30 degrees to about 90 degrees. The second channel segment can extend circumferentially around the torch insulator 118 (or in a different orientation) to connect the internal openings 860, 862. A third channel segment 850c connects the internal opening 862 to the opening 126b on the distal end 23 of the torch insulator 118. The third channel segment 850c can extend substantially parallel to the longitudinal axis A.

In some embodiments, upon attachment of the cartridge 104 onto the torch head 102, a corresponding shield gas channel 864 within the cartridge frame 112 of the cartridge 104 fluidly aligns with the shield gas channel segment 850c. The shield gas flow 868 can enter the cartridge 104 via a proximal opening 864a of the shield gas channel 864 in the cartridge frame 112. The shield gas channel 864 also has an opening 864b at a distal end of the cartridge frame 112 that is fluidly connected to a gas passage 872 between the shield 114 and the nozzle 110. Thus, the shield gas channel 864 can introduce a shield gas from the torch head 102 to the gas passage 872. In some embodiments, the cartridge frame 112 includes one or more components in the path of the shield gas channel 864 to adjust one or more parameters (e.g., flow pattern and rate) of the shield gas flow 868 therein. Details regarding the shield gas channel 864, the swirling components of the cartridge frame 112 and the shield gas flow 868 through the cartridge 104 are described below.

With respect to the shield gas flow path 868 shown in FIGS. 11a and b, a shield gas is introduced to the torch head 102 via the shield gas opening 126a at the proximal end 21 of the torch insulator 118. The gas 868 flows distally through the shield gas channel segment 850a to reach the internal opening 860. The gas 868 can then flow circumferentially (or in a different orientation) around the torch insulator 118 via the second segment of the shield gas channel 850 to reach the internal opening 862 that is spaced relative to the internal opening 860. The gas 868 flows longitudinally from the opening 862 to the opening 126b on the distal end 23 of the torch insulator 118 via the shield gas channel segment 850c to reach the cartridge 104. Upon exiting the torch head 102 via the opening 126b, the shield gas flow 868 enters the shield gas channel 864 of the cartridge frame 112 in the cartridge 104. The gas 868 flows distally through the shield gas channel 864 of the cartridge frame 112 and exits from the opening 864b of the shield gas channel 864 to the gas passage 872 between the shield 114 and the nozzle 110 to cool the two components. The shield gas 868 is adapted to exit the cartridge 104 via the shield exit orifice 870.

e. Plasma Gas

Figure 12A:
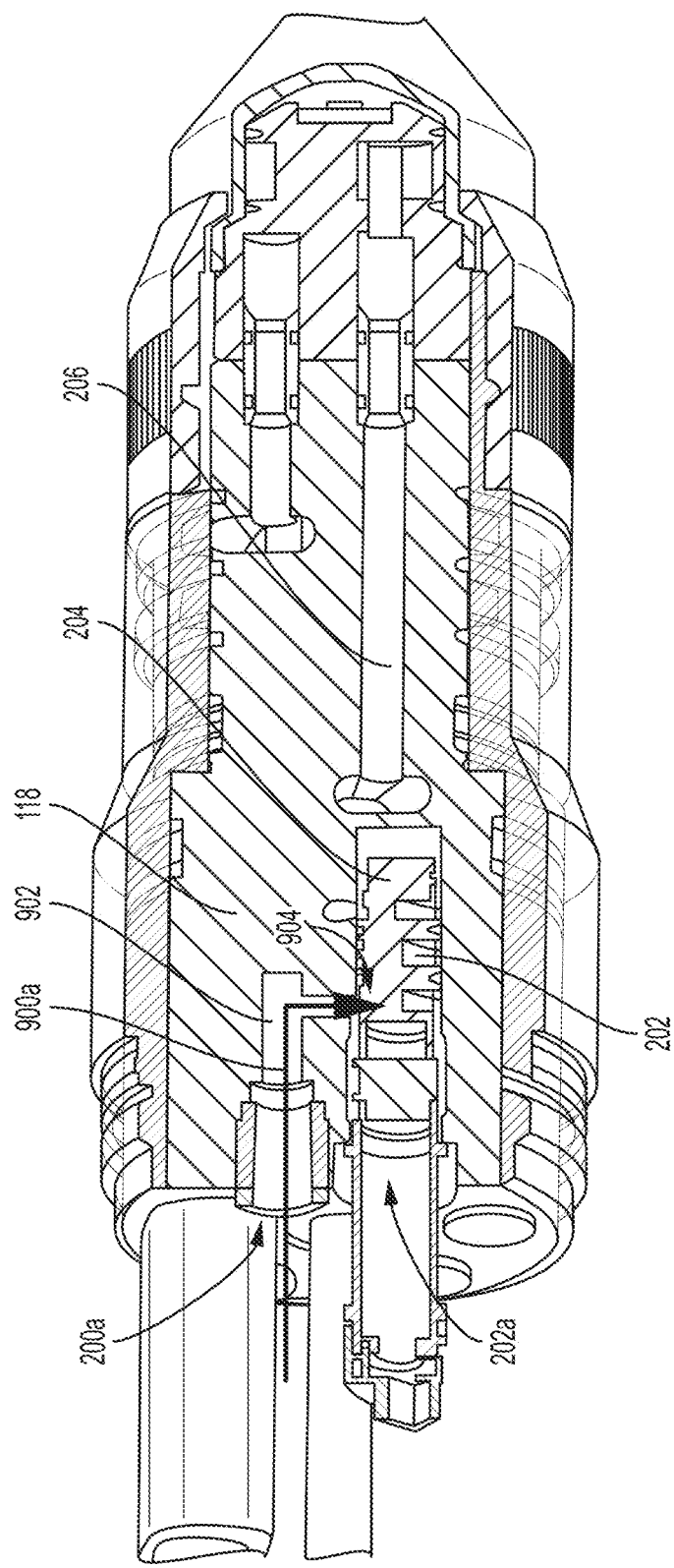
FIGS. 12a-c are sectional views of the plasma arc torch of FIG. 2 oriented to illustrate an exemplary plasma gas flow path from the torch head to the cartridge of the plasma arc torch, according to an illustrative embodiment of the present invention.
Figure 12B:
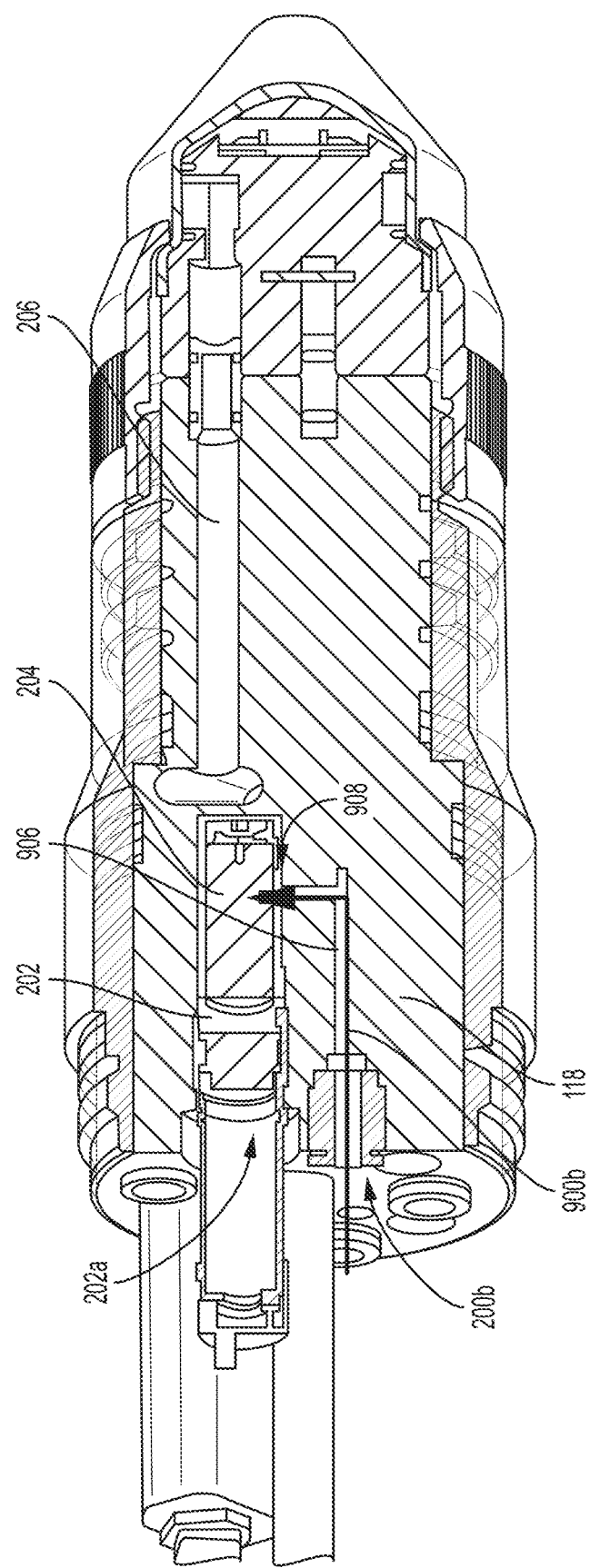
Figure 12C:
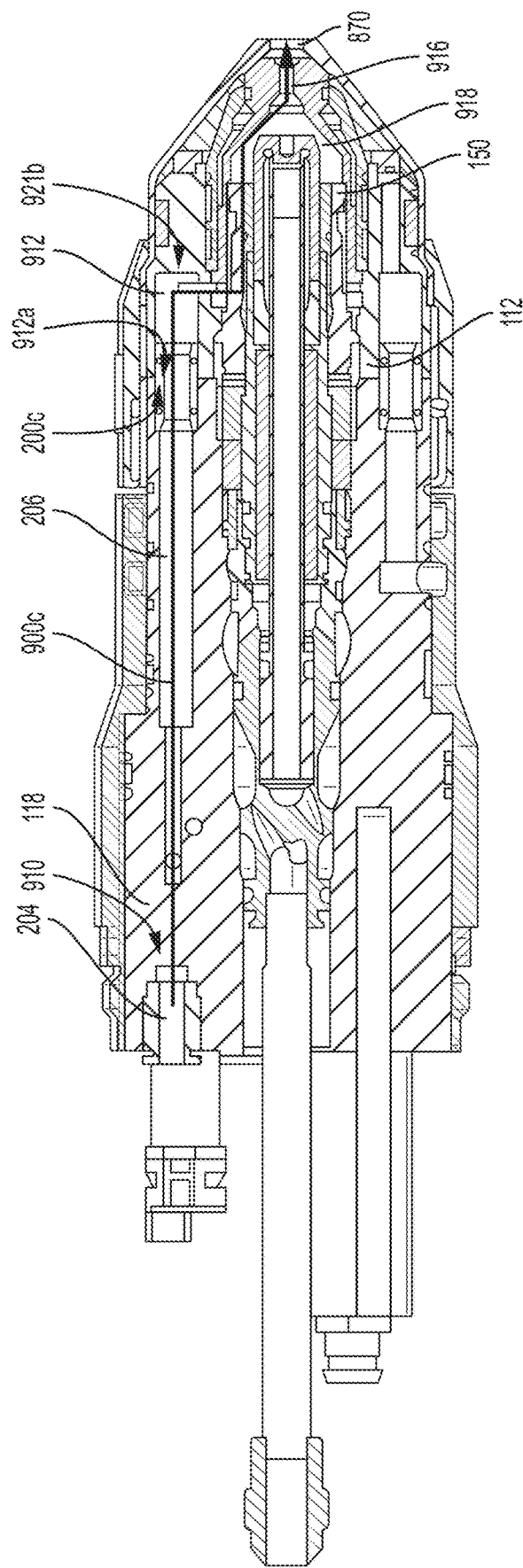

In some embodiments, the torch insulator 118 of the torch head 102 can direct one or more plasma gases from the torch head 102 to the cartridge 104. For example, the torch insulator 118 can be configured to receive multiple sources of gas, select one of the gases or mix the gases, and introduce the selected gas or gas mixture to the cartridge 104. FIGS. 12a-c are sectional views of the plasma arc torch 10 of FIG. 2 oriented to illustrate an exemplary plasma gas flow path 900 from the torch head 102 to the cartridge 104, according to an illustrative embodiment of the present invention.

The torch insulator 118 includes two plasma gas openings 200a and 200b at the proximal end 21 of the torch insulator 118, where each opening is configured to receive a plasma gas, such as oxygen ($O_2$), air, nitrogen ($N_2$), hydrogen-based gases (e.g., H35), F5 fuel gas, or a mixture of one or more of these chemicals. In addition, the torch insulator 118 can include a cavity 202 (shown in FIGS. 12a-c) configured to house a plasma gas valve 204. The cavity 202 is connected to an opening 202a at the proximal end 21 of the torch insulator 118 (shown in FIG. 3), through which the plasma gas valve 204 can be removably disposed in the cavity 202. The plasma gas valve 204 is configured to select one of the gases or mix the gases received from the plasma gas openings 200a and 200b and introduce the resulting gas or gas mixture to the cartridge 104 over a plasma gas channel 206 (shown in FIGS. 12a-c) and via an opening 200c on the distal end 23 of the torch insulator 118 (also shown in FIG. 4).

As shown in FIG. 12a, the exemplary plasma gas flow path 900 comprises a first plasma gas flow 900a introduced from the plasma gas opening 200a to the plasma gas valve 204 located in the cavity 202 via a connection channel 902. The connection channel 902 fluidly connects the opening 200a with an inlet 904 of the plasma gas valve 204 to introduce the first plasma gas flow 902 to the valve 204. As shown in FIG. 12b, the plasma gas flow path 900 comprises a second plasma gas flow 900b introduced from the plasma gas opening 200b to the plasma gas valve 204 via a connection channel 906. The connection channel 906 fluidly connects the opening 200b with a second inlet 908 for introducing the second plasma gas flow 900b to the plasma gas valve 204. As shown in FIG. 12c, the plasma gas valve 204 selects one of the gases or mixes the gases and transmits the resulting plasma gas flow 900c over the plasma gas channel 206 to exit from the opening 200c at the distal end 23 of the torch insulator 118. The plasma gas channel 206 is adapted to extend longitudinally along the length of the torch 10 and fluidly connect an outlet 910 of the plasma gas valve 204 to the opening 200c at the distal end 23 of the torch insulator 118.

With respect to the plasma gas flow path 900c shown in FIG. 12c, upon exiting the torch head 102 via the opening 200c, the plasma gas flow 900c enters a corresponding plasma gas channel 912 of the cartridge frame 112 in the cartridge 104 via an opening 912a on a proximal end 15 of the cartridge frame 112. The gas 900c flows longitudinally through the plasma gas channel 912 of the cartridge frame 112 and exits from an opening 912b at the distal end 17 of the cartridge frame 112, which introduces the gas to the plasma gas passage 918 between the electrode 108 and the nozzle 110 of the cartridge 104. The plasma gas 900c is adapted to flow distally through the passage 918 and exit the cartridge 104 via the central nozzle exit orifice 916 and the central shield exit orifice 870. In some embodiments, the swirl ring 150 in the path of the plasma gas flow 900c can introduce a swirling motion to the plasma gas flow 900c. Details regarding the plasma gas channel 912, the swirl ring 150, and the plasma gas flow 900c through the cartridge 104 are described below.

In some embodiments, the shield gas flow 868 and the plasma gas flow 900 are fluidly isolated from each other in both the torch head 102 and the cartridge 104 such that these gases do not cross paths or share the same channels. For example, the plasma gas channel 206 and the shield gas channel 850 are fluidly isolated from each other. In some embodiments, the torch insulator 118 of the torch head 102 is configured to control gas flows through the torch 10 by directing the shield gas flow 868 and the plasma gas flow 900 to the appropriate channels within the cartridge frame 112 for distribution to the appropriate gas passageways in the cartridge 104 (e.g., the passage 872 between the nozzle 110 and the shield 114 for the shield gas flow 868 and the passage 918 between the electrode 108 and the nozzle 110 for the plasma gas flow 900c).

f. Liquid Coolant Flow

In another aspect, the torch insulator 118 can be configured to direct a sequence of liquid coolant flow for circulation between the torch head 102 to the cartridge 104. Exemplary liquid coolant includes water, propylene glycol, ethylene glycol, or any number of commercially available coolants specially designed for plasma cutting systems. As shown in FIG. 3, the torch insulator 118 can include a coolant opening 128a at the proximal end 21 of the torch insulator 118 for introducing a liquid coolant to the torch head 102.

Figure 13A:
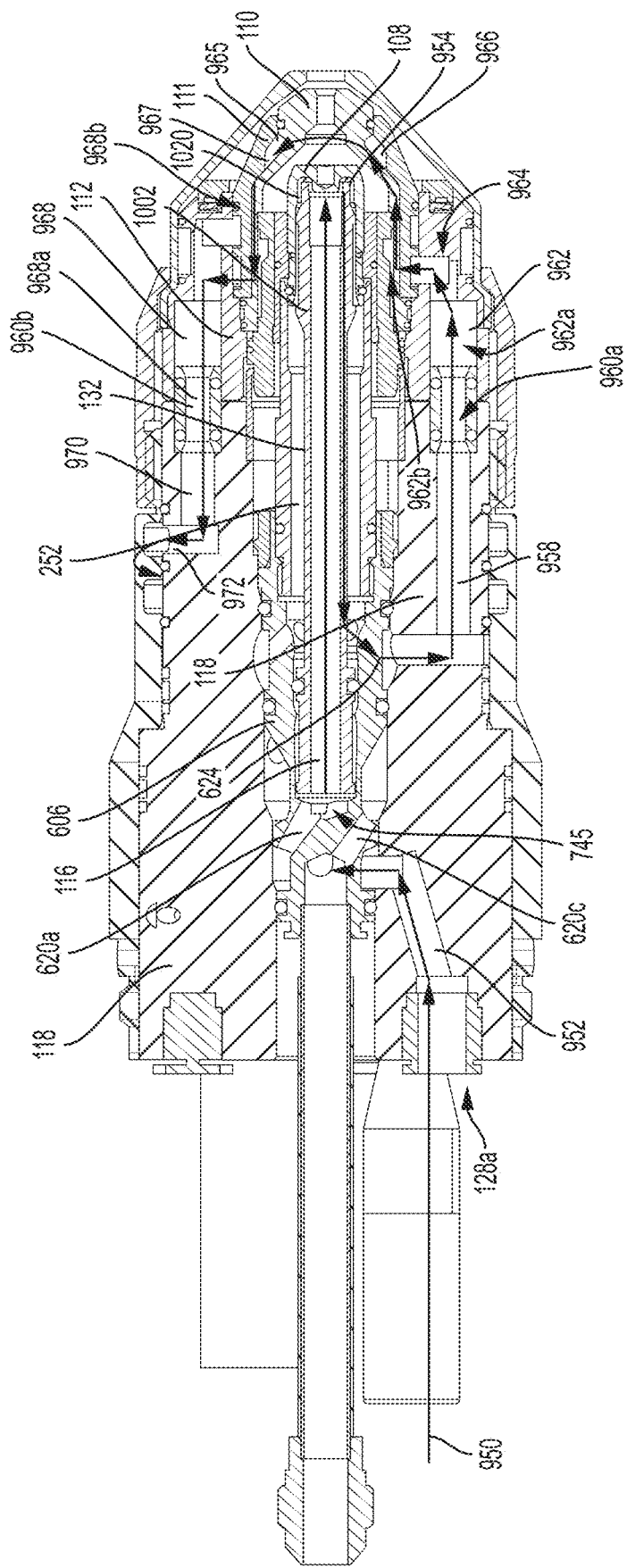
FIGS. 13a and b are sectional views of the plasma arc torch of FIG. 2 oriented to illustrate an exemplary liquid coolant flow path that circulates between the torch head and the cartridge of the plasma arc torch, according to an illustrative embodiment of the present invention.
Figure 14A:
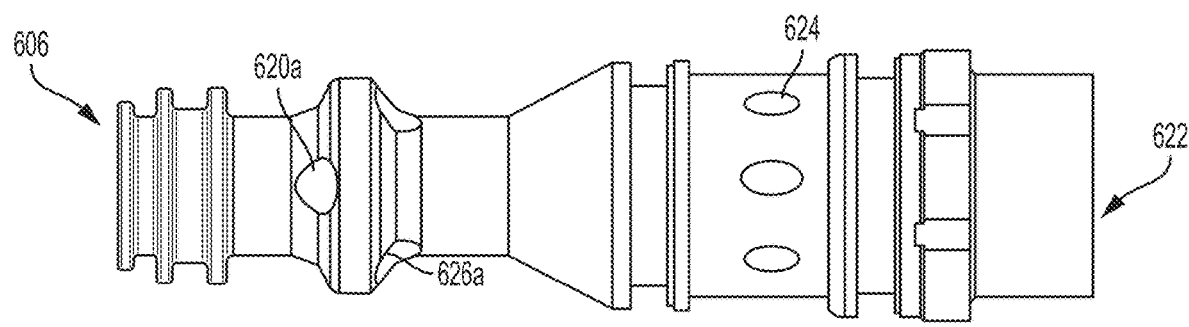
FIGS. 14a and b are exemplary profile and proximal views of the cathode block of the torch head, respectively, according to an illustrative embodiment of the present invention.
Figure 14B:
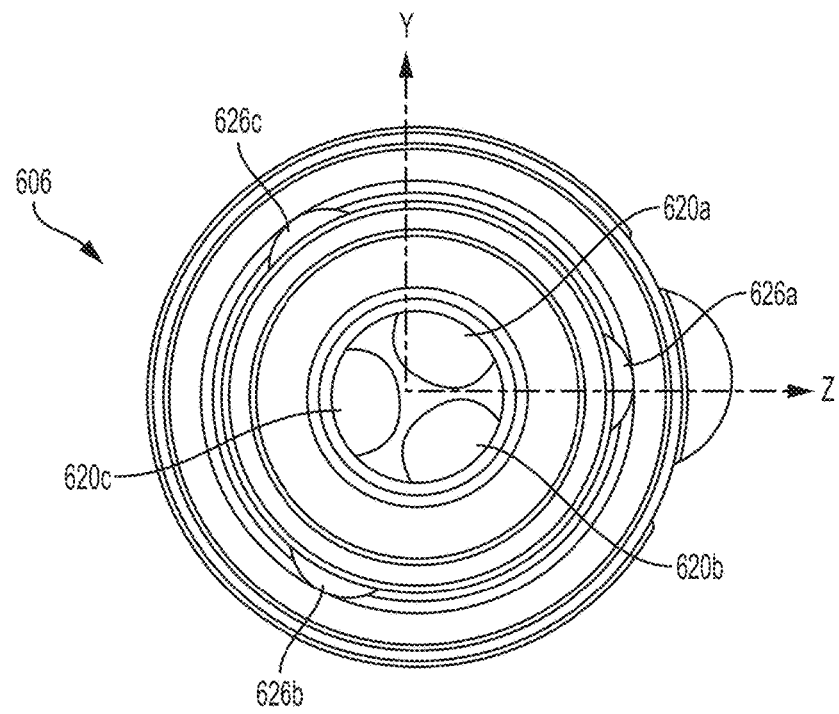

FIGS. 13a and b are sectional views of the plasma arc torch 10 of FIG. 2 oriented to illustrate an exemplary liquid coolant flow path 950 that circulates between the torch head 102 and the cartridge 104 in a series of flow segments, according to an illustrative embodiment of the present invention. Along the liquid coolant flow path 950 of FIG. 13a, a liquid coolant is first introduced to the torch head 102 via the opening 128a at the proximal end 21 of the torch insulator 118. The coolant 950 flows from the opening 128a to the cathode block 606 within the torch insulator 118 over a connection channel 952 and enters the cathode bock 606 via at least one inlet of the cathode block 606. FIGS. 14a and b are exemplary profile and proximal views of the cathode block 606 of the torch head 102, respectively, according to an illustrative embodiment of the present invention. As shown in FIG. 14b, the cathode block 606 can include a first set of three liquid inlets 620a-c dispersed around an inner circumference of the cathode block 606. In other embodiments, more or fewer inlets are defined. The connection channel 952 fluidly connects the torch insulator opening 128a to the first set of liquid inlets 620a-c to conduct the coolant into the cathode block 606. The liquid inlets 620a-c of the cathode block 606 can further conduct the liquid coolant into the opening 745 at the proximal end 740 of the coolant tube 116 that can be physically attached to the cathode block 606 as described above. In some embodiments, the connections between the inlets 620a-c and the opening 745 at the proximal end of the coolant tube 116 are crisscrossed (e.g., for spacing saving purpose) to deliver the coolant from the cathode block 606 to the coolant tube 116.

Once in the coolant tube 116, the coolant flow path 950 continues on longitudinally toward the distal end 742 of the coolant tube 116. The coolant flow 950 exits from the coolant tube 116 via the distal opening 746 of the coolant tube 116 and enters into a cavity 954 defined by the inner surface of the electrode 108 of the cartridge 104, thereby substantially cooling the electrode 108. Hence, the initial coolant flow path 950 is substantially confined within the main channel 132 of the torch insulator 118 (which receives at least a portion of the cathode 130 and the coolant tube 116) and a corresponding main channel 1020 of the cartridge frame 112 (which connects to the the cavity 954 of the electrode 108). As guided by the wall of the cavity 954, the coolant flow 950 reverses direction and continues on proximally in the main channels 1020, 132, along the outer surface of the coolant tube 116. This reverse flow also substantially cools the Louvertac band 704 surrounding an exterior portion of the distal end 742 of the coolant tube 116.

The coolant flow 950 continues toward the cathode block 606 of the torch head 102. The coolant flow 950 can enter the cathode block 606 via the distal opening 622 of the cathode block 606 (shown in FIG. 14a). Once inside of the cathode block 606, the coolant 950 flows radially outward over an exit channel 624 of the cathode 130. The exist channel 624 fluidly connects the cathode 606 to a first coolant channel 958 of the torch insulator 118 that extends longitudinally along the length of the torch head 102 to again conduct the coolant flow 950 from the torch head 102 into the cartridge 104. Specifically, the first coolant channel 958 fluidly connects the exit channel 624 to a first liquid coolant opening 960a on the distal end 23 of the torch insulator 118 (also shown in FIG. 4). The first coolant channel 958 conducts the coolant flow 950 from the cathode 130 to the cartridge 104 via the opening 960a of the torch insulator 118 and introduces the coolant flow 950 into an opening 962a on the proximal end 15 of the cartridge frame 112, where the proximal opening 962a is connected to a corresponding first coolant channel 962 of the cartridge frame 112 in the cartridge 104.

The coolant 950 flows distally through the cartridge frame 112 over the first coolant channel 962 to reach an opening 962b at the distal end 17 of the cartridge frame 112, which fluidly connects the first coolant channel 962 in the cartridge frame 112 to a nozzle opening 966 associated with the nozzle 110. Specifically, the nozzle 110 can be coupled to an outer nozzle component 111 (such as a nozzle jacket for a non-vented nozzle or a nozzle liner for a vented nozzle) and the opening 966 can be on the outer nozzle component 111 such that it can introduce the coolant flow from the distal coolant channel opening 962b to a nozzle coolant flow chamber 965 between an exterior surface the nozzle 110 and an interior surface of the outer nozzle component 111. As the coolant flow 950 is conducted distally through the nozzle coolant flow chamber 965 via the nozzle opening 966, it substantially cools the nozzle 110 and the outer nozzle component 111. Upon reaching a distal tip of the nozzle 110, the coolant flow 950 can swirl around at least a portion of a circumference of the nozzle 110 via a circumferential channel (not shown) disposed on the external surface of the nozzle 110. The coolant flow 950 can return proximally on a different side of the nozzle 110 within the flow chamber 965 and toward another opening 967 on the outer nozzle component 111. The second nozzle opening 967 is in turn fluidly connected to a second coolant channel 968 in the cartridge frame 112. Specifically, the second coolant channel 968 interfaces with the second opening 967 of the outer nozzle component 111 at an opening 968b at the distal end 17 of the cartridge frame 112. The second coolant channel 968 of the cartridge frame 112 is adapted to conduct the liquid coolant flow 950 away from the nozzle coolant flow chamber 965 and into a corresponding second coolant channel 970 of the torch insulator 118 in the torch head 102 via a a second liquid coolant channel opening 968a on the proximal end 15 of the cartridge frame 112 and a second liquid coolant channel opening 960b at the distal end 23 of the torch insulator 118 (also shown in FIG. 4). As the coolant flow 950 travels proximally through the torch insulator 118 within the second coolant channel 970 of the torch head 102, the coolant flow encounters an internal opening 972 of the second coolant channel 970 in the torch insulator 118. That is, the second coolant channel 970 connects the internal opening 972 with the opening 960b on the distal end 23 of the torch insulator 118.

Figure 13B:
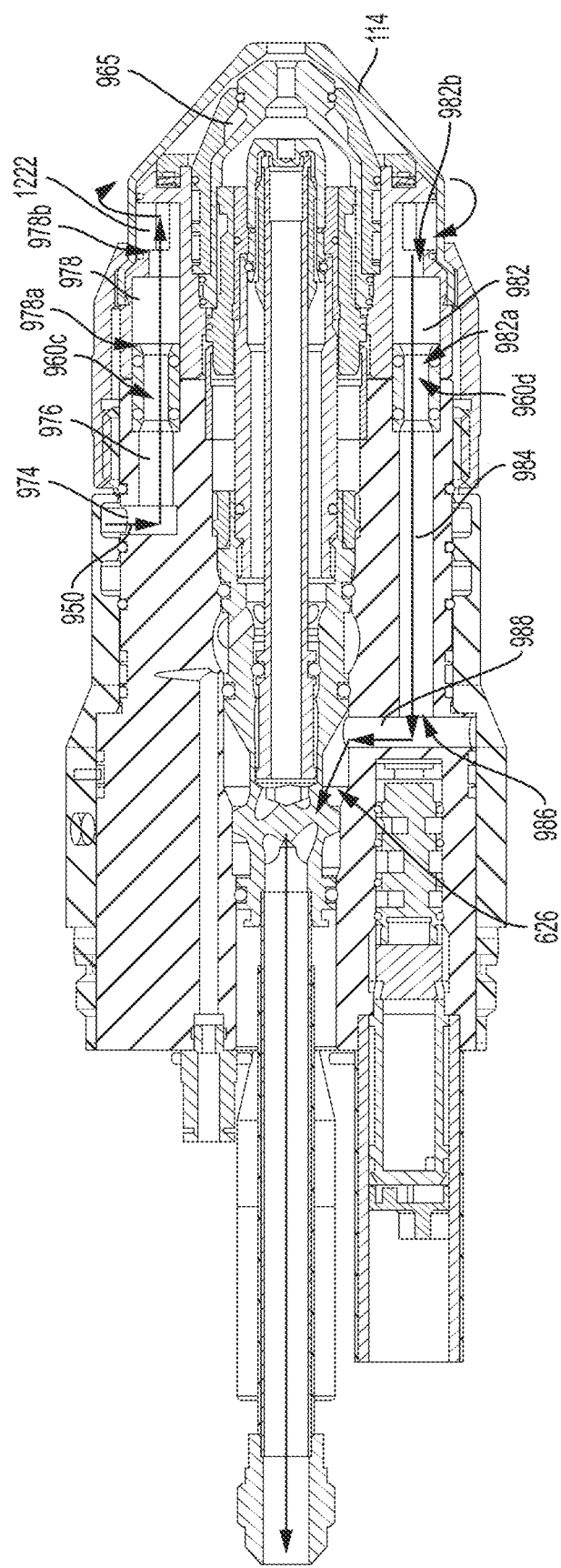

As illustrated in FIG. 13b, the internal opening 972 of the second coolant channel 970 can be fluidly connected to an internal opening 974 of a third coolant channel 976 of the torch insulator 118 via a distribution channel (not shown) extending circumferentially around the torch insulator 118. The second coolant channel 970 and the third coolant channel 976 can be radially offset from each other at about 30 degrees to about 90 degrees (e.g., 70 degrees). The distribution channel thus connects the internal openings 972, 974 to deliver the coolant flow 950 from the second coolant channel 970 to the third coolant channel 976. Within the third coolant channel 976, the coolant 950 flows distally toward a third coolant channel opening 960c on the distal end 23 of the torch insulator 118 (also shown in FIG. 4) to again enter the cartridge 104. Specifically, upon exiting the third coolant channel 976 of the torch insulator 118 of the torch head 102 via the opening 960c, the coolant flow 950 is adapted to enter the cartridge 104 via a corresponding third coolant channel opening 978a on the proximal end 15 of the cartridge frame 112 that is connected to a third coolant channel 978 of the cartridge frame 112 to continue the distal flow toward the shield 114 in the cartridge 104. The coolant flow 950 exits the third coolant channel 978 via an opening 978b at the distal end 17 of the cartridge frame 112 to enter a circumferential shield coolant flow region 1222 defined between an outer side surface of the cartridge frame 112 and a corresponding inner surface of the shield 114. The coolant flow 950 can travel circumferentially around the shield coolant flow region 1222, thereby cooling the shield 114. Following the circumferential shield coolant flow region 1222, the coolant flow 950 can return to the cartridge frame 112 on a different side of the flow region 1222 by entering an opening 982b at the distal end 17 of the cartridge frame 112. The opening 982b, which is in fluid communication with the shield coolant flow region 1222, is connected to a fourth coolant channel 982 of the cartridge frame 112. The coolant flow 950 then travels proximally in the fourth coolant channel 982, exits the fourth coolant channel 982 via an opening 982a at the proximal end 15 of the cartridge frame 112, and flows into the torch head 102. The coolant flow 950 enters the torch head 102 via a fourth coolant channel opening 960d at the distal end 23 of the torch insulator 118 (also shown in FIG. 4). The opening 960d at the distal end 23 of the torch insulator 118 is fluidly connected to a fourth coolant channel 984 of the torch insulator 118 configured to deliver the coolant flow 950 from the cartridge 104 to an internal opening 986 in the torch insulator 118, which is fluidly connected to the cathode block 606.

As shown in FIGS. 14a and b, the cathode block 606 comprises a second set of one or more liquid inlets 626 extending from an exterior surface to an interior surface of the cathode block 606. In some embodiments, the cathode block 606 includes a second set of three liquid inlets 626a-c dispersed around an outer circumference of the cathode block 606. In other embodiments, more or fewer inlets are defined. Shown with respect to FIG. 13b, a connection channel 988 fluidly connects the internal opening 986 of the fourth coolant channel 984 of the torch insulator 118 to the second set of liquid inlets 626a-c to conduct the coolant 950 from the fourth coolant channel 984 into the cathode block 606. In some embodiments, the connections between the second set of inlets 626a-c and the internal opening 986 are crisscrossed (e.g., for space saving purpose) to deliver the coolant from the fourth coolant channel 984 to the cathode block 606 in a swirling fashion. Once inside of the cathode block 606, the coolant flow 950 continues on proximally to exit the torch insulator 118 via the cathode tube 604 and the cathode fitting 602 in that order.

In some embodiments of the torch insulator 118, the first coolant channel 958 and the second coolant channel 970 can be radially offset from each other at about 30 degrees to 90 degrees (e.g., about 90 degrees). The third coolant channel 976 and the fourth coolant channel 984 can be radially offset from each other at about 30 degrees to 90 degrees (e.g., about 90 degrees). In some embodiments of the cartridge frame 112, the first coolant channel 962 and the second coolant channel 968 can be radially offset from each other by the same degree as the offset between the first coolant channel 958 and the second coolant channel 970 of the torch insulator 118 (e.g., about 90 degrees). The third coolant channel 978 and the fourth coolant channel 982 can be radially offset from each other by the same degree as the offset between the third coolant channel 976 and the fourth coolant channel 984 of the torch insulator 118 (e.g., about 90 degrees). In some embodiments of the plasma arc torch 10, the second coolant channels 970, 968 are radially offset from the third coolant channels 976, 978 by about 30 degrees to about 90 degrees (e.g., 70 degrees).

In general, the torch insulator 118 of the torch head 102, in collaboration with the cartridge frame 112 of the cartridge 104, is configured to control distribution of a coolant flow 950 in and out of the torch head 102 and the cartridge 104 to various components of the cartridge tip, as described above with respect to FIGS. 13 a and b. For example, the torch insulator 118 and the cartridge frame 112 can direct the coolant flow 950 in the following sequence: (i) from the cathode 600 to the coolant tube 116 and reverse in the main channel 132 of the torch insulator 118 and the main channel 1020 of the cartridge frame 112 to cool the electrode 108, where each of the main channels 132, 1020 acts as both a supply and return channel; (ii) from the first coolant channel 958 of the torch insulator 118 (i.e. a supply channel), to the first coolant channel 962 of the cartridge 104 (i.e., a supply channel), to the second coolant channel 968 of the cartridge 104 (i.e., a return channel) and to the second coolant channel 970 of the torch insulator 118 (i.e., a return channel) to cool the nozzle 110; (iii) from the third coolant channel 976 of the torch insulator 118 (i.e., a supply channel), to the third coolant channel 978 of the cartridge 104 (i.e., a supply channel), to the four coolant channel 982 of the cartridge 104 (i.e., a return channel) and to the fourth coolant channel 984 of the torch insulator 118 (i.e., a return channel) to cool the shield 114. In alternative embodiments, the coolant flow 950 comprises only one of the three sets of the supply and return channels to cool one cartridge tip component. In alternative embodiments, the coolant flow 950 comprises two of the three sets of the supply and return channels to cool two cartridge tip components.

Even though the coolant flow path 950 of FIGS. 13a and b is illustrated in a sequence that cools the electrode 108, followed by the nozzle 110, and then the shield 114 of the cartridge tip, other cooling sequences are equally applicable. For example, a different sequence can include cooling of the shield 114, followed by the nozzle 110 and then the electrode 108. Yet another sequence can include cooling of the nozzle 110, followed by the shield 114 and then the electrode 108. In some embodiments, any order for cooling these three components of the cartridge tip is contemplated by the present invention.

In some embodiments, the shield gas flow path 868, the plasma gas flow path 900 and the coolant flow path 950 are fluidly isolated from each other in both the torch head 102 and the cartridge 104 such that these fluids do not cross paths nor share the same channels. In some embodiments, the shield gas flow path 868, the plasma gas flow path 900 and the coolant flow path 950 are predefined based on locking of the torch head 102 with the cartridge 104 in a predetermined orientation. This locking feature will be described below in detail. In some embodiments of the torch insulator 118, one or more of the coolant channels 968, 970, 976, 984, the plasma gas channel 206 and the shield gas channel 850 are non-concentric with respect to the central longitudinal axis A. One or more of the pilot arc connection cavity 148, the communication device cavity 144 and the plasma gas valve cavity 202 are non-concentric with respect to the central longitudinal axis A. In some embodiments of the torch insulator 118 (shown in FIG. 3), one or more of the opening 202a for receiving the plasma gas valve 204, the plasma gas openings 200a, 200b, the cavity opening 148a for receiving the pilot arc connection 123, the liquid coolant opening 128a, the cavity opening 146a for receiving the ohmic connection 131, the shield gas opening 126a, the cavity opening 144a for receiving the communication device 122, and the main channel opening 132a are disposed on an end face of the proximal end 21 of the torch insulator 118, where the end face can be substantially planar. These openings, with the exception of the main channel opening 132a, can be disposed non-concentrically on the proximal end face with respect to the central longitudinal axis A. In some embodiments of the torch insulator 118 (shown in FIG. 4), one or more of the plasma gas opening 200c, the liquid coolant openings 960a-d and the shield gas opening 126b, the main channel opening 132b are disposed on an end face of the distal end 23 of the torch insulator 118, where the end face can be substantially planar. These openings, with the exception of the main channel opening 132a, can be disposed non-concentrically on the distal end face with respect to the central longitudinal axis A. In the context of the present invention, "non-concentric" means that the applicable channel, cavity or opening is offset relative to the longitudinal axis A. In some embodiments, each non-concentric channel, cavity or opening is oriented non-symmetrically with respect to the longitudinal axis A.

In some embodiments, the main channel opening 132a at the proximal end 21 of the torch insulator 118, the main channel 132, and the main channel opening 132b at the distal end 23 of the torch insulator 118 are centrally located and disposed concentrically with respect to the central longitudinal axis A. As described above, the main channel 132 is configured to provide at least one of (i) a pilot arc or transferred arc current or (ii) at least a portion of the liquid coolant flow 950 from the torch head to the cartridge.

Interface Between the Torch Head and the Cartridge

Figure 15:
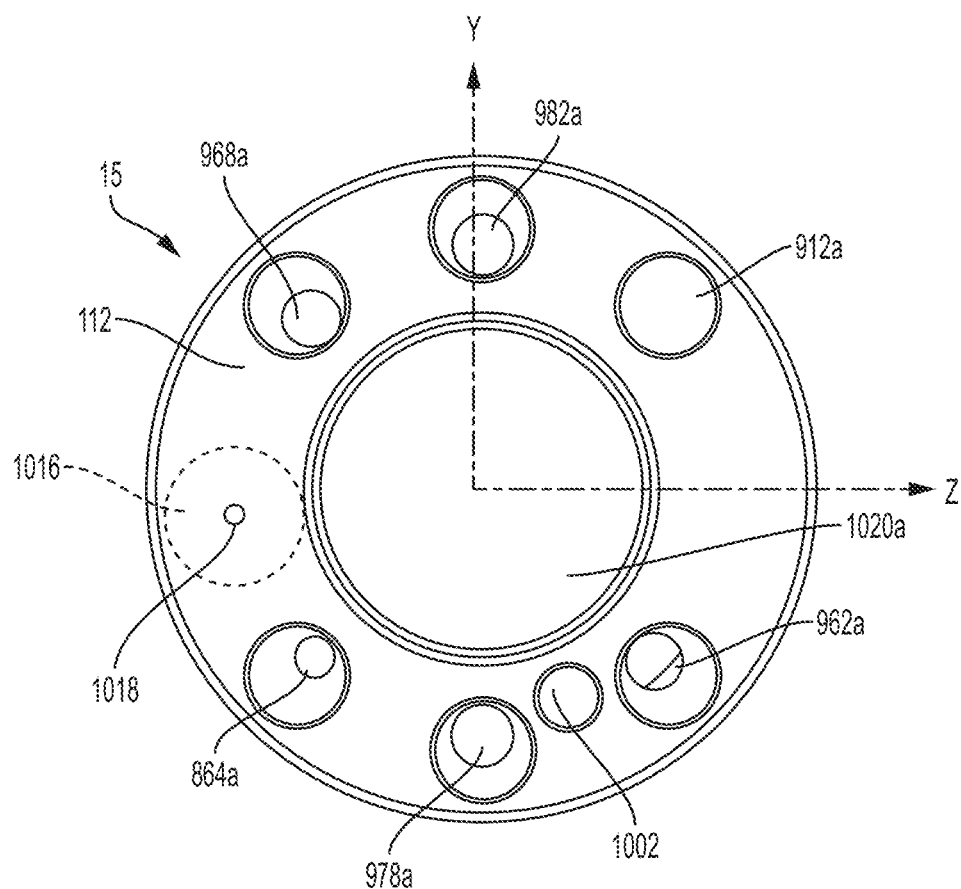
FIG. 15 is a view of the proximal end of the cartridge frame of the cartridge of FIG. 1, according to an illustrative embodiment of the present invention.

With reference to FIG. 4, the distal end 23 of the torch insulator 118 can further include a clocking feature 220 (e.g. a pin) configured to secure the torch insulator 118 with the cartridge frame 112 in a predetermined radial orientation upon engagement between the torch head 102 and cartridge 104. FIG. 15 is a view of the proximal end 15 of the cartridge frame 112, according to an illustrative embodiment of the present invention. The proximal end 15 of the cartridge frame 112 can include a clocking feature (e.g., a pin cavity) 1002 that can interact with the corresponding clocking feature 220 on the distal end 23 of the torch insulator 118 to form at least a section of the interface 106 (shown in FIG. 2) between the torch head 102 and the cartridge 104. Such an interface 106 allows alignment of various electrical, liquid coolant, and gas channels between the torch head 102 and the cartridge 104, thereby maintaining the predefined electrical, liquid coolant and gas flow paths described above with reference to FIGS. 7, 8 and 11a-13b. In some embodiments, the end face of the distal end 23 of the torch insulator 118 is substantially planar. The end face of the proximal end 15 of the cartridge frame 112 can also be substantially planar such that the interface 106 between them is substantially planar.

With respect to the continuity of coolant flow between the torch head 102 and the cartridge 104, upon clocking of the torch insulator 118 with the cartridge frame 112 in the predetermined radial orientation, the first liquid coolant channel opening 960a on the distal end 23 of the torch insulator 118 (shown in FIGS. 4 and 13a) is aligned with the first coolant channel opening 962a at the proximal end 15 of the cartridge frame 112 (shown in FIGS. 13a and 15) to fluidly connect the first liquid coolant channel 958 of the torch insulator 118 with the first liquid coolant channel 962 of the cartridge frame 112 (shown in FIG. 13a). In the same predetermined radial orientation, the second liquid coolant channel opening 960b of the torch insulator 118 (shown in FIGS. 4 and 13*a*) is aligned with the second coolant channel opening 968*a* at the proximal end 15 of the cartridge frame 112 (shown in FIGS. 13*a* and 15) to fluidly connect the second coolant channel 970 of the torch insulator 118 with the second coolant channel 968 of the cartridge frame 112 (shown in FIG. 13*a*). In the same predetermined radial orientation, the third liquid coolant channel opening 960*c* of the torch insulator 118 (shown in FIGS. 4 and 13*b*) is aligned with the third coolant channel opening 978*a* at the proximal end 15 of the cartridge frame 112 (shown in FIGS. 13*b* and 15) to fluidly connect the third coolant channel 976 of the coolant insulator 118 with the third coolant channel 978 of the cartridge frame 112 (shown in FIG. 13*b*). In the same predetermined radial orientation, the fourth liquid coolant channel opening 960*d* of the torch insulator 118 (shown in FIGS. 4 and 13*b*) is aligned with the fourth coolant channel opening 982*a* of the cartridge frame 112 (shown in FIGS. 13*b* and 15) to fluidly connect the fourth coolant channel 984 of the coolant insulator 118 with the fourth coolant channel 982 of the cartridge frame 112 (shown in FIG. 13*b*).

Figure 11B:
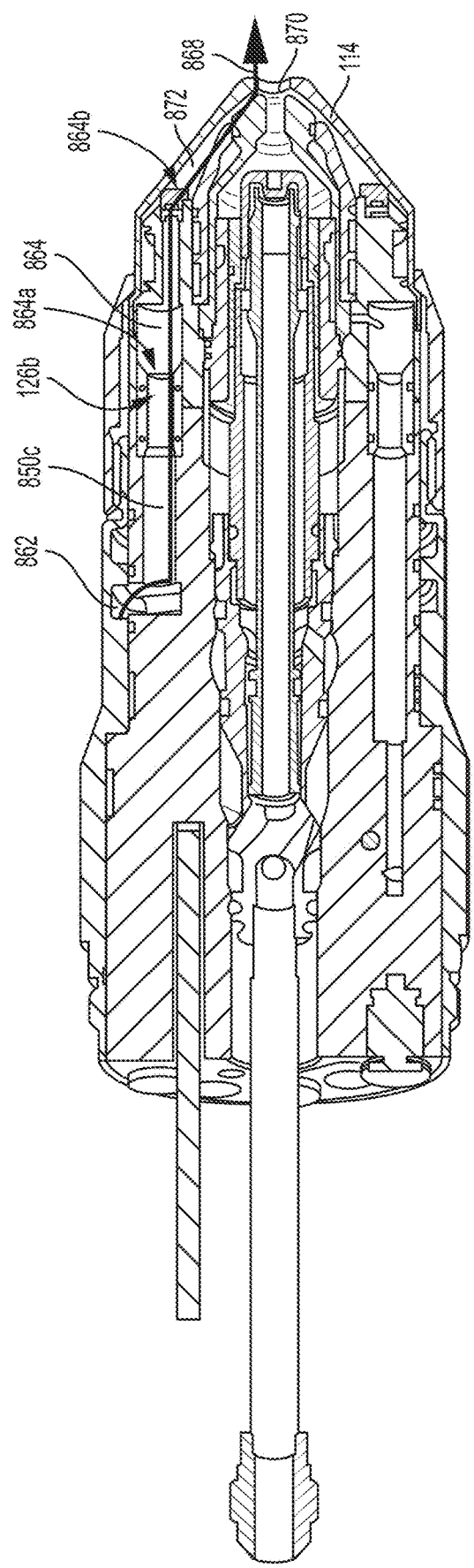

With respect to the continuity of gas flows between the torch head 102 and the cartridge 104, in the predetermined radial orientation, the shield gas opening 126*b* on the distal end 23 of the torch insulator 118 (shown in FIGS. 4 and 11*b*) is aligned with the shield gas opening 864*a* at the proximal end 15 of the cartridge frame 112 (shown in FIGS. 11*b* and 15) to fluidly connect the third shield gas channel segment 850*c* of the torch insulator 118 with the shield gas channel 864 of the cartridge frame 112 (shown in FIG. 11*b*). In the same predetermined radial orientation, the plasma gas opening 200*c* on the distal end 23 of the torch insulator 118 (shown in FIGS. 4 and 12*c*) is aligned with the plasma gas proximal opening 912*a* at the proximal end 15 of the cartridge frame 112 (shown in FIGS. 12*c* and 15) to fluidly connect the plasma gas channel 206 of the torch insulator 118 with the plasma gas channel 912 of the cartridge frame 118 (shown in FIG. 12*c*).

With respect to data communication between the torch head 102 and the cartridge 104, in the predetermined radial orientation enabled by the clocking features 220, 1002, the reader device 122 is rotationally aligned with the signal device 160. For example, the antenna coil 814 embedded in the torch insulator 118 can map to an area 230 at the distal end 23 of the torch insulator 118 (shown in FIG. 4) with a center 232 that substantially aligns with a center 1018 of an area 1016 at the proximal end 15 of the cartridge frame 112 (shown in FIG. 15), which maps to the signal device 160 embedded in the cartridge 104. Such rotational alignment between the centers 232, 1018 reduces communication interference between the reader device 122 and the signal device 160.

Figure 31:
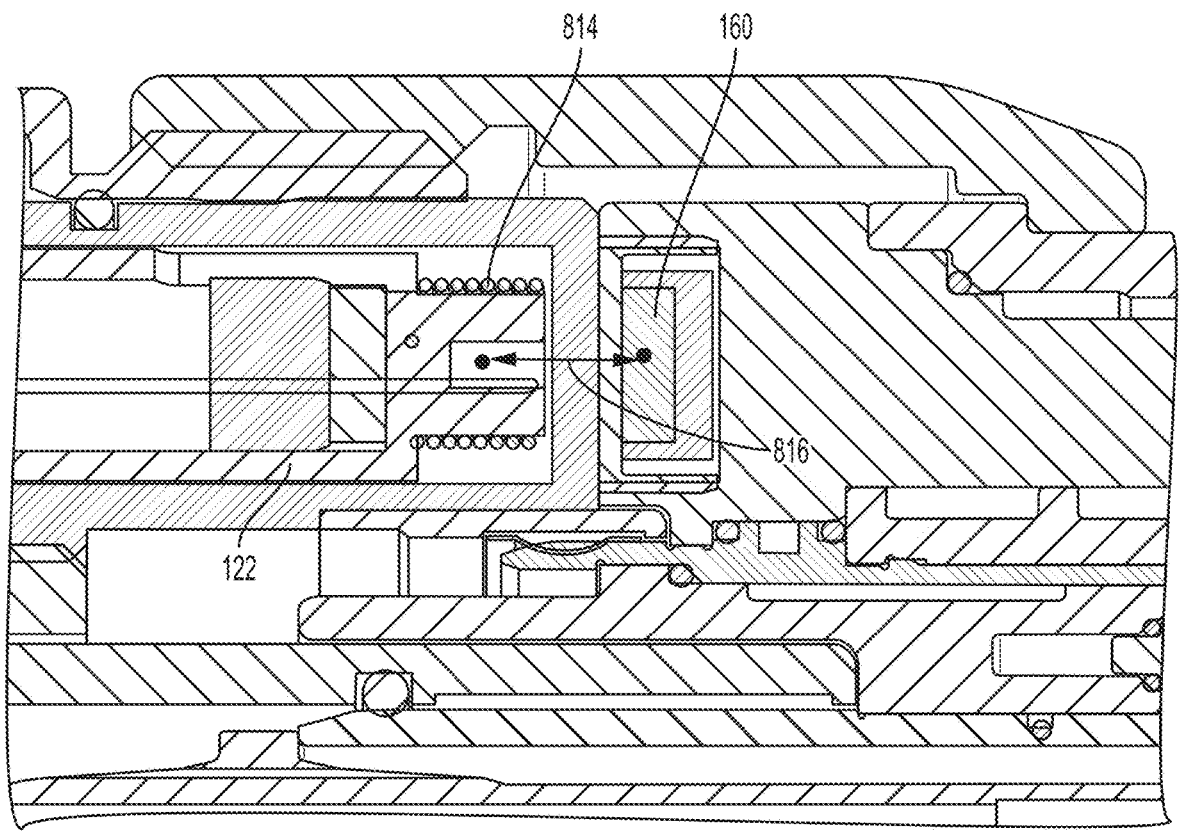
FIG. 31 is a portion of the plasma arc torch of FIG. 2 illustrating exemplary locations of the communication device and the signal device, according to an illustrative embodiment of the present invention.

FIG. 31 is a portion of the plasma arc torch 10 of FIG. 2 illustrating exemplary locations of the communication device 122 and the signal device 160 once the torch head 102 and the cartridge 104 are in the predetermined radial orientation relative to each other, according to an illustrative embodiment of the present invention. In some embodiments, in the aligned position, a distance 816 between the longitudinal and radial center of the antenna coil 814 and the longitudinal and radial center of the signal device 160 is less than a distance between the longitudinal and radial center of the signal device 160 and any adjacent metallic material disposed in the torch head 102 or the cartridge 104. In some embodiments, the RFID field generated by the antenna coil 814 is toroidal in shape around the perimeter of the disc-shaped RFID tag 160. A cross section of the toroidal field at any point is a circle. To prevent interference, the distance between the RFID tag 160 and the reader device 122 along an x axis (measured at the center point of the circular cross-section of the field) is smaller or closer than the distance between the RFID tag 160 to any adjacent metal along the Y axis. Thus, as the RFID field moves in a circular path around the toroidal shape, the field is configured such that it does not encounter any metal before it encounters the RFID tag 160. In some embodiments, in the aligned position, the signal device 160 and the reader device 122 are oriented such that a straight-line axis extends through a centerline of the signal device 160 and a centerline of the reader device 122. In some embodiments, the antenna coil 814 of the reader device 122 is oriented substantially parallel to the signal device 160. In some embodiments, the antenna coil 814 and the RFID tag 160 communicate at a frequency of about 13.5 MHz.

With respect to the continuity of electrical connections between the torch head 102 and the cartridge 104 as shown in FIG. 2, upon interfacing the torch insulator 118 with the cartridge frame 112, the distal opening 132*b* of the main channel 132 of the torch insulator 118 is adapted to align with the opening 1020*a* at the proximal end 15 of the cartridge frame 112 to connect to the main channel 1020 of the cartridge frame 112. Thus, the distal end 742 of the coolant tube 116 is adapted to be inserted into the main channel 1020 of the cartridge frame 112 via the opening 1020*a*. An opening 1020*b* of the main channel 1020 at the distal end 17 of the cartridge frame 112 is connected to the cavity 954 of the electrode 108 such that the coolant tube 116 extends through the opening 1020*b* and into the cavity 954. As explained above, pilot arc current and/or transferred arc current from the power supply can be routed from the cathode 130 of the torch head 102 to the coolant tube 116, both of which are affixed to the torch insulator 118, and to the electrode 108 of the cartridge 104 via the inner surface of the electrode cavity 954. The current-carrying coolant tube 116 thus energizes the interior surface of the electrode 108. In some embodiments, one or more Louvertac bands 702, 704 on either or both ends 740, 742 of the coolant tube 116 are used to facilitate conduction of electricity from the power supply to the inner surface of the electrode 108. The use of at least the Louvertac band 704 at the distal end 742 of the coolant tube 116 radially aligns/centers the electrode 108 relative to the coolant tube 116, but does not affix the electrode 108 to any particular radial orientation. For example, during assembly, an operator can apply an axial force to push the electrode 108 proximally against the coolant tube 116 until the Louvertac band 704 at the distal end 742 of the coolant tube 116 is fully seated within the cavity 954 of the electrode 108 and is covered by most of the cavity 954. The Louvertac band 704 of the coolant tube 116 thus allows the electrode 108 to be axially pushed on or pulled off during engagement or disengagement, respectively, without the use of threading (or other clocking movement), thereby enabling the use of a tool-free and/or threadless electrode 108.

The simple push-on/pull-off feature is also compatible with the engagement between the clocking feature 220 of the torch insulator 118 and the clocking feature 1002 of the cartridge frame 112 to form the interface 106. That is, the coupling between the torch head 102 and the cartridge 104 can be governed by the locking features 220, 1002 without the need to account for any threading or other clocking requirement between the electrode 108 and the coolant tube 116. In general, allowing the coolant tube 116 and the Louvertac band 704 to carry the pilot arc/transferred arc current to the cartridge 104 separates (i) the physical interface between the torch insulator 118 and the cartridge frame 112 from (ii) the electrical connection between the cathode 130/coolant tube 116 and the electrode 108. This separation is adapted to maximize design space and simplify torch assembly. In addition, the relatively straight axial installation and removal of the coolant tube 116 (and thus the torch head 102) from the electrode 108 (and thus the cartridge 104) promotes quicker consumable replacement and installation. Further, due to the placement of the Louvertac band 704 in relation to the coolant tube 116 (e.g., on an exterior surface of the coolant tube 116), the Louvertac band 704 can be easily inspected and readily serviced. In alternative embodiments, instead of using the Louvertac band 704, other current-carrying and/or retaining features can be used, such as thread attachments, interference fits, etc.

In some embodiments, because the cutting current is carried from the power supply to the electrode 108 by the coolant tube 116, the electrode 108 does not need to be in directly electrical or physical contact with the torch head 102 for current transfer purposes. In some embodiments, the electrode 108 is electrically isolated from the torch head 102 by the cathode block electrode tube 252, which connects the electrode 108 to the cathode 130 and the coolant tube 116. The cathode block electrode tube 252 can be made of a non-conductive material such as plastic. In another aspect, the electrode 108 is shorter than an electrode that is used to receive a current directly from the cathode. In this case, because the electrode 108 no longer physically or electrically contacts the cathode 130, the electrode 108 can be shorter, such as more than 25% shorter, than a direct-contact electrode.

Figure 16:
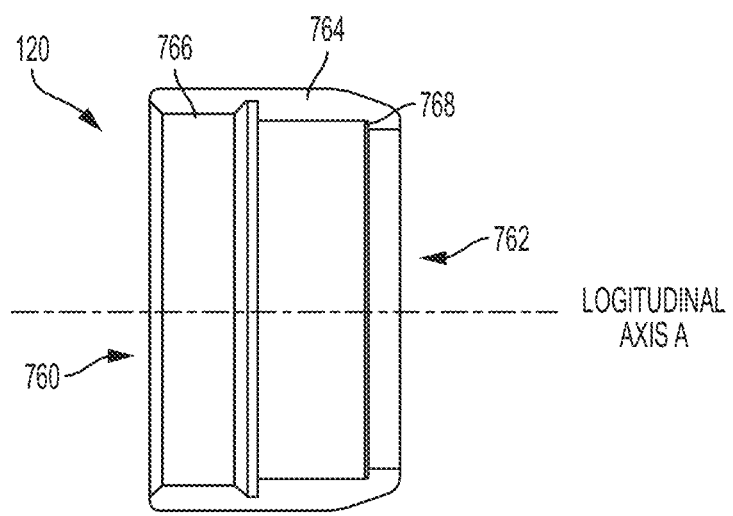
FIG. 16 is a sectional view of an exemplary design of the retaining cap 120 of FIG. 1, according to an illustrative embodiment of the present invention.

Upon axial insertion of the coolant tube 116 into the cavity 954 of the electrode 108 and radial clocking of the torch insulator 118 with the cartridge frame 112 (e.g., via insertion of the clocking pin 220 of the torch insulator 118 into the clocking pin cavity/receptacle 1002 of the cartridge frame 112), the cartridge 104 can be retained against the torch head 102 using the retaining cap 120 (shown in FIG. 1). Other engagement methods between the torch head 102 and the cartridge 104 are possible, including threading, snap fit, interference fit, etc. FIG. 16 is a sectional view of an exemplary design of the retaining cap 120 of FIG. 1 used to secure the cartridge 104 and the torch head 102 to each other, according to an illustrative embodiment of the present invention. The retaining cap 120 includes a body 764, a proximal end 760 and a distal end 762 extending along the longitudinal axis A. The proximal end 760 of the retaining cap body 764 includes an engagement feature 766 (e.g., groove, thread or step) circumferentially disposed on an internal surface to capture the torch head 102 against the retaining cap body 764. Similarly, the distal end 762 of the retaining cap body 764 includes an engagement feature 768 (e.g., groove, thread or step) disposed on an internal surface to capture the cartridge 104 against the retaining cap body 764. Thus, upon clocking of the cartridge 104 with the torch head 102, the retaining cap 120 can securely and circumferentially surround an external surface of the torch head 102 at the distal end 22 of the torch head 102 and an external surface of the cartridge 104 at the proximal end 14 of the cartridge 104. In some embodiments, the torch head 102 and/or the cartridge do not rotate with respect to the retaining cap 120. In this case, an operator can slide the retaining cap 120 over the cartridge 104 and/or the torch head 102 to lock the parts without using any rotational movement. In some embodiments, the retaining cap 120 is provided as a part of the torch head 102. In some embodiments, the retaining cap 120 is provided as a part of the cartridge 104. In some embodiments, the retaining cap 120 is provided as a distinct component separate from the cartridge 104 or torch head 102.

Cartridge

Figure 17:
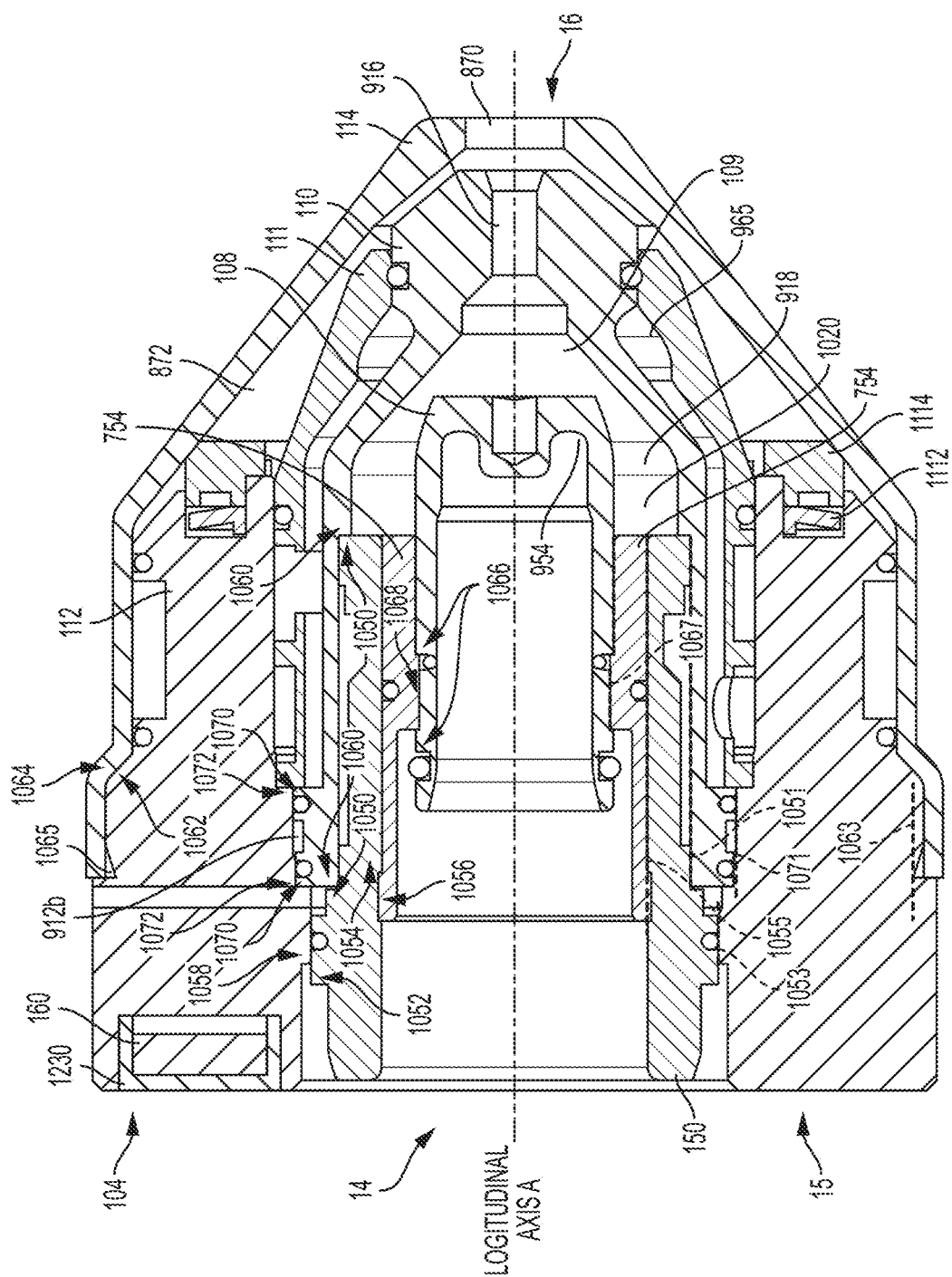
FIG. 17 is a sectional view of the cartridge of FIG. 1, according to an illustrative embodiment of the present invention.

FIG. 17 is a sectional view of the cartridge 104 of FIG. 1, where the cartridge 104 is a non-vented cartridge, according to an illustrative embodiment of the present invention. As described above, the cartridge 104 can generally include the cartridge frame 112 coupled to the cartridge tip that includes the electrode 108, the nozzle 110, which is a non-vented nozzle attached to a nozzle jacket 111, and the shield 114. The cartridge frame 112 is adapted to form an interface between the cartridge tip and the torch head 102, thereby connecting the cartridge tip to the torch head 102. The various components of the cartridge 104, including the cartridge frame 112, the electrode 108, the nozzle 110, the nozzle jacket 111 and the shield 114, can be concentrically disposed about the longitudinal axis A of the plasma arc torch 10. In some embodiments, the cartridge 104 includes multiple retaining features that allow the components of the cartridge tip to align with and engage to one or more channels in the cartridge frame 112 such that these channels can conduct liquid and gas from the torch head 102, through the cartridge frame 112, and to the desired components in the cartridge tip. In some embodiments, the proximal end 14 of the cartridge 104, including the proximal end 15 of the cartridge frame 112, is substantially planar.

In general, the various components of the cartridge tip can be secured, either directly or indirectly, to the cartridge frame 112 while achieving axial alignment and radial alignment (i.e., centering) with respect to the cartridge frame 112. The electrode 108 can be secured to the cartridge frame 112 with at least a portion of the electrode 108 disposed in the central channel 1020 of the cartridge frame 112. In some embodiments, the electrode 108 is secured to the cartridge frame 112 via the swirl ring 150 that surrounds at least a portion of the main channel 1020. Specifically, an outer diameter of the electrode 108 can be secured to an inner diameter of the swirl ring 150 such that at least a proximal portion of the electrode 108 is inserted into a distal portion of the swirl ring 150. If the swirl ring 150 is electrically conductive, the swirl ring 150 can be secured to the electrode 108 via the electrode insulator 754. As shown, the electrode 108 includes an outer retaining feature 1066 (e.g., one or more steps of varying diameter of the electrode 108) on an exterior surface configured to matingly engage an inner retaining feature 1068 (e.g., one or more complementary steps or protrusions) on an interior surface of the electrode insulator 754 to prevent axial movement of the electrode 108 and the electrode insulator 754 relative to each other. The mating between the retaining features 1066, 1068 can be one of snap fit, press fit or interference fit. The resulting interface 1067 between the electrode 108 and the electrode insulator 754 also radially aligns/centers the two components. In turn, the electrode insulator 754 includes an outer retaining feature 1056 (e.g., a step of varying diameter of the electrode insulator 754) on an exterior surface to matingly engage an inner retaining feature 1054 (e.g., a complementary step or protrusion) on an interior surface of the swirl ring 150 to prevent axial movement of the electrode insulator 754 and the swirl ring 150 relative to each other. The mating between the retaining feature 1054, 1056 can be one of snap fit, press fit or interference fit. The resulting interface 1055 between the electrode insulator 754 and the swirl ring 150 also radially aligns/centers the two components. If the swirl ring 150 is substantially non-conductive, the swirl ring 150 can be directly secured to the electrode 108 without the use of the electrode insulator 754. In some embodiments, an outer diameter of the swirl ring 150 is matingly engaged to an inner diameter of the cartridge frame 112 to couple the electrode 108 to the cartridge frame 112. For example, the swirl ring 150 can be secured to the cartridge frame 112 by matingly engaging an outer retaining feature 1052 (e.g., a step of varying diameter of the swirl ring 150) on an exterior surface with an inner retaining feature 1058 (e.g., a complementary step or protrusion) on an interior surface of the cartridge frame 112 to prevent axial movement of the swirl ring 150 and the cartridge frame 112 relative to each other. The mating between the retaining features 1052, 1058 can be one of snap fit, press fit or interference fit. The resulting interface 1053 between the the swirl ring 150 and the cartridge frame 112 also radially aligns/centers the two components.

The nozzle 110 and the nozzle jacket 111 can be engaged between the swirl ring 150 and the cartridge frame 112. In some embodiments, an outer diameter of the swirl ring 150 is engaged to an inner diameter of the nozzle 110. The swirl ring 150 can be secured to the nozzle 110 by matingly engaging an outer retaining feature 1050 (e.g., one or more steps of varying diameter of the swirl ring 150) on an exterior surface with an inner retaining feature 1060 (e.g., a complementary step or protrusion) on an interior surface of the nozzle 110 to prevent axial movement of the swirl ring 150 and the nozzle 110 relative to each other. The mating between the retaining features 1050, 1060 can be one of snap fit, press fit or interference fit. The resulting interface 1051 between the the swirl ring 150 and the nozzle 110 also radially aligns/centers the two components. In some embodiments, an outer diameter of the nozzle 110 is secured to an inner diameter of the cartridge frame 112. The nozzle 110 can be secured to the cartridge frame 112 by matingly engaging at least one outer retaining feature 1070 (e.g., one or more steps of varying diameter of the nozzle 110) on an exterior surface to at least one inner retaining feature 1072 (one or more complementary steps or protrusions) on an interior surface of the cartridge frame 112 to prevent axial movement of the nozzle 110 and the cartridge frame 112 relative to each other. The mating between the retaining features 1070, 1072 can be one of snap fit, press fit or interference fit. The resulting interface 1071 between the nozzle 110 and the cartridge frame 112 also radially aligns/centers the two components.

The shield 114 can be coupled to an outer surface the cartridge frame 112. For example, an outer diameter of the cartridge frame 112 is secured to an inner diameter of the shield 114 by matingly engaging an outer retaining feature 1062 (e.g., a step of varying diameter of the cartridge frame 112) on an exterior surface of the cartridge frame 112 with an inner retaining feature 1064 (e.g., a complementary step or protrusion) on an interior surface of the shield 114 to prevent axial movement of the cartridge frame 112 and the shield 114 relative to each other. The mating between the retaining features 1062, 1064 can be one of snap fit, press fit or interference fit. The resulting interface 1063 between the cartridge frame 112 and the shield 114 also radially aligns/centers the two components. In addition, the cartridge frame 112 can include an indentation 1065 on an exterior surface configured to receive a distal portion of the shield 114 via crimping, thereby further securing and aligning the shield 114 to the cartridge frame 112.

In some embodiments, the retaining features 1050-1072 described above can mate with their corresponding retaining features through one of snap fit, press fit, interference fit, crimping, frictional fitting, gluing, cementing or welding. In some embodiments, the retaining features 1050-1072 include one or more sealing o-rings or gaskets, made of hardening epoxy or rubber for example. In some embodiments, the retaining features 1050-1072 allow the nozzle 110, the jacket 111, the shield 114 and/or the electrode 108 of the cartridge tip to align with and engage to one or more channels in the cartridge frame 112 such that these channels can conduct liquid and/or gas from the torch head 102, through the cartridge frame 112, and to the desired components in the cartridge tip. The liquid and gas connections between the cartridge frame 112 and the cartridge tip is described below in detail.

Figure 18:
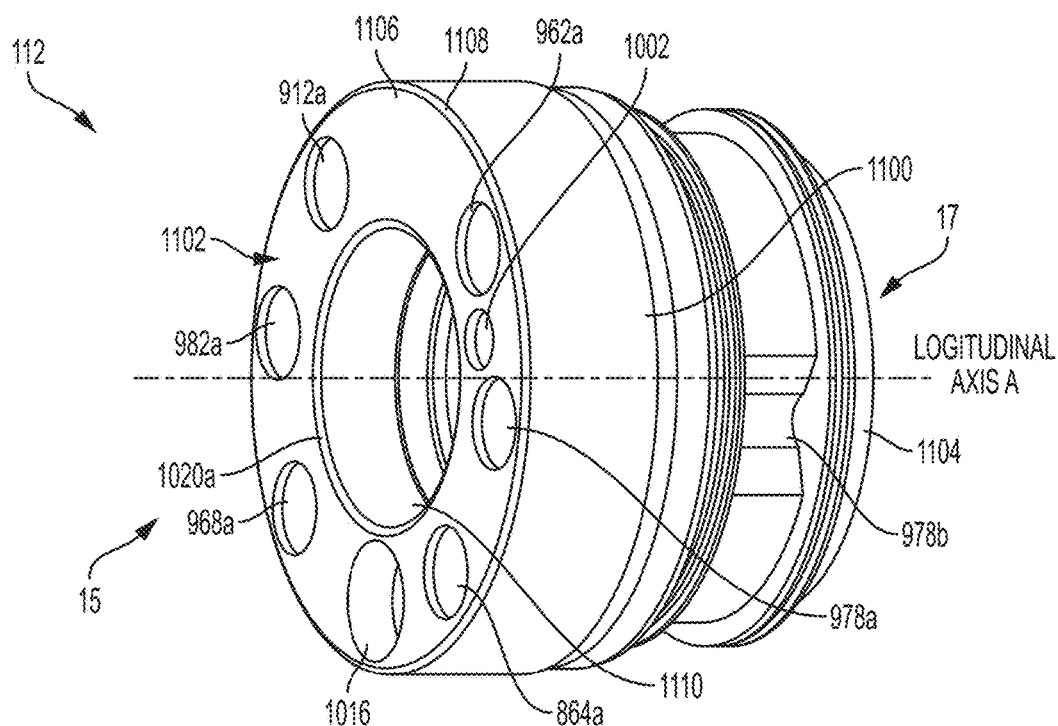
FIG. 18 is an exemplary design of the cartridge frame of the cartridge of FIG. 17, according to an illustrative embodiment of the present invention.

FIG. 18 is an exemplary design of the cartridge frame 112 of the cartridge 104 of FIG. 17, according to an illustrative embodiment of the present invention. The cartridge frame 112 includes a generally cylindrical insulator body 1100 disposed between the torch head 102 and the cartridge tip. More specifically, the insulator body 1100 includes an inner region 1106, an outer side surface 1108, an inner side surface 1110 surrounding and forming the main channel 1020, the proximal end 15 having an end face 1102, and the distal end 17 having an end face 1104. The proximal end 15 of the cartridge frame 112, which is described above with respect to FIG. 15, comprises the central opening 1020a for receiving an electrical current and/or the coolant flow 950 from a coolant tube 116 of the torch head 102, a plasma gas opening 912a for receiving the plasma gas flow 900c from the torch insulator 118, a shield gas opening 864a for receiving the shield gas flow 868 from the torch insulator 118 and four liquid coolant openings 968a, 978a, 962a and 982a for conducting the liquid coolant flow 950 in and out of the cartridge 104. In some embodiments, these openings are disposed on the end face 1102 of the proximal end 15 of the insulator body 1100. In some embodiments, the end face 1102 is substantially coplanar with the proximal end 14 of the cartridge 104. In general, these openings are configured to be in electrical and/or fluid communication with their corresponding openings on the distal end 23 of the torch insulator 118 once the torch head 102 is aligned with and connected to the cartridge 104 in a predetermined orientation via the locking feature 1002 of the cartridge frame 112 and the corresponding locking feature 220 of the torch insulator 118.

Electrical Connections in the Cartridge

In some embodiments, the electrode 108 is aligned with and connected to the main channel 1020 disposed in the insulator body 1100 of the cartridge frame 112. The channel 1020 can be centrally disposed in the insulator body 110 with the central longitudinal axis A extending therethrough to connect the opening 1020a on the end face 1102 of the proximal end 15 of the cartridge frame 112 to the opening 1020b on the end face 1104 of the distal end 17 of the cartridge frame 112. The distal opening 1020b is in turn connected to and aligned with the cavity 954 of the electrode 108 (shown in FIG. 2). Such an electrode interface allows the coolant tube 116 to be inserted into the main channel 1020 to pass an electrical current (i.e., a pilot arc or transferred arc current) from the cathode 130 of the torch head 102 to the inner surface of the electrode 108, as described above. In such a case, the electrode 108 can be electrically isolated from the cathode 130, as described above. In alternative embodiments, the electrode 108 is electrically connected to the cathode 130 to receive a current directly from the cathode 130. In some embodiments, the same electrode interface (i.e., between the electrode 108 and the torch head 102 via the main channel 1020 of the cartridge frame 112) can allow the torch head 102 to introduce a liquid coolant to the electrode 118 from inside of the coolant tube 116. This liquid coolant conduction feature of the main channel 1020 of the cartridge frame 112 is explained in detail below.

Figure 19:
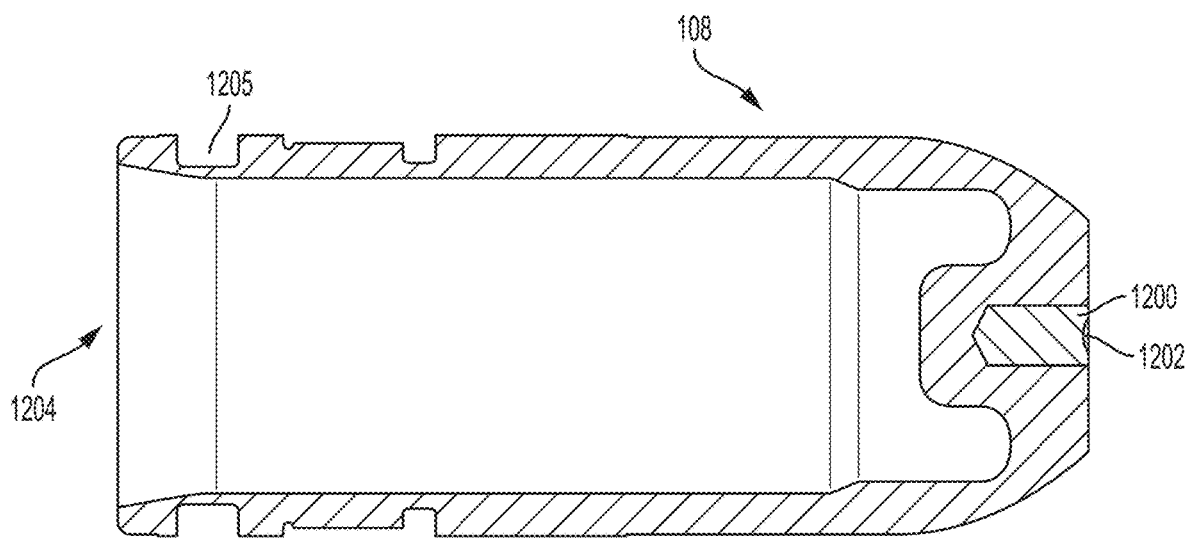
FIG. 19 is an exemplary design of the electrode of the cartridge of FIG. 17, according to an illustrative embodiment of the present invention.

FIG. 19 is an exemplary design of the electrode 108 of the cartridge 104 of FIG. 17, according to an illustrative embodiment of the present invention. An emissive insert 1200 can be disposed in the distal end 1202 of the electrode 108 so that an emission surface is exposed. The insert 1200 can be made of hafnium or other materials that possess suitable physical characteristics, including corrosion resistance and a high thermionic emissivity. Forging, impact extrusion, or cold forming can be used to initially form the electrode 108 prior to finish machining the component. The proximal end 1204 of the electrode 108 can be disposed in and aligned with the main channel 1020 of the cartridge frame 112 via the distal opening 1020b of the cartridge frame 112. The electrode 108 can be connected to the cartridge frame 112 using at least the swirl ring 150 and the electrode insulator 754. In some embodiments, the electrode 108 does not include any threads for connection to the electrode insulator 754 or the swirl ring 150. As explained above, such a connection can be made through one of press fit, interference fit, crimping or snap fit. In some embodiments, the electrode 108 is shorter than an electrode that is used to receive an electrical current directly from the cathode 130 (i.e., without using the coolant tube 116). In these cases, because the electrode 108 does not need to physically or electrically contact the cathode 130, the electrode 108 can be shorter, such as more than 25% shorter, than a direct-contact electrode. In some embodiments, the electrode 108 includes an o-ring groove 1205 at the proximal end 1204, where the o-ring groove 1205 is configured to house an o-ring that can be used to seal a plasma chamber/plenum 109 cooperatively defined by the electrode 108 and the nozzle 110. Such sealing prevents the plasma gas flow 900c from traveling between the electrode 108 and the electrode insulator 754 (shown in FIG. 17).

Shield Gas Connections in the Cartridge

In some embodiments, the shield gas passage 872 formed between the shield 114 and the nozzle jacket 111 is aligned with the shield gas channel 864 disposed in the insulator body 1100 of the cartridge frame 112 (shown in FIGS. 11a and b). The shield gas channel 864 (shown in FIGS. 11a and b) can extend substantially parallel to the longitudinal axis A in the inner region 1106 of the insulator body 1100, but offset from the central longitudinal axis A (i.e., non-concentric with respect to the longitudinal axis A). The shield gas channel 864 connects the opening 864a on the end face 1102 at the proximal end 15 of the cartridge frame 112 to the opening 864b at the distal end 17 of the cartridge frame 112. In some embodiments, the opening 864b is disposed on the end face 1104 of the distal end 17 of the cartridge frame 112. In alternative embodiments, the opening 864b of the shield gas channel 864, which is distal to the opening 864a along the longitudinal axis A, is disposed on the outer side surface 1108 or the inner side surface 1110 of the cartridge frame body 1100 (i.e., the channel 864 does not extend through the entire length of the body 1100 in the longitudinal direction). The opening 864b is in turn fluidly connected to the shield gas passage 872, which allows the shield gas flow 868 to pass from the torch head 102, through the cartridge frame 112 of the cartridge 104, and into the shield gas passage 872 (shown in FIGS. 11a and b). In some embodiments, the shield gas channel 864 can be configured to provide a metering function to the shield gas flow 868 therein. For example, the diameter of the shield gas channel 864 can vary over the length of the channel to provide the metering function. The diameter of the shield gas channel 864 at the distal end 17 of the cartridge frame 112 can be about half of the diameter of the shield gas channel 864 at the proximal end 15 of the cartridge frame 112 to reduce the flow rate of the shield gas flow 868.

In some embodiments, the cartridge frame 112 includes one more components in the path of the shield gas channel 864 to adjust one or more properties of the shield gas flow 868 therein. For example, the cartridge frame 112 can include an adjustment component, such as a two-piece component comprising a baffle 1112 and a shield swirl ring 1114. As shown in FIG. 17, the baffle 1112 and the shield swirl ring 1114 are circumferentially disposed within the insulator body 1100 of the cartridge frame 112 at its distal end 17 and the two components are in the path of the shield gas channel opening 864b such that they adjust certain flow parameters and introduce a swirling motion to the shield gas flow 868 as it exits the cartridge frame 112 and into the shield gas passage 872. The use of these two separate components 1112, 1114 provide manufacturing and assembly advantages as an operator can use different combinations of baffles and shield swirl rings to develop different types of shield gas flows.

Figure 20:
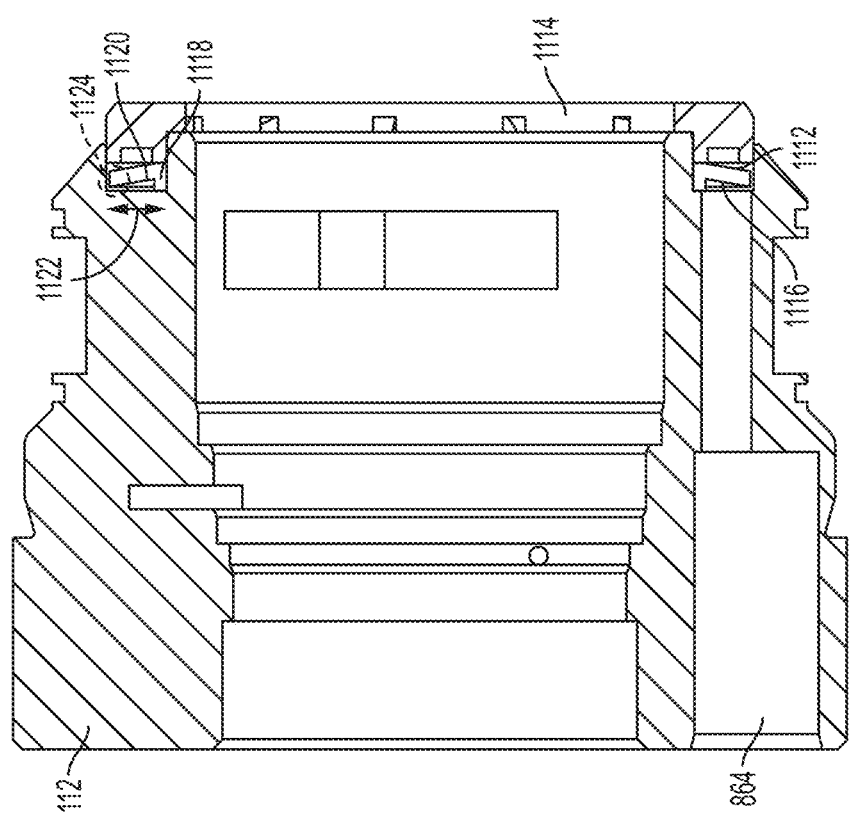
FIG. 20 is a cross-sectional view of the baffle and the shield swirl ring attached to the cartridge frame of the cartridge of FIG. 17, according to an illustrative embodiment of the present invention.

FIG. 20 is a cross-sectional view of the baffle 1112 and the shield swirl ring 1114 attached to the cartridge frame 112 of the cartridge 104 of FIG. 17, according to an illustrative embodiment of the present invention. In some embodiments, at least one of the baffle 1112 or the shield swirl ring 1114 is made of a non-conductive material, such as Torlon™. In some embodiments, at least one of the baffle 1112 or the shield swirl ring 1114 is made of a conductive material. The baffle 1112 and the shield swirl ring 1114 can be individually manufactured through molding, stamping or die casting.

As shown, the baffle 1112 is situated proximal to the shield swirl ring 1114 such that when the shield gas flow 868 travels distally, it is first regulated by the baffle 1112 and then by the shield swirl ring 1114. In other embodiments, the position of the baffle 1112 and the shield swirl ring 1114 are reversed. The baffle 1112 can be circumferentially disposed within the insulator body 1100 of the cartridge frame 112, such as within a cavity 1116 at the distal end 17 of the insulator body 1100. The baffle 1112 can be secured to the cavity 1116 by one of interference fit or press fit. The baffle 1112 includes a longitudinal portion 1118 and and a radial portion 1120 that is connected to the longitudinal portion 1118 at an angle such that the radial portion 1120 covers a portion of the width 1122 of the cavity 1116, but leaves a radial clearance 1124 between an outer diameter of the radial portion 1120 and an inner surface of the cavity 1116. The shield gas flow 868 within the shield gas channel 864 is adapted to be dispersed by the baffle 1112 to flow evenly around its outer diameter through the radial clearance 1124 and into the swirl ring 1114. The radial clearance 1124 is shaped and dimensioned to adjust at least one parameter of the shield gas flow 868. For example, the radial clearance 1124 can adjust a flow rate and/or fluid pressure of the shield gas flow 868. In some embodiments, increasing the size of the radial clearance 1124 increases the flow rate of the shield gas flow 868, in which case the plasma arc torch system can adjust accordingly to maintain a constant pressure. In some embodiments, increasing the size of the radial clearance 1124 decreases the gas pressure, in which case the plasma arc torch system can adjust accordingly to maintain a constant flow rate.

Figure 21:
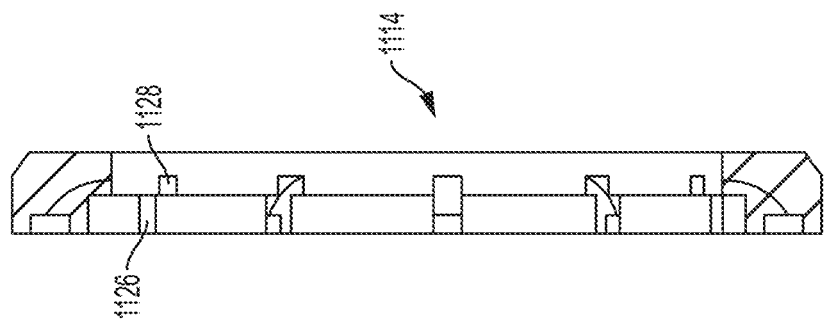
FIG. 21 is a cross-sectional view of the shield swirl ring of the cartridge of FIG. 17, according to an illustrative embodiment of the present invention.

The shield swirl ring 1114 can be inserted into at least a portion of the cavity 1116 by at least one of interference fit or press fit such that it is distal in relation to the baffle 1112. FIG. 21 is a cross-sectional view of the shield swirl ring 1114, according to an illustrative embodiment of the present invention. The shield swirl ring 1114 can define a first set of ports 1126 around a first circumference of the swirl ring 1114 and a second set of ports 1128 around a second circumference of the swirl ring 1114, where each port connects an interior surface of the cartridge frame 112 to an exterior surface of the cartridge frame 112. The first set of ports 1126 are offset from their respective ones of the second set of ports 1128. Such an offset imparts a swirling motion to the shield gas flow 868 therethrough. Therefore, the combination of the baffle 1112 and the shield swirl ring 1114 can adjust parameters of the shield gas flow 868 as it travels distally through the shield gas channel 864 to the shield gas passage 872. Generally, the shield gas flow 868 in the plasma arc torch 10 is configurable by varying the size of the clearance 1124 of the baffle and/or the sizes of the first and second sets of ports 1126, 1128 in the shield swirl ring 1114.

Plasma Gas Connections in the Cartridge

In some embodiments, the plasma gas passage 918 formed between the electrode 108 and the nozzle 110 is aligned with the plasma gas channel 912 disposed in the insulator body 1100 of the cartridge frame 112 (shown in FIGS. 12a-c). The plasma gas channel 912 (shown in FIGS. 12a-c) can extend substantially parallel to the longitudinal axis A in the inner region 1106 of the insulator body 1100, but offset from the longitudinal axis A (i.e., non-concentric with respect to the longitudinal axis A). The plasma gas channel 912 connects the opening 912a on the proximal surface 1102 at the proximal end 15 of the cartridge frame 112 to the opening 912b. In some embodiments, the opening 912b of the plasma gas channel 912, which is distal to the opening 912a along the longitudinal axis A, is disposed on the inner side surface 1110 of the cartridge frame body 1100 and in fluid communication with the central channel 1020. Thus, in this configuration, the plasma gas channel 912 does not extend over the entire length of the cartridge frame body 1100 in the longitudinal direction.

Figure 22:
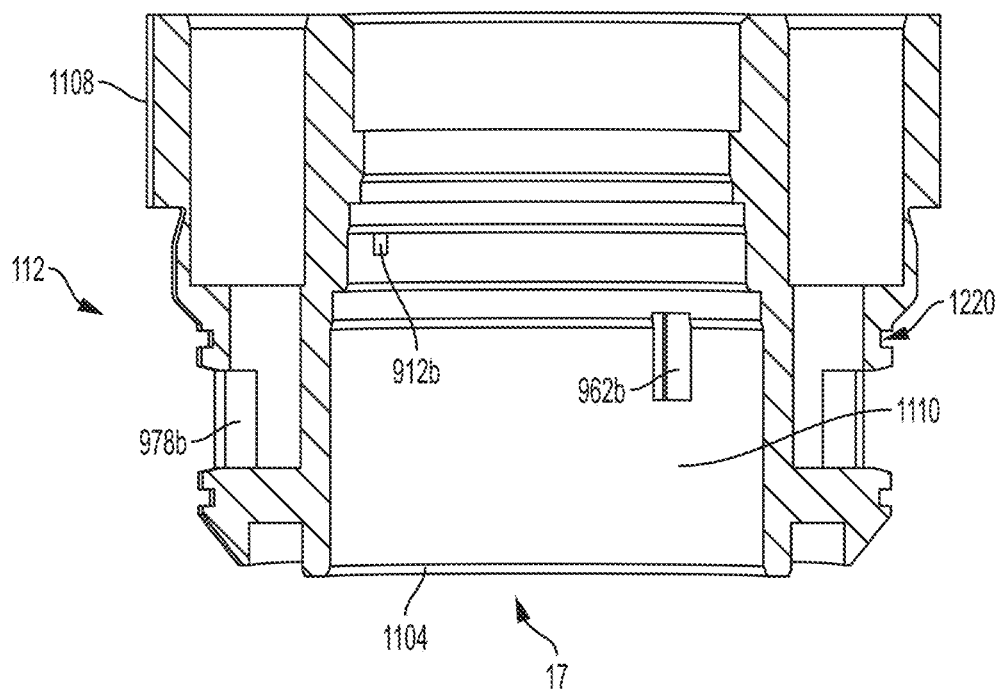
FIG. 22 is a perspective view of the cartridge frame of the cartridge of FIG. 17 illustrating various channel openings, according to an illustrative embodiment of the present invention.

FIG. 22 is a perspective view of the cartridge frame 112 illustrating various channel openings, including the opening 912b of the plasma gas channel 912, according to an illustrative embodiment of the present invention. As shown, the opening 912b is on the inner side surface 1110 in a central region of the cartridge frame 112, and the opening 912b is fluidly connected to the central channel 1020. In alternative embodiments, the plasma gas channel 912 extends over the entire length of the cartridge frame 112 with the opening 912b located on the distal end face 1104 of the cartridge frame insulator body 1100. The opening 912b is fluidly connected to the plasma gas passage 918. Such a connection allows the plasma gas flow 900c to pass from the torch head 102, through the cartridge frame 112, and into the plasma gas passage 918, which merges into the central main channel 1020, before the plasma gas flow 900c exits the torch 10 via the central nozzle exit orifice 916 and the central shield exit orifice 870 (shown in FIGS. 12a-c).

In some embodiments, the cartridge frame 112 includes one more components in the path of the plasma gas channel 912 configured to adjust one or more properties of the plasma gas flow 900c therein. For example, the cartridge frame 112 can include the swirl ring 150 circumferentially situated between the electrode insulator 754 and the nozzle 110 around the main channel 1020. The swirl ring 150 can be aligned with the distal plasma gas channel opening 912b such that the swirl ring 150 can introduce a swirling motion to the plasma gas flow 900c as it exits the plasma gas channel 912 via the opening 912b on the inner side surface 1110 of the cartridge frame 112 and into the plasma gas passage 918.

Figure 23:
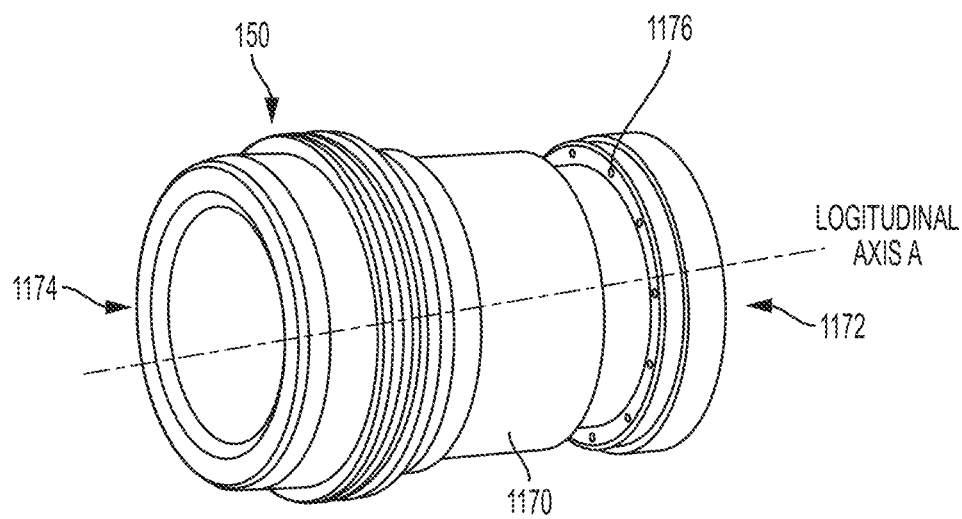
FIG. 23 is an exemplary design of the swirl ring of the cartridge of FIG. 17, according to an illustrative embodiment of the present invention.

FIG. 23 is an exemplary design of the swirl ring 150 of the cartridge 104 of FIG. 17, according to an illustrative embodiment of the present invention. As shown, the swirl ring 150 can be defined by a substantially hollow, elongated body 1170 having a proximal end 1174 and a distal end 1172 along the central longitudinal axis A of the plasma arc torch 10. In some embodiments, the hollow body 1170 of the swirl ring 102 at the distal end 1172 is dimensioned to receive a least a portion of the electrode 104 either directly or indirectly via the electrode insulator 754. In some embodiments, the swirl ring 150 includes a set of radially spaced gas flow openings 1176 disposed about the distal end 1172 of the elongated body 1170, such as around a circumference of its distal end 1172. Each gas flow opening 1176 can extend from an interior surface to an exterior surface of the elongated body 1170 and is oriented to impart a tangential velocity component to the plasma gas flow 900c traveling in the gas passage 918 between the electrode 108 and the nozzle 110, thereby causing the gas flow 900c to swirl. This swirl creates a vortex that constricts the plasma arc and stabilizes the position of the arc on the insert 1200 of the electrode 108.

Coolant Connections in the Cartridge

In some embodiments, as described above, a component of the cartridge tip (e.g., the electrode 108, the nozzle 110 or the shield 114) can be aligned with at least one cooling channel (e.g., channel 1002, 962 or 978) and at least one coolant return channel (channel 1002, 968 or 982) in the insulator body 1100 of the cartridge frame 112 to receive a liquid coolant flow from the torch head 102 and return at least a portion of the fluid flow to the torch head 102, respectively. Each of the cooling channels and the return channels, with the exception of the main channel 1002, can be non-concentric with respect to the central longitudinal axis A and asymmetric about the longitudinal axis A. In some embodiments, with the exception of the main channel 1002, none of the cooling and returning channels are overlapping. That is, with the exception of the main channel 1002, each of the cooling and returning channels is either a liquid inlet channel or a liquid outlet channel.

In some embodiments, the central channel 1020 extends through the insulator body 1100 of the cartridge frame 112 to connect its opening 1020a on the end face 1102 at the proximal end 15 of the cartridge frame 112 to its opening 1020b at the distal end 17 of the cartridge frame 112. The proximal opening 1020a is aligned with and connected to the main channel opening 132b of the torch insulator 118. The distal opening 1020b is aligned with and connected to the cavity 954 of the electrode 108, which allows the coolant flow 950 to pass from the torch head 102, through the cartridge frame 112 while inside of the coolant tube 116, and into the cavity 954 of the electrode 108 (shown in FIGS. 13a and b). This connection also allows the coolant flow 950 to impinge on the inner surface of the distal end of the cavity 954 such that the coolant flow 950 can reverse direction and travel proximally through the main channel 1020 along an outer surface of the coolant tube 116 toward the torch head 102 (shown in FIGS. 13a and b). This reverse coolant flow over the exterior surface of the coolant tube 116 also substantially cools the Louvertac band 704 attached to the distal end 742 of the coolant tube 116. In some embodiments, the reverse coolant flow can travel through the longitudinal channels 744 on the exterior surface of the coolant tube 116 beneath the Louvertac band 704, thereby limiting a pressure drop between the coolant tube 116 and the electrode 108.

In some embodiments, the nozzle opening 966, which can be formed on the nozzle jacket 111, is aligned with the first coolant channel 962 disposed in the insulator body 1100 of the cartridge frame 112 (shown in FIGS. 13a and b). The nozzle opening 966 allows the coolant flow 950 from the first coolant channel 962 to enter the nozzle coolant flow chamber 965 between an exterior surface of the nozzle 110 and an interior surface of the nozzle jacket 111. The first coolant channel 962 (shown in FIGS. 13a and b) can extend substantially parallel to the longitudinal axis A in the inner region 1106 of the insulator body 1100, but offset from the longitudinal axis A (i.e., non-concentric with respect to the longitudinal axis A). The first coolant channel 962 can connect the opening 962a on the end face 1102 at the proximal end 15 of the cartridge frame 112 to the opening 962b of the cartridge frame 112, which is distal to the opening 962a along the longitudinal axis A. The opening 962b is in turn fluidly connected to the nozzle opening 966, which allows the coolant flow 950 to travel distally from the torch head 102, through the cartridge frame 112 of the cartridge 104, and into the nozzle coolant flow chamber 965 (shown in FIGS. 13a and b).

In some embodiments, the opening 962b of the first coolant channel 962 is disposed on the inner side surface 1110 of the cartridge frame body 1100 and in fluid communication with the central channel 1020. Thus, in this configuration, the first coolant channel 962 does not extend over the entire length of the cartridge frame body 1100 in the longitudinal direction. The opening 962b of the first coolant channel 962 is illustrated in FIG. 22. As shown, the opening 962b is on the inner side surface 1110 toward the distal end 17 of the cartridge frame 112, and the opening 962b is fluidly connected to the central channel 1020. In alternative embodiments, the first coolant channel 962 extends over the entire length of the cartridge frame 112 with the opening 962b located on the distal end face 1104 of the cartridge frame insulator body 1100. The opening 962b is fluidly connected to the nozzle opening 966 in the nozzle jacket 111. Such a connection allows the liquid coolant flow 950 to pass from the torch head 102, through the cartridge frame 112, and into the nozzle coolant flow chamber 965 between the nozzle 110 and the nozzle jacket 111 to cool the two nozzle components.

As explained above, the nozzle opening 966 is configured to be aligned with the first coolant channel 962 of the cartridge frame 112 such that the coolant flow 950 can be introduced into the nozzle coolant flow chamber 965 from the first coolant channel 962 via the nozzle opening 966. The nozzle opening 966 can be in fluid communication with the second nozzle opening 967 on the nozzle jacket 111, where the two coolant openings 966, 967 are radially offset from each other (i.e., on different sides of the nozzle 110). The coolant flow 950 can enter the nozzle coolant flow chamber 965 via the nozzle opening 966, flow proximally through the flow chamber 965, return distally on a different side of the chamber 965, and exit the chamber 965 via the second opening 967. In some embodiments, the second opening 967 is aligned with and connected to the second coolant channel 968 disposed in the cartridge frame 112 (shown in FIGS. 13a and b). The second coolant channel 968 can extend substantially parallel to the longitudinal axis A within the inner region 1106 of the insulator body 1100, but offset from the longitudinal axis A (i.e., non-concentric with respect to the longitudinal axis A). The second coolant channel 968 connects the opening 968a on the end face 1102 at the proximal end 15 of the cartridge frame 112 to the opening 968b at the distal end 17 of the cartridge frame 112, which is in turn connected to the second nozzle opening 967. Such a connection allows the coolant flow 950 to travel proximally from the nozzle coolant chamber 965, through the cartridge frame 112 of the cartridge 104, and into the torch head 102 (shown in FIGS. 13a and b). In some embodiments, the opening 968b of the second coolant channel 968, which is distal to the opening 968a along the longitudinal axis A, is disposed on the inner side surface 1110 of the cartridge frame body 1100. Thus the first and second coolant channels 962, 968, in cooperation with the nozzle openings 966, 967 allow the coolant flow 950 to cool the nozzle 110 and the nozzle jacket 111 via the nozzle coolant flow chamber 965.

Figure 24A:
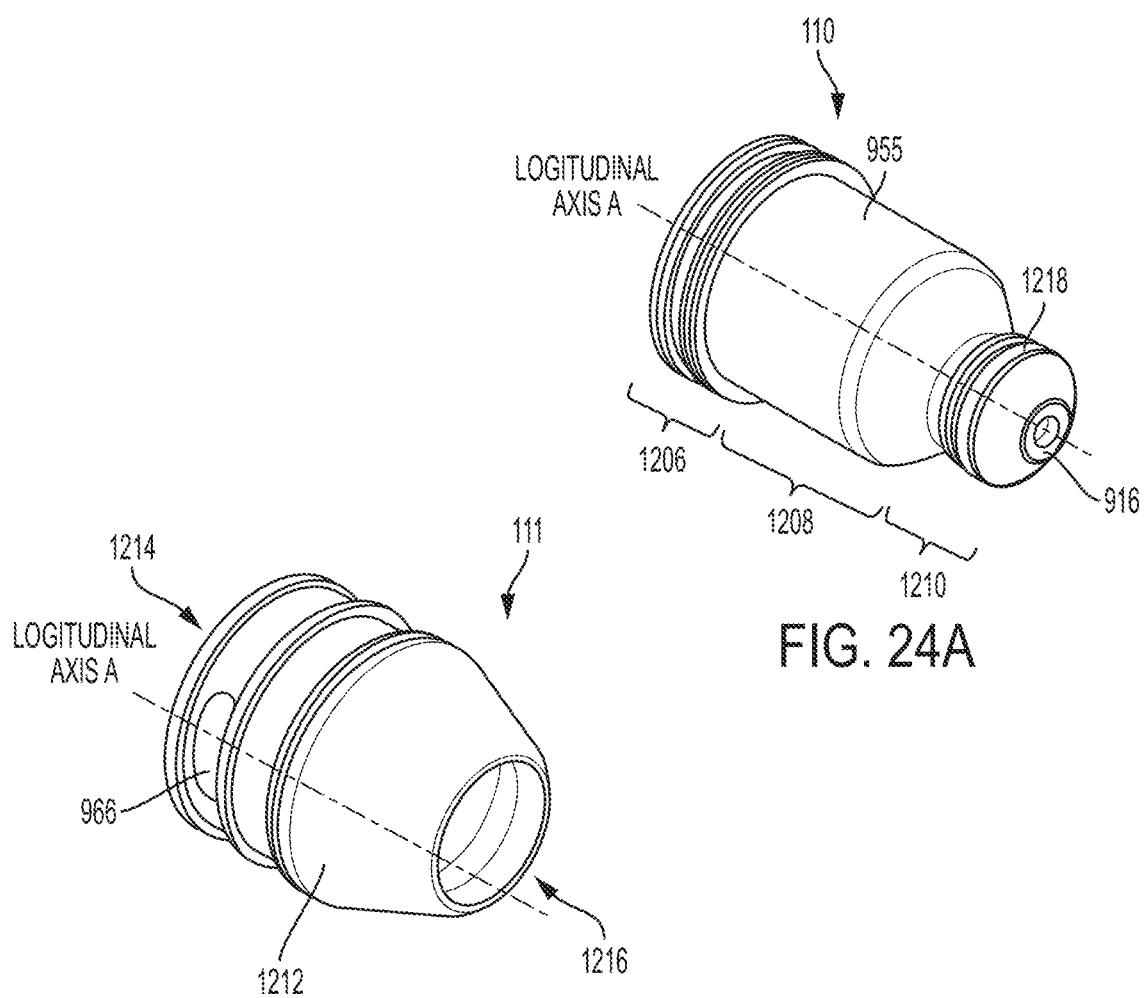
FIGS. 24a and b are exterior views of the non-vented nozzle and the nozzle jacket of the cartridge of FIG. 17, respectively, according to an illustrative embodiment of the present invention.
Figure 24B:
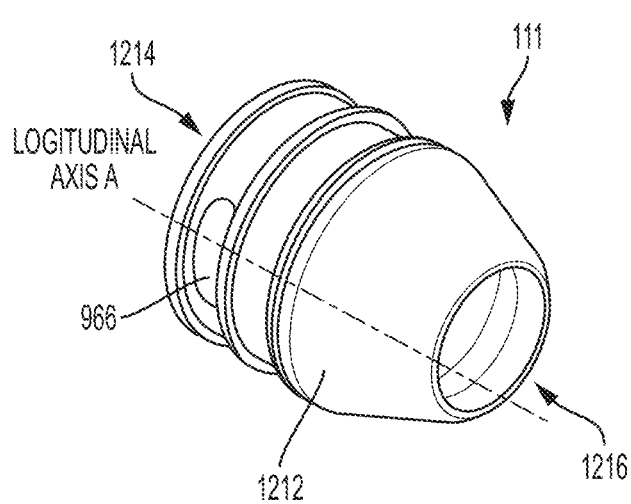

FIGS. 24a and b are exterior views of the non-vented nozzle 110 and the nozzle jacket 111 of FIG. 17, respectively, according to an illustrative embodiment of the present invention. The non-vented nozzle 110 includes a proximal end/portion 1206, a middle portion 1208, and a distal end/portion 1210 along the longitudinal axis A of the torch 10. The distal end 1210 of the nozzle 108 includes the centrally-located nozzle exit orifice 916 for introducing a plasma arc, such as an ionized gas jet, to a workpiece (not shown) to be cut. The nozzle jacket 111 includes a substantially hollow body 1212 defining a proximal end 1214 and a distal end 1216 along the longitudinal axis A. The nozzle 110 is adapted to be inserted into the hollow body 1212 of the nozzle jacket 111 such that the distal end 1210 of the nozzle 108 extends through the opening of the distal end 1216 of the nozzle jacket 111.

In some embodiments, the nozzle jacket 111 includes the nozzle openings 966, 967 at its proximal end 1214, where each opening connects an exterior surface to an interior surface of the nozzle jacket body 1212. The openings 966, 967 can be oriented on substantially opposite sides of nozzle jacket 111 (e.g., about 180 degrees from each other). In some embodiments, the exterior surface of the middle portion 1208 of the nozzle 111 and a corresponding interior surface of the nozzle jacket 111 cooperatively define the nozzle coolant flow chamber 965. The flow chamber 965 can be located approximately in the middle of the nozzle 110 and the nozzle jacket 111 along the longitudinal axis A and/or at their widest radial sections. In some embodiments, the distal portion 1210 of the nozzle 110 includes a circumferential flow channel 1218 about the nozzle 110 (i.e., a flow channel extending about 360 degrees around the nozzle 110) that is located through the opening at the distal end 1216 of the nozzle jacket 111. The circumferential channel 1218 permits a coolant to flow over the exterior surface of the tip of the nozzle 110, thereby promoting convective cooling of the nozzle tip during torch operation and reducing stagnation of the flowing liquid. The circumferential flow channel 1218 can be defined at least in part by a curvilinear surface of the nozzle 110.

In operation, the cooling liquid flow 950 can enter the flow chamber 965 via the opening 966 on one side of the nozzle jacket 111. The cooling liquid flow 950 can travel distally toward the circumferential flow channel 1218 in a longitudinal direction over one side of the flow chamber 965. Upon reaching the circumferential flow channel 1218, the coolant flow 950 can swirl about the nozzle tip and return proximally on the other side of the nozzle 110 substantially opposite (e.g., about 180 degrees) of the distal flow. The return flow 950 can exit from the nozzle coolant flow chamber 965 to the cartridge frame 112 via the opening 967.

In some embodiments, an internal surface of the shield 114 is in fluid communication with the third coolant channel 978 disposed in the insulator body 1100 of the cartridge frame 112 (shown in FIGS. 13a and b). The third coolant channel 978 can extend substantially parallel to the longitudinal axis A in the inner region 1106 of the insulator body 1100, but offset from the longitudinal axis A (i.e., non-concentric with respect to the longitudinal axis A). The third coolant channel 978 can connect the opening 978a on the end face 1102 at the proximal end 15 of the cartridge frame 112 to the opening 978b in the cartridge frame 112, which is distal to the opening 978a along the longitudinal axis A. In some embodiments, the opening 978b of the third coolant channel 978 is disposed on the outer side surface 1108 of the cartridge frame body 1100. Thus, in this configuration, the third coolant channel 978 does not extend over the entire length of the cartridge frame body 1100 in the longitudinal direction. The opening 978b of the third coolant channel 978 is illustrated in FIG. 22. As shown, the opening 978b is on the outer side surface 1108 in the middle portion of the cartridge frame 112. In alternative embodiments, the third coolant channel 978 extends over the entire length of the cartridge frame 112 with the opening 978b located on the distal end face 1104 of the cartridge frame insulator body 1100. The opening 978b can be fluidly exposed to an inner surface of the shield 114, which allows the coolant flow 950 to travel distally from the torch head 102, through the cartridge frame 112 of the cartridge 104, and into the shield 114 (shown in FIGS. 13a and b).

In some embodiments, as shown in FIG. 22, the outer side surface 1108 of the middle section of the cartridge frame 112 defines a circumferential flow channel 1220 about the cartridge frame 112 (i.e., a flow channel extending about 360 degrees around the cartridge frame 112). The circumferential channel 1220 is fluidly connected to the opening 978b of the third coolant channel 978. The circumferential channel 1220, in cooperation with an inner circumference of the shield 114, forms a shield coolant flow region 1222 (shown in FIG. 13b) that permits the coolant flow 950 to flow therethrough, thereby cooling the inner circumference of the shield 114. In some embodiments, the circumferential channel 1220 is in fluid communication with the opening 982b of the fourth coolant channel 982 of the cartridge frame 112 that can also be located on the outer side surface 1108 of the cartridge frame 112. The opening 982b is distal to the opening 982a along the longitudinal axis A. The openings 978b, 982b can be radially offset relative to each other, such as by 180 degrees so they are on opposite sides of the cartridge frame 112. The fourth coolant channel 982 can extend substantially parallel to the longitudinal axis A, but offset from the longitudinal axis A (i.e., non-concentric with respect to the longitudinal axis A). The fourth coolant channel 982 is adapted to connect the opening 982a on the end face 1102 at the proximal end 15 of the cartridge frame 112 to the opening 982b.

In operation, the coolant flow 950 can travel distally to the shield 114 via the opening 978b of the third coolant channel 978. Upon entering the shield coolant flow region 1222 (i.e., defined by the circumferential flow channel 1220 on the outer side surface 1108 of the cartridge frame 112 and the corresponding inner circumference of the shield 114), the coolant flow 950 can swirl about the shield coolant flow region 1222 and return proximally on the other side of the shield coolant flow region 1222 substantially opposite (e.g., about 180 degrees) of the distal flow. The return flow 950 can exit the shield coolant flow region 1222 to the cartridge frame 112 via the opening 982b of the fourth coolant channel 982.

Figure 25:
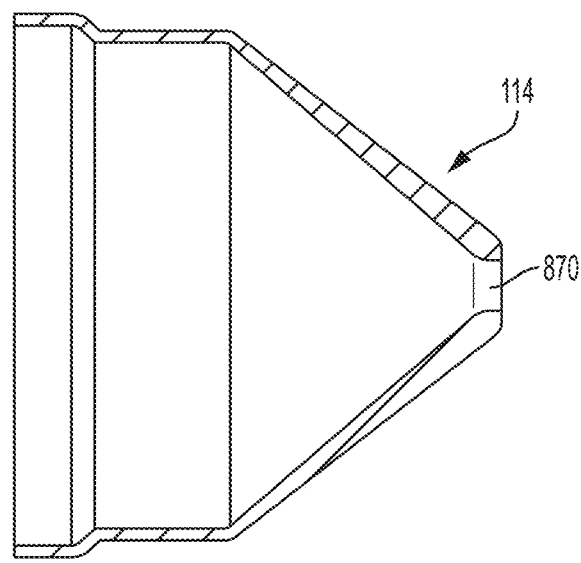
FIG. 25 is a cross sectional view of the shield of the cartridge of FIG. 17, according to an illustrative embodiment of the present invention.

FIG. 25 is a cross sectional view of the shield 114 of the cartridge 104 of FIG. 17, according to an illustrative embodiment of the present invention. The shield 114 comprises a substantially hollow body including a centrally located shield exit orifice 870 and, optionally, one or more gas vent holes (not shown) extending from an interior surface to an exterior surface of the shield 114. The shield 114 can be cold formed or stamped using copper.

In general, with reference to the proximal end 15 of the cartridge frame 112, the first coolant channel opening 962a can function as a coolant inlet to the nozzle 110, the second coolant channel opening 968a can function as a coolant outlet from the nozzle 110, the third coolant channel opening 978a can function as a coolant inlet to the shield 114, and the fourth coolant channel opening 982a can function as a coolant outlet from the shield 114. In some embodiments, when the torch head 102 is coupled to the cartridge 104, the second coolant channel opening 968a, which functions as a coolant outlet from the nozzle 110 is fluidly connected to the third coolant channel opening 978a, which functions as a coolant inlet to the shield 114. Specifically, a distribution channel in the torch insulator 118, which connects the internal openings 972, 974 of the torch insulator 118 as described above with reference to FIGS. 13a and b, can direct the coolant flow 950 from the second coolant channel 968 to the third coolant channel 978 to cool both the nozzle and the shield.

In some embodiments, one or more of the liquid coolant channel openings 962a, 968a, 978a, 982a, the plasma gas channel opening 912a, the shield gas channel opening 864a, and the main channel opening 1020a are disposed on the end face 1102 of the proximal end 21 of the torch insulator 118, where the end face can be substantially planar. These openings, with the exception of the main channel opening 1020a, can be disposed non-concentrically on the proximal end face 1102 with respect to the central longitudinal axis A. In some embodiments, one or more of the coolant channels 962, 968, 978, 982, the plasma gas channel 912, and the shield gas channel 864 of the cartridge frame 112 are non-concentric with respect to the central longitudinal axis A.

RFID Communication in the Cartridge

In some embodiments, the cartridge frame 112 forms a communication interface (e.g., an RFID communication interface) between the torch head 102 and the cartridge tip. With reference to FIG. 17, the insulator body 1100 of the cartridge frame includes an RFID mounting feature 1230 formed on or in cartridge frame 112 adjacent to the end face 1102 of the proximal end 15 of the cartridge frame 112. For example, the mounting feature 1230 can be a cavity disposed in the cartridge frame body 1110 from the end face 1102. The RFID mounting feature 1230 (e.g., a cavity) can be disposed in the inner region 1106 of the cartridge frame 112 and can be located/oriented in a non-concentric manner relative to the central longitudinal axis A.

The signal device 160 can be disposed in or on the mounting feature 1230 to transmit information about the cartridge 104 (e.g., about the electrode 108, the nozzle 110, the shield 114 and/or the cartridge frame 112 itself) to an adjacent reader device, such as to the communication device 122 in the torch insulator 118 when the torch head 102 is coupled to the cartridge 104. For example, the signal device 160 can be embedded in the cavity 1230 and surrounded by the insulator material of the cartridge frame body 1100. The signal device 160 can be an electrically writable and/or readable RFID tag. Exemplary information encoded on the signal device 160 can include generic or fixed information, such as a component's name, trademark, manufacturer, serial number, and/or type. In some embodiments, the encoded information is unique to the component, such as metal composition of the component, weight of the component, date, time and/or location of when the component was manufactured, etc. Information encoded to the signal device 160 can also specify operating parameters and/or data about the component that is independent of a detectable physical characteristic of the component. The signal device 160 can be an RFID tag or card, bar code label or tag, integrated circuit (IC) plate, or the like.

In some embodiments, the end face 1102 of the proximal end 15 of the cartridge frame 112 is substantially planar. In this configuration, if the cartridge 104 is not coupled to the torch head 102, an operator can place a reader, such as an RFID reader installed on a handheld device, flat against the substantially planar end face 1102 to interrogate the signal device 160 and extract information stored on the signal device 160. Hence, the cartridge frame 112 can be configured such that the signal device 160 mounted in or on the cartridge frame 112 is readable from inside of the plasma arc torch 10 (e.g., by the communication device 122 of the torch head 102) or outside of the plasma arc torch 10 (e.g., by an external reader).

Figure 26:
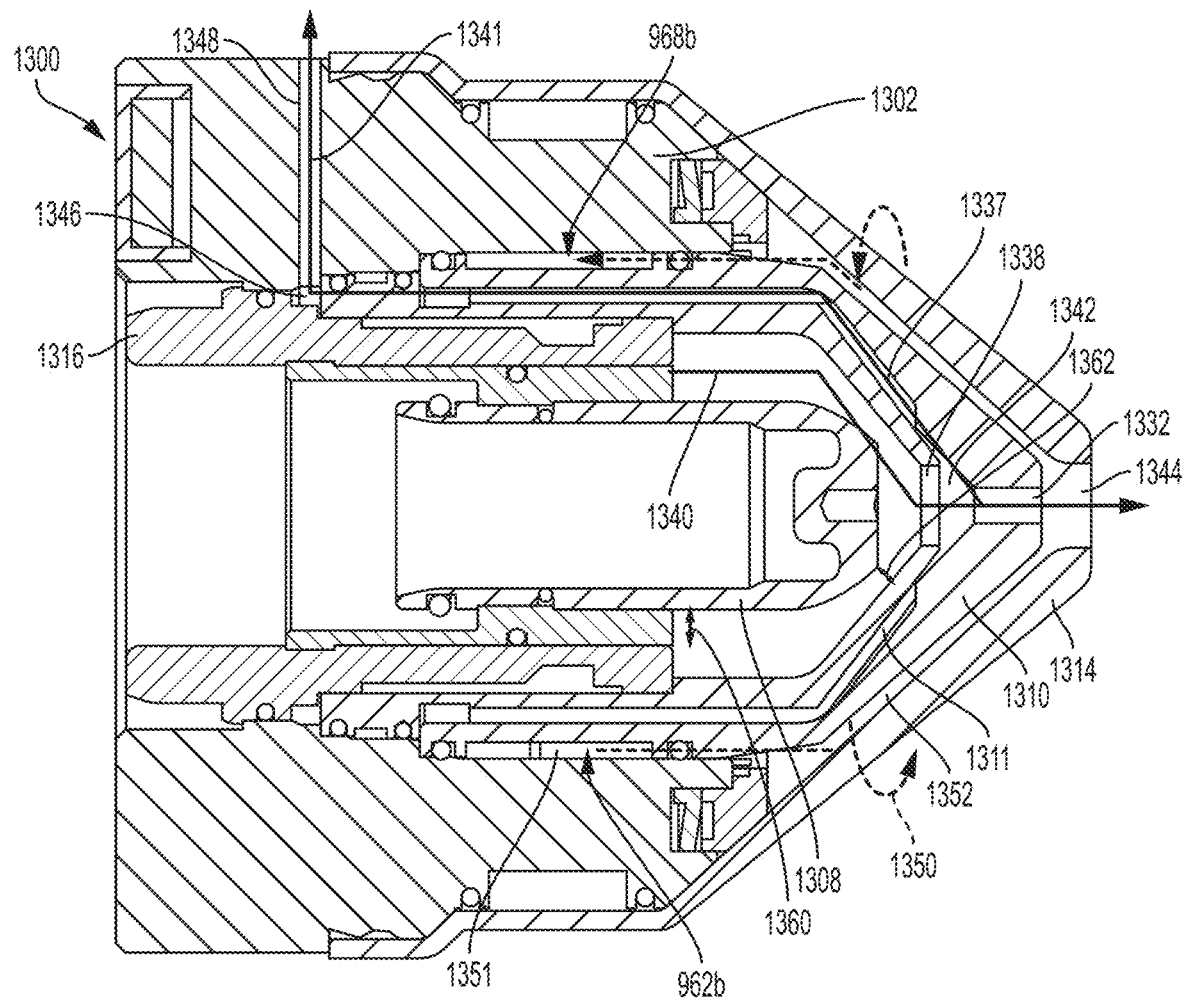
FIG. 26 is an exemplary vented cartridge compatible with the torch head of the plasma arc torch of FIG. 1, according to an illustrative embodiment of the present invention.

In another aspect of the present invention, the torch head 102 can be coupled to a cartridge that includes a vented nozzle, in which case the torch head 102 still provides substantially the same functions as it provides for the non-vented cartridge 104. FIG. 26 is an exemplary vented cartridge 1300 compatible with the torch head 102 of the plasma arc torch 10 of FIG. 1, according to an illustrative embodiment of the present invention. The cartridge frame 1302 of the vented cartridge 1300 can be substantially the same in configuration and/or material composition as the cartridge frame 112 of the non-vented cartridge 104 such that the cartridge frame 1302 maintains the same interface between the torch head 102 and the components of the cartridge tip, including an electrode 1308, a vented nozzle 1310 coupled to a nozzle liner 1311, and a shield 1314. For example, the electrode 1308 can be substantially the same as the electrode 108 of the non-vented cartridge 104, and the electrode 1308 can be affixed to the cartridge frame 1302 in the same manner as the electrode 108 to the cartridge frame 112. The shield 1314 can be substantially the same as the shield 114 of the non-vented cartridge 104, and the shield 1314 can be be affixed to the cartridge frame 1302 in the same way as the shield 114 to the cartridge frame 112.

The nozzle liner 1311 can be disposed in and affixed to an interior surface of the vented nozzle 1310. Each of the nozzle liner 1311 and the nozzle 1310 can be directly affixed to the cartridge frame 1302 such that the nozzle liner 1311 and the nozzle 1310 are axially and radially aligned to the cartridge frame 1302. In some embodiments, as illustrated in FIG. 26, a radial distance 1360 between an interior surface of a swirl ring 1316 of the vented cartridge 1300 and an exterior surface of the electrode 1308 is about 0.08 inches. In some embodiments, the closest breakdown gap distance 1362 between an exterior surface of the electrode 108 and an interior surface of the nozzle liner 1311 is about 0.05 inches.

Figure 27A:
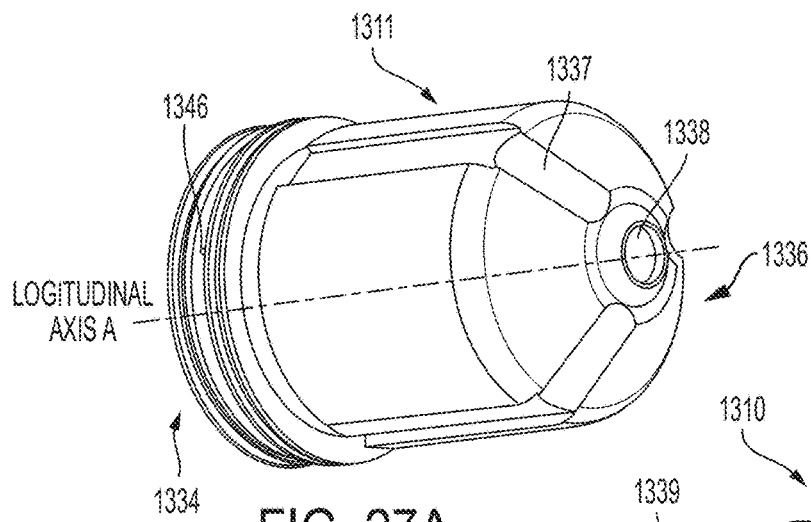
FIGS. 27a and b are exterior views of the nozzle liner and the vented nozzle of the cartridge of FIG. 26, respectively, according to an illustrative embodiment of the present invention.
Figure 27B:
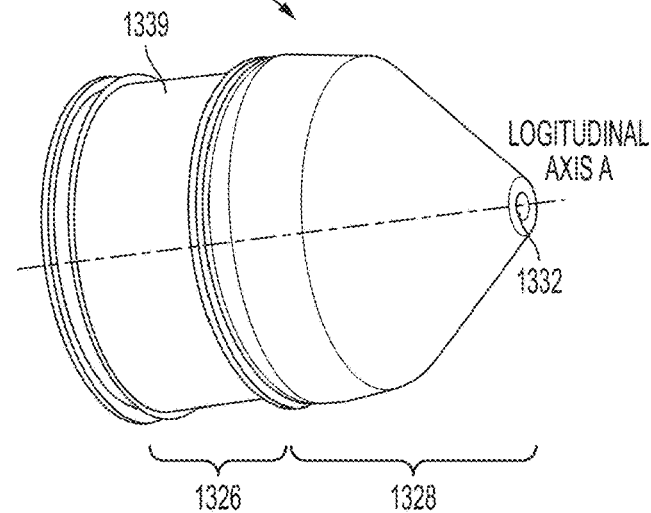

FIGS. 27*a* and *b* are exterior views of the nozzle liner 1311 and the vented nozzle 1310 of the cartridge 1300 of FIG. 26, respectively, according to an illustrative embodiment of the present invention. As shown in FIG. 27*b*, the vented nozzle 1310 includes a substantially hollow body having a proximal end/portion 1326 and a distal end/portion 1328 along the longitudinal axis A of the torch 10. The distal end 1328 of the nozzle 1310 includes a centrally-located nozzle exit orifice 1332 for introducing a plasma arc, such as an ionized gas jet, to a workpiece (not shown) to be cut. In some embodiments, the nozzle 1310 includes a circumferential coolant channel 1339 about an exterior surface of the nozzle 1310 (i.e., a flow channel extending about 360 degrees around the nozzle 110) that is located at the proximal end 1326. The circumferential channel 1339 permits a liquid coolant to flow over the exterior surface of the nozzle 1310 in a swirling pattern, thereby promoting convective cooling and reducing stagnation of the flowing liquid.

As shown in FIG. 27*a*, the nozzle liner 1311 includes a substantially hollow body defining a proximal end 1334 and a distal end 1336 along the longitudinal axis A. The nozzle liner 1311 includes a central opening 1338 at the distal end 1336 and one or more plasma gas channels 1337 oriented longitudinally on an outer surface of the liner 1311 around the central opening 1338. In some embodiments, the nozzle liner 1311 includes one or more vent holes 1346 at its proximal end 1334 for allowing a vented plasma gas flow to travel from an interior surface to an exterior surface of the nozzle liner 1311. The vent holes 1346 can be suitably metered to control one or more flow parameters. The nozzle liner 1311 is adapted to be disposed in the hollow body of the nozzle 1310 from an opening at the distal portion 1326 of the nozzle 1310. The nozzle liner 1311 can be radially aligned/centered with respect to the nozzle 1310. The central opening 1338 can be in fluid communication with the nozzle exit orifice 1332 once the nozzle liner 1311 is disposed into the nozzle 1310. The distal end 1334 of the nozzle liner 1311 can be exposed such that the vent holes 1346 are unobstructed by the nozzle 1310.

In some embodiments, the shield gas flow through the vented cartridge 1300 is substantially the same as the shield gas flow 868 through the non-vented cartridge 104. In some embodiments, the plasma gas flow through the cartridge frame 1302 is the same as the plasma gas flow 900*c* through the cartridge frame 112. The plasma gas flow path after it exits from the cartridge frame 112 is illustrated in FIG. 26. Substantially the same as the plasma gas flow path 900*b* of the cartridge frame 112, the swirl ring 1316 can be configured to introduce a swirling motion to the plasma gas flow 1340 as it flows distally to exit the cartridge frame 1302. The plasma gas flow 1340 then travels distally between the electrode 1308 and the nozzle liner 1311 to reach a plenum 1342 cooperatively defined by the electrode 1308, the nozzle liner 1311 and the nozzle 1310. The plasma gas flow 1340 can exit the plasma arc torch 10 by travelling through the plenum 1342, the central opening 1338 of the nozzle liner 1311, the central nozzle exit orifice 1332 and a central shield exit orifice 1344. A small portion 1341 of the plasma gas flow 1340 in the plenum 1342 can be vented distally via the one or more plasma gas channels 1337 between the exterior surface of the liner 1311 and the interior surface of the nozzle 1310.

As the plasma gas flow 1341 travels distally between the liner 1311 and the nozzle 1310, it reaches the proximal end 1324 of the nozzle liner 1311 and can exit the nozzle liner 1311 via the vent hole 1346 at the proximal end 1324, which connects an interior surface of the nozzle liner body 1311 to an exterior surface of the nozzle liner body 1311. The vent hole 1346 is adapted to be in fluid communication with a vent channel 1348 that is radially oriented in the body of the cartridge frame 1302 to connect an inner side surface of the cartridge frame 1302 and an outer side surface of the cartridge frame 1302, which is in turn exposed to atmosphere. In some embodiments, a similar vent channel can be constructed in the insulator body 1100 of the cartridge frame 112 for the non-vented cartridge 112 such that the same cartridge frame is usable in both the vented and the non-vented cartridge design. Thus, the distal plasma gas flow 1341 can exit the nozzle 1310 via the vent hole 1346 to enter the vent channel 1348 disposed in the body of the cartridge frame 1302. The distal plasma gas flow 1341 can be vented to atmosphere by following the vent channel 1348 from the inner side surface to the outer side surface of the cartridge frame 1302. In some embodiments, if a retaining cap 120 is used to connect the cartridge frame 1302 to the torch head 102, a vent hole disposed in the body of the retaining cap 120 can align with the vent channel 1348 of the cartridge frame to allow the distal plasma gas flow 1341 to escape from the torch 10. In general, by allowing the plasma gas flow 1341 to be vented from the cartridge 1300 instead of the torch head 102, the ozone in the plasma gas flow 1341 would not otherwise destroy the torch 10 since the torch head 102 is a more durable component that can be repeatedly used while the cartridge 1300 is a consumable component that can be regularly replaced (e.g., about every 2-20 hours of operation, such as about every 8 hours of operation) or replaced after each use.

In some embodiments, the coolant flow through the cartridge frame 1302 is substantially the same as the liquid coolant flow 950 through the cartridge frame 112. In the vented cartridge 1300, the coolant flow can cool the electrode 1308 and the shield 1314 in substantially the same manner as the coolant flow 950 for the non-vented cartridge 104 using same coolant channels and passages/flow regions. For example, cooling the electrode 1308 in the vented cartridge 1300 can be the same as cooling the electrode 108 of the non-vented cartridge 104 by using the main coolant channel 1002 connected to the cavity 954 of the electrode 108. As another example, cooling the shield 1314 in the vented cartridge 1300 can be the same as cooling the shield 114 of the non-vented cartridge 104 by using the third and fourth coolant channels 978, 982 connected to the shield coolant flow region 1222 of the shield 114.

For cooling the vented nozzle 1310 in the vented cartridge 1300, the coolant flow through the cartridge frame 1302 is substantially the same as the liquid coolant flow 950 through the cartridge frame 112 over the first and second coolant channels 962, 968. The coolant flow path towards the vented nozzle 1310 after it exits from the cartridge frame 112 is illustrated in FIG. 26. As shown, the opening 962b of the first coolant channel 962, which is situated on the inner side surface of the cartridge frame 1302, conducts a coolant flow 1350 from the inner region of the cartridge frame 1302 to a central main channel 1351 (e.g., same as the main channel 1020 of the cartridge frame 112). The coolant flow 1350 can travel distally out of the cartridge 1302 over the main channel 1351 and into a nozzle coolant flow region 1352 defined between the circumferential channel 1339 on the exterior surface of the nozzle 1310 and an interior surface of the shield 1314. For example, the opening 962b of first coolant channel 962 can be in fluid communication with the circumferential channel 1339 (and the nozzle coolant flow region 1352) such that it centrally conducts the coolant flow 1350 from the cartridge frame 1302 to the nozzle coolant flow region 1352 from one side of the nozzle 1310. The coolant flow 1350 can travel distally toward the circumferential flow channel 1339 in a longitudinal direction over one side of the nozzle coolant flow region 1352. Upon reaching the circumferential flow channel 1339, the coolant flow 1350 can swirl about the nozzle 1310 and return proximally on the other side of the nozzle 1310 substantially opposite (e.g., about 180 degrees) of the distal flow. The circumferential flow channel 1339 can also be in fluid communication with the opening 968b of the second coolant channel 968 such that the return flow 1350 can exit from the nozzle coolant flow region 1352 and enter the cartridge frame 1302 via the opening 968b of the second coolant channel 968.

In some embodiments, unlike the coolant flow 950 with respect to the non-vented nozzle 110, the coolant flow 1350 for the vented cartridge 1300 does not enter a region between the liner 1311 and the vented nozzle 1310. Instead, the coolant flow 1350 flows around an exterior circumference of the nozzle 1310 that is spaced distally relative to the liner 1311.

Generally, the cartridge frame 112 for the non-vented cartridge 104 and the cartridge frame 1302 for the vented cartridge 1300 can be the same. In some embodiments, the same cartridge frame can be used in different types of cartridges by aligning and attaching different types of components to the cartridge frame. For example, as described above, a cartridge frame of the present invention can be coupled to a vented or non-vented nozzle to customize plasma gas venting capabilities. As another example, different swirl rings (e.g., the swirl ring 150 or swirl ring 1316) can be attached to the cartridge frame to customize the swirling pattern of the plasma gas flow through the cartridge. As yet another example, different baffles (e.g., the baffle 1112) or shield swirl rings (e.g., the shield swirl ring 1114) can be attached to the cartridge frame to customize flow properties of the shield gas flow through the cartridge. Thus, the cartridge frame of the present invention allows the consumable cartridge to be configurable and customizable to realize different cutting objectives.

Figure 28:
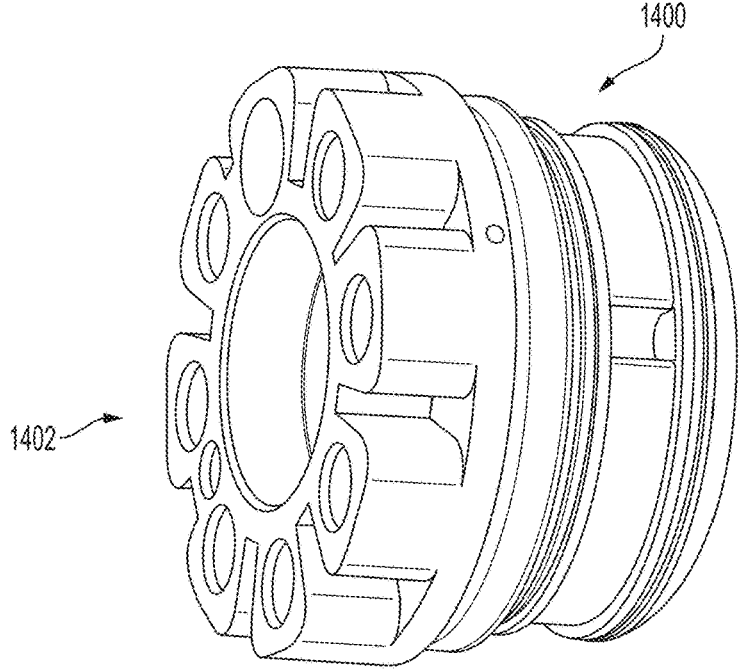
FIG. 28 is another exemplary cartridge frame that can be suitably configured to form a cartridge compatible with the torch head of FIG. 1, according to an illustrative embodiment of the present invention.

FIG. 28 is another exemplary cartridge frame 1400 that can be suitably configured to form a cartridge compatible with the torch head 102 of FIG. 1, according to an illustrative embodiment of the present invention. The cartridge frame 1400 is substantially the same as the cartridge frame 112 or the cartridge frame 1302. The main difference is the shape of the proximal end 1402 of the cartridge frame 1400, which has a "flower petal" configuration. All other features of the cartridge frame 1400, including the inlet and outlet openings and channels, remain the same as those of the cartridge frame 112. Same as the cartridge frame 112, the cartridge frame 1400 can be made of an insulator material, such as Torlon™ or polyphenylene sulfide. The "flower petal" configuration of the proximal end 1402 of the cartridge frame 1400 allows the cartridge frame 1400 to be manufactured using an injection molding technique, which provides a faster and cheaper manufacturing approach in comparison to traditional processes, including using less mass, cools better and more evenly with no cavitation. In alternative embodiments, the cartridge frame 112 or 1400 can be machined.

In some embodiments, at least one of the nozzle jacket 111 or the electrode insulator 754 is made from a non-conductive material, such as Torlon™ or polyphenylene sulfide. At least one of the electrodes 108, 1308, the insert 1200, the non-vented nozzle 110, the vented nozzle 1310, the nozzle liner 1311, or the shields 114, 1314 can be made from a conductive material, such as copper or brass. The swirl rings 150, 1316 can be made from a conductive material, such as zinc (e.g., Zamac 3). Each of the baffle 1112 or the shield swirl ring 1114 can be made from an insulator material or a conductive material. In some embodiments, each of the non-vented cartridge 104 or vented cartridge 1300 is composed of at least about 50% of plastic by volume. In some embodiments, an overall length of the cartridge 104 or 1300 along the longitudinal axis A is about 2 inches, and the largest diameter of the cartridge 104 or 1300 along a plane perpendicular to the longitudinal axis A is about 1.7 inches.

The electrodes 108, 1308 and the shields 114, 1314 can be manufactured using a cold forming, stamping or machining technique. The non-vented nozzle 110 or the vented nozzle 1310 can be manufactured using cold forming, stamping or machining with features (e.g., holes) drilled in. The swirl rings 150, 1316 can be manufactured using die casting with swirl holes drilled in, injection molding with swirl holes drilled in, or machining. The baffle 1112 can be formed using stamping, die casting, machining or molding. The shield swirl ring 1114 can be formed using die casting, molding or machining. In general, to reduce manufacturing cost and complexity, the cartridge 104 or 1300 includes little or no Vespel™, little or no lava, little or no aluminum, minimal copper usage, and/or very few o-ring grooves. Further, the components of the cartridges 104, 1300 are manufactured to minimize drilled holes.

Figure 29:
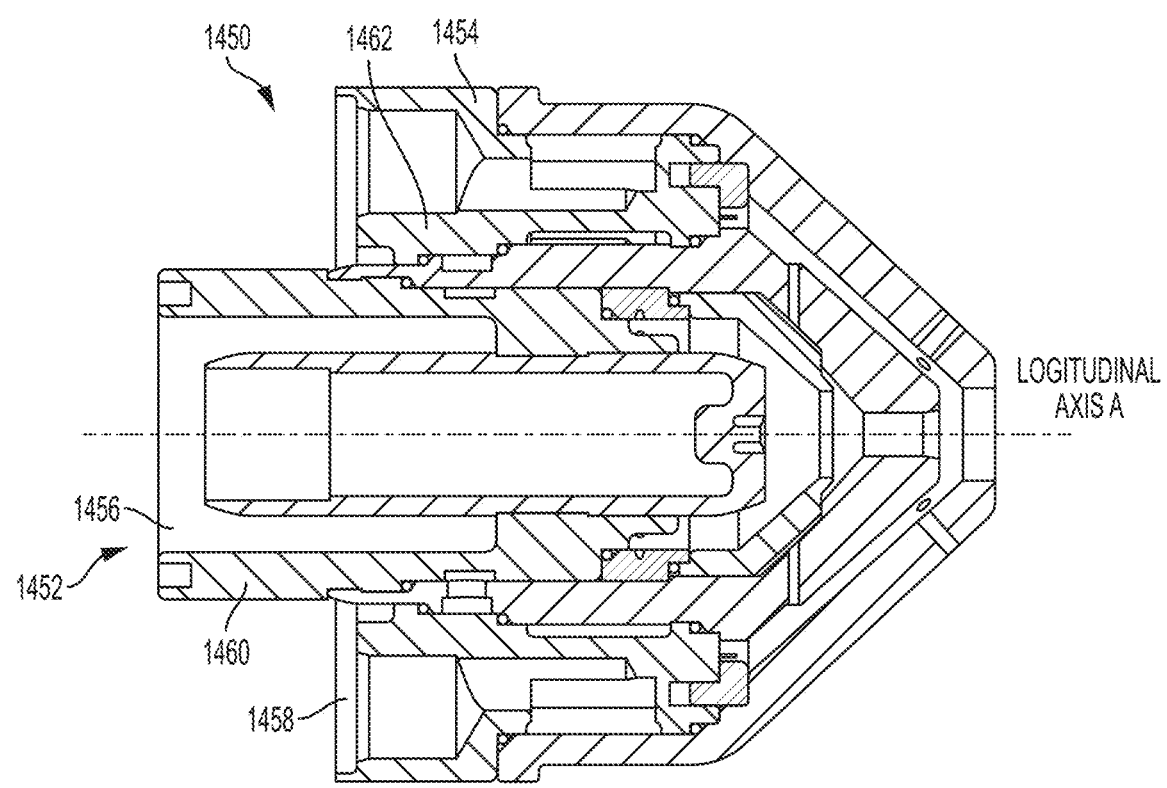
FIG. 29 is an exemplary vented cartridge that includes a non-planar proximal end, according to an illustrative embodiment of the present invention.

In some embodiments, the cartridge 104 or the cartridge 1300 is designed to be non-planar in the proximal end such that the interface between the cartridge and the torch head 102 is also non planar. FIG. 29 is an exemplary vented cartridge 1450 that includes a non-planar proximal end 1452, according to an illustrative embodiment of the present invention. The vented cartridge 1450 can comprise an end face 1458 and a protruding distal portion 1460 disposed on a cartridge frame 1454. Specifically, the protruding distal portion 1460 is a portion of the cartridge frame 1454 that forms the main central channel 1456. The protruding distal portion 1460 can extend distally along the longitudinal axis A beyond the end face 1458 of the inner region 1462 of the cartridge frame 1454. All other features/functions of the cartridge 1450 can remain substantially the same as the vented cartridge 1300 described above.

Figure 30:
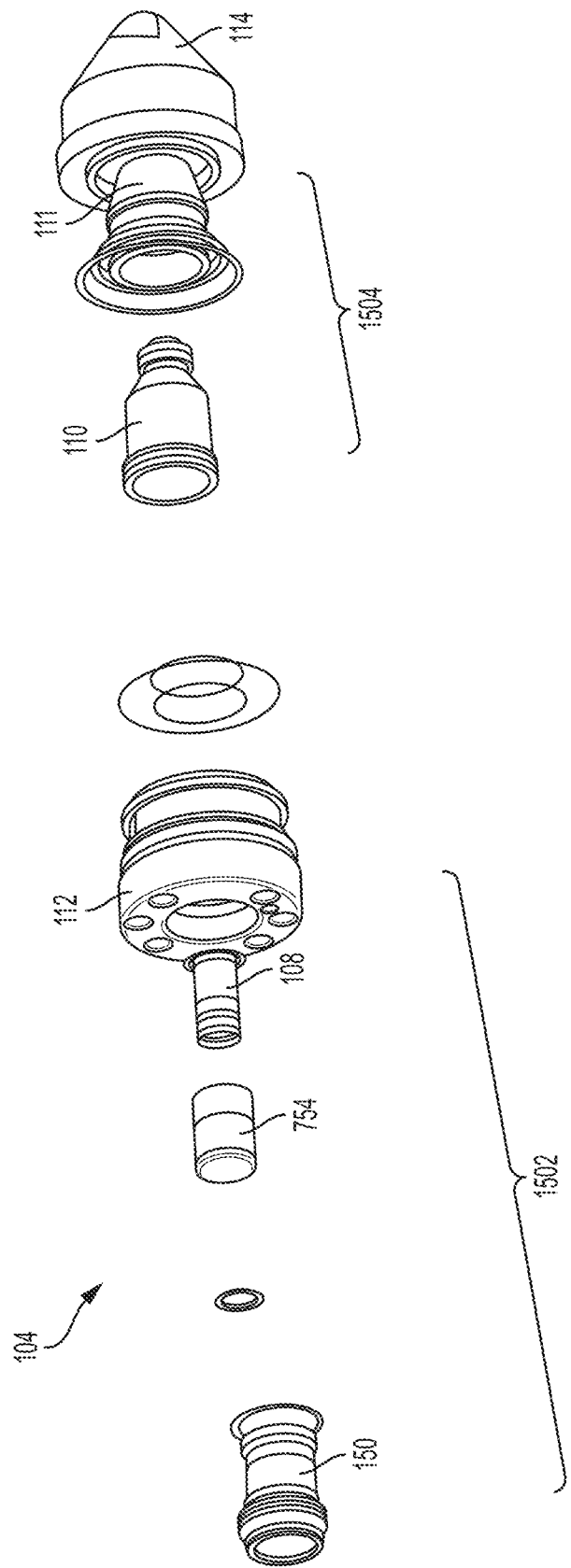
FIG. 30 is an exploded view of the cartridge of FIG. 17, according to an illustrative embodiment of the present invention.

FIG. 30 is an exploded view of the cartridge 104 of FIG. 18, according to an illustrative embodiment of the present invention. To assemble the cartridge 104, the emissive insert 1200 can be first inserted into the electrode 108 at the distal end 1202 of the electrode 108. The electrode 108 can then be coupled to the electrode insulator 754 from the distal end of the electrode insulator 754. For example, the outer retaining features 1066 of the electrode 108 can matingly engage the inner retaining features 1068 of the electrode 754 to axially align the components and radially align/center them along the interface 1067. The resulting components can be coupled to the swirl ring 150 to form a first sub-assembly 1502. For example, the outer retaining feature 1056 of the electrode insulator 754 can matingly engage the inner retaining feature 1054 of the swirl ring 150 to axially align the components and radially align/center them along the interface 1055. In some embodiments, one or more o-rings are used to further secure the components (e.g., the swirl ring 150, the electric insulator 75 and the electrode 108) relative to each other in the first sub-assembly 1502. A second sub-assembly 1504 can be formed by affixing the nozzle 110 to the nozzle jacket 111, where the nozzle 110 can be disposed in the hollow body of the nozzle jacket 111. In some embodiments, one or more o-rings are used to further secure the nozzle 110 and the nozzle jacket 111 relative to each other in the second sub-assembly 1504.

The first sub-assembly 1502, the second sub-assembly 1504, and the shield 114 can be directly attached to the cartridge frame 112 to form the cartridge 104. For example, an outer retaining feature 1052 of the swirl ring 150 can matingly engage an inner retaining feature 1058 of the cartridge frame 112 to axially align the components and radially align/center them along the interface 1053. An outer retaining feature 1070 of the nozzle 110 can matingly engage another inner retaining feature 1072 of the cartridge frame 112 to axially align the components and radially align/center them along the interface 1071. An outer retaining feature 1062 of the cartridge frame 112 can matingly engage an inner retaining feature 1064 of the shield 114 to axially align the components and radially align/center them along the interface 1063. In addition, a distal end of the shield 114 can be crimped into an indentation 1065 on the outer surface of the cartridge frame 112 to further secure the two components together. In some embodiments, one or more o-rings are used to assist in the engagement of the first sub-assembly 1502, the second sub-assembly 1504, and/or the shield 114 to the cartridge frame 112.

It should be understood that various aspects and embodiments of the invention can be combined in various ways. Based on the teachings of this specification, a person of ordinary skill in the art can readily determine how to combine these various embodiments. Modifications may also occur to those skilled in the art upon reading the specification.

What is claimed is:

1. A consumable cartridge frame for a liquid-cooled plasma arc torch, the consumable cartridge frame comprising:
    a plastic insulator body configured to be a portion of a torch cartridge, a proximal region of the insulator body removably connectable to a torch head and a distal region of the insulator body connectable to a cartridge tip that includes a nozzle and a shield;
    a cooling channel, disposed in and defined by the insulator body, configured to align with a flow region in at least one of the nozzle or shield of the cartridge tip to conduct a cooling fluid flow received from the torch head from the proximal region to the flow region of the at least one nozzle or shield of the cartridge tip connected to the insulator body; and
    a return channel, disposed in and defined by the insulator body, configured to conduct the cooling fluid flow from the at least one nozzle or shield to the proximal region of the insulator body connected to the torch head;
    wherein a longitudinal axis of each of the cooling channel and the return channel is radially offset in relation to a central longitudinal axis of the insulator body.

2. The consumable cartridge frame of claim 1, further comprising a torch engagement feature configured to radially secure the cartridge tip to the torch head in a predetermined orientation.

3. The consumable cartridge frame of claim 2, wherein the cooling channel is configured to substantially align with a corresponding cooling channel of the torch head when the cartridge tip is radially secured to the torch head via the torch engagement feature, the cooling channel of the torch head adapted to conduct a cooling liquid from the torch head into the cartridge tip.

4. The consumable cartridge frame of claim 3, wherein the return channel is configured to substantially align with a corresponding return channel of the torch head when the cartridge tip is radially secured to the torch head via the torch engagement feature, the return channel of the torch head adapted to return the cooling liquid from the cartridge tip into the torch head.

5. The consumable cartridge frame of claim 1, further comprising a central channel disposed in the insulator body and concentric with respect to the central longitudinal axis of the insulator body, the central channel configured to perform at least one of (i) conduct the cooling fluid flow from the torch head to an electrode or (ii) pass an electrical current from the torch head to the electrode.

6. The consumable cartridge frame of claim 1, where the cooling fluid flow comprises a liquid coolant flow.

7. The consumable cartridge frame of claim 1, further comprising at least one gas channel, disposed in the insulator body, configured to conduct a second fluid flow to the shield of the cartridge tip, wherein the at least one gas channel is offset from the central longitudinal axis of the insulator body.

8. The consumable cartridge of claim 7, wherein the second fluid flow comprises a shield gas flow.

9. A consumable cartridge frame for a liquid-cooled plasma arc torch, the consumable cartridge frame comprising:
a plastic insulator body configured to be a portion of a torch cartridge, the insulator body comprising a proximal interface removably connectable to a torch head of the plasma arc torch and a distal region connectable to a cartridge tip that includes a nozzle and a shield;
a shield gas inlet opening at the proximal interface of the plastic insulator body, the shield gas inlet configured to maintain fluid communication with the shield to introduce a shield gas flow from the torch head to the shield; and
a coolant inlet opening and a coolant outlet opening at the proximal interface of the plastic insulator body, the coolant inlet and outlet openings configure to circulate a coolant flow between the torch head and at least one of the nozzle or the shield,
wherein centers of the shield gas inlet opening, the coolant inlet opening and the coolant outlet opening are radially offset from a central longitudinal axis of the insulator body.

10. The consumable cartridge frame of claim 9, further comprising a radio-frequency identification (RFID) opening at the proximal interface with the torch head.

11. The consumable cartridge frame of claim 10, wherein the RFID opening is associated with a cavity disposed in the insulator body of cartridge frame, the cavity being offset from the central longitudinal axis of the insulator body, the cavity configured to receive an RFID tag for communicating with a reader device of the torch head.

12. The consumable cartridge frame of claim 11, wherein the shield gas inlet opening, the coolant inlet opening and the coolant outlet opening are adapted to align with corresponding openings in the torch head in the predetermined orientation to convey liquid and gas between the torch head and the cartridge tip.

13. A consumable cartridge for a liquid-cooled plasma arc torch, the consumable cartridge comprising:
an electrically insulating cartridge frame; and
a set of conductive consumable components defining, in part, a plasma plenum, the set of conductive components affixed to the cartridge frame; and
a set of liquid and gas channels disposed in the electrically insulating cartridge frame and in fluid communication with the set of conductive consumable components, a longitudinal axis of each of the liquid and gas channels being radially offset in relation to a central longitudinal axis of the cartridge frame,
wherein the consumable cartridge is composed of at least 50% electrically insulating material by volume.

14. The consumable cartridge of claim 13, wherein the consumable cartridge is composed of about 60% to about 80% the electrically insulating material by volume.

15. The consumable cartridge of claim 13, wherein the consumable cartridge is a single use cartridge.

16. The consumable cartridge of claim 13, wherein the set of conductive consumable components after being affixed to the cartridge frame form a unitary component.

17. The consumable cartridge of claim 13, wherein the set of conductive consumable components comprises a shield, a nozzle and an electrode.

18. The consumable cartridge of claim 13, wherein the electrically insulating material comprises plastic.

\* \* \* \* \*